(12) United States Patent
Ros et al.

(10) Patent No.: US 11,173,487 B2
(45) Date of Patent: Nov. 16, 2021

(54) DETERMINISTIC RATCHET FOR SUB-MICROMETER BIOPARTICLE SEPARATION

(71) Applicants: Alexandra Ros, Phoenix, AZ (US); Daihyun Kim, Mesa, AZ (US); Jinghui Luo, Covina, CA (US)

(72) Inventors: Alexandra Ros, Phoenix, AZ (US); Daihyun Kim, Mesa, AZ (US); Jinghui Luo, Covina, CA (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 55 days.

(21) Appl. No.: 16/226,165

(22) Filed: Dec. 19, 2018

(65) Prior Publication Data
US 2019/0184395 A1  Jun. 20, 2019

Related U.S. Application Data

(60) Provisional application No. 62/607,820, filed on Dec. 19, 2017.

(51) Int. Cl.
*B01L 3/00* (2006.01)
*B03C 5/02* (2006.01)
(Continued)

(52) U.S. Cl.
CPC ... *B01L 3/502715* (2013.01); *B01L 3/502753* (2013.01); *B01L 3/502761* (2013.01);
(Continued)

(58) Field of Classification Search
None
See application file for complete search history.

(56) References Cited

U.S. PATENT DOCUMENTS

| 5,105,843 A | 4/1992 | Condron et al. |
| 6,174,469 B1 | 1/2001 | Ganan-Calvo |

(Continued)

FOREIGN PATENT DOCUMENTS

| WO | 2009091416 A2 | 7/2009 |
| WO | 2011150368 A1 | 12/2011 |

(Continued)

OTHER PUBLICATIONS

Beech, J.P., et al. Tipping the balance of deterministic lateral displacement devices using dielectrophoresis, Lab Chip, 2009, 9, 2698-2706 (Year: 2009).*

(Continued)

*Primary Examiner* — Xiaoyun R Xu
(74) *Attorney, Agent, or Firm* — Michael Best & Friedrich LLP

(57) ABSTRACT

Sub-micrometer bioparticles are separated by size in a microfluidic channel utilizing a ratchet migration mechanism. A structure within the microfluidic channel includes an array of micro-posts arranged in laterally shifted rows. Reservoirs are disposed at each end of the microfluidic channel. A biased AC potential is applied across the channel via electrodes immersed into fluid in each of the reservoirs to induce a non-uniform electric field through the microfluidic channel. The applied potential comprises a first waveform with a first frequency that induces electro-kinetic flow of sub-micrometer bioparticles in the microfluidic channel, and an intermittent superimposed second waveform with a higher frequency. The second waveform selectively induces a dielectrophoretic trapping force to selectively impart ratchet migration based on particle size for separating the sub-micrometer bioparticles by size in the microfluidic channel.

20 Claims, 52 Drawing Sheets
(52 of 52 Drawing Sheet(s) Filed in Color)

(51) Int. Cl.
  *B03C 5/00* (2006.01)
  *G01N 1/40* (2006.01)
  *G01N 15/00* (2006.01)

(52) U.S. Cl.
  CPC .............. *B03C 5/005* (2013.01); *B03C 5/026* (2013.01); *B03C 5/028* (2013.01); *B01L 3/50273* (2013.01); *B01L 2200/0647* (2013.01); *B01L 2200/0652* (2013.01); *B01L 2300/0816* (2013.01); *B01L 2400/0406* (2013.01); *B01L 2400/0415* (2013.01); *B01L 2400/0424* (2013.01); *B01L 2400/086* (2013.01); *B03C 2201/26* (2013.01); *G01N 2001/4038* (2013.01); *G01N 2015/0038* (2013.01)

(56) References Cited

U.S. PATENT DOCUMENTS

| | | | |
|---|---|---|---|
| 6,221,654 | B1 | 4/2001 | Quake et al. |
| 6,822,180 | B2 | 11/2004 | Fujii et al. |
| 6,976,590 | B2 | 12/2005 | Deshpande et al. |
| 7,341,211 | B2 | 3/2008 | Ganan Calvo et al. |
| 7,584,857 | B2 | 9/2009 | Böhm et al. |
| 7,708,949 | B2 | 5/2010 | Stone et al. |
| 8,272,576 | B2 | 9/2012 | Doak et al. |
| 8,658,367 | B2 | 2/2014 | Quake et al. |
| 8,827,548 | B2 | 9/2014 | Roukes et al. |
| 8,844,570 | B2 | 9/2014 | Glick |
| 9,038,919 | B2 | 5/2015 | Link et al. |
| 9,192,944 | B2 | 11/2015 | Ros et al. |
| 9,227,200 | B2 | 1/2016 | Chiou et al. |
| 9,289,787 | B2 | 3/2016 | Doak et al. |
| 9,387,488 | B2 | 7/2016 | Chou et al. |
| 9,446,360 | B2 | 9/2016 | Mazutis |
| 9,643,136 | B2 | 5/2017 | Hansen et al. |
| 9,839,922 | B2 | 12/2017 | Doak et al. |
| 10,166,542 | B2 | 1/2019 | Ros et al. |
| 10,413,920 | B2 | 9/2019 | Doak et al. |
| 10,557,807 | B2 | 2/2020 | Ros et al. |
| 2007/0003442 | A1 | 1/2007 | Link et al. |
| 2007/0012891 | A1 | 1/2007 | Maltezos et al. |
| 2007/0080062 | A1 | 4/2007 | Harnett et al. |
| 2007/0228049 | A1 | 10/2007 | Nordmeyer et al. |
| 2008/0105565 | A1 | 5/2008 | Davalos et al. |
| 2009/0235990 | A1 | 9/2009 | Beer |
| 2010/0163116 | A1 | 7/2010 | Fang et al. |
| 2010/0196892 | A1 | 8/2010 | Quake et al. |
| 2010/0224255 | A1 | 9/2010 | Mathies et al. |
| 2010/0224493 | A1 | 9/2010 | Davalos et al. |
| 2010/0303687 | A1 | 12/2010 | Blaga et al. |
| 2012/0021523 | A1 | 1/2012 | Fowler et al. |
| 2012/0085649 | A1 | 4/2012 | Sano et al. |
| 2012/0266986 | A1 | 10/2012 | Wimberger-Friedl et al. |
| 2013/0032235 | A1 | 2/2013 | Johnstone et al. |
| 2013/0295653 | A1 | 11/2013 | Quake et al. |
| 2013/0308756 | A1 | 11/2013 | Bogan et al. |
| 2013/0313336 | A1 | 11/2013 | Doak et al. |
| 2014/0038279 | A1 | 2/2014 | Ingber et al. |
| 2014/0091012 | A1 | 4/2014 | Ros et al. |
| 2014/0263693 | A1 | 9/2014 | Doak et al. |
| 2014/0295572 | A1 | 10/2014 | Fraden et al. |
| 2015/0087559 | A1 | 3/2015 | Putnam et al. |
| 2016/0030658 | A1 | 2/2016 | van der Merwe et al. |
| 2016/0051995 | A1 | 2/2016 | Weierstall et al. |
| 2016/0129443 | A1 | 5/2016 | Tovar et al. |
| 2016/0151784 | A1 | 6/2016 | Chiou et al. |
| 2016/0341675 | A1 | 11/2016 | Doak et al. |
| 2016/0370306 | A1 | 12/2016 | Conrad et al. |
| 2017/0297024 | A1 | 3/2017 | Ros et al. |
| 2017/0274380 | A1 | 9/2017 | Weierstall et al. |
| 2018/0154380 | A1 | 6/2018 | Doak et al. |
| 2019/0134631 | A1 | 5/2019 | Ros et al. |
| 2019/0178822 | A1 | 6/2019 | Ros et al. |
| 2019/0224689 | A1 | 7/2019 | Ros et al. |

FOREIGN PATENT DOCUMENTS

| | | |
|---|---|---|
| WO | 2013075081 A2 | 5/2013 |
| WO | 2014151231 A1 | 9/2014 |
| WO | 2016044545 A1 | 3/2016 |
| WO | 2016164562 A1 | 10/2016 |
| WO | 2017003725 A1 | 1/2017 |
| WO | 2018013685 A1 | 1/2018 |
| WO | 2018217793 A1 | 11/2018 |
| WO | 2018217831 A1 | 11/2018 |

OTHER PUBLICATIONS

Braschler, T., et al. Continuous separation of cells by balanced dielectrophoretic forces at multiple frequencies, Lab on a Chip, 8, 280-286 (Year: 2008).*

Akthakul A. et al., "Size fractionation of metal nanoparticles by membrane filtration", Advanced Materials, vol. 17, Issue 5, pp. 532-535 (2005).

Almen M.S. et al., "Mapping the human membrane proteome: a majority of the human membrane proteins can be classified according to function and evolutionary origin", BMC Biology, vol. 7, Issue 1, pp. 50 (2009).

Bhattacharya S. et al., "Insulator-based dielectrophoretic single particle and single cancer cell trapping", Electrophoresis, vol. 32, Issue 18, pp. 2550-2558 (2011).

Bligh M. et al., "Sorting microparticles into lateral streams using a two-phase rectangular electrokinetic array", Journal of Micromechanics and Microengineering, vol. 18, Issue 4, pp. 045002 (2008).

Boekema E.J. et al., "Evidence for a trimeric organization of the photosystem I complex from the thermophilic cyanobacterium *Synechococcus* sp", FEBS Letters, vol. 217, Issue 2, pp. 283-286 (1987).

Bogunovic et al., Particle sorting by a structured microfluidic ratchet device with tunable selectivity: theory and experiment. Soft Matter 2012, 8 (14), 3900-3907.

Boutet S. et al., "High-Resolution Protein Structure Determination by Serial Femtosecond Crystallography", Science, vol. 337, Issue 6092, pp. 362-364 (2012).

Calzolai L. et al., "Separation and characterization of gold nanoparticle mixtures by flow-field-flow fractionation", Journal of Chromatography A, vol. 1218, Issue 27, pp. 4234-4239 (2011).

Cesaro-Tadic et al., High-sensitivity miniaturized immunoassays for tumor necrosis factor a using microfluidic systems. Lab on a Chip 2004, 4 (6), 563-569.

Chapman H. N. et al., "Femtosecond X-ray protein nanocrystallography", Nature—London, vol. 470, Issue 7332, pp. 73-77 (2011).

Chapman H.N., "X-ray imaging beyond the limits", Nature Materials, vol. 8, Issue 4, pp. 299-301 (2009).

Chen G. et al., "High-Purity Separation of Gold Nanoparticle Dimers and Trimers", Journal of the American Chemical Society, vol. 131, Issue 12, pp. 4218-4219 (2009).

Cheng I.F. et al., "A continuous high-throughput bioparticle sorter based on 3D traveling-wave dielectrophoresis", Lab on a chip, vol. 9, Issue 22 pp. 3193-3201 (2009).

Chinen et al., Nanoparticle Probes for the Detection of Cancer Biomarkers, Cells, and Tissues by Fluorescence. Chemical Reviews 2015, 115 (19), 10530-10574.

Chung et al., Ultrastructural changes of mitochondria in the skeletal muscle of patients with amyotrophic lateral sclerosis. Ultrastruct Pathol 2002, 26 (1), 3-7.

Cordelières, "Manual Tracking," ImageJ plugin, 2005, <https://imagej-nihgov.ezproxy1.lib.asu.edu/ij/plugins/track/track.html> 3 pages.

Cummings E.B. et al., "Dielectrophoresis in Microchips Containing Arrays of Insulating Posts: Theoretical and Experimental Results", Analytical Chemistry, vol. 75, Issue 18, pp. 4724-4731 (2003).

Davalos et al., "Performance impact of dynamic surface coatings on polymeric insulator-based dielectrophoretic particle separators," Anal. Bioanal. Chem. 2008, 390, 847-855.

Dertinger S.K.W. et al., "Generation of Gradients Having Complex Shapes Using Microfluidic Networks", Anal. Chem., 73, 1240-1246 (2001).

(56) References Cited

OTHER PUBLICATIONS

Doak R.B. et al., "Microscopic linear liquid streams in vacuum: Injection of solvated biological samples into X-ray free electron lasers", AIP Conference Proceedings, vol. 1501, pp. 1314-1323 (2012).
Drews et al., Ratcheted electrophoresis for rapid particle transport. Lab on a Chip 2013, 13 (22), 4295-4298.
Duffy et al., "Determination of Properties of Individual Liposomes by Capillary Electrophoresis with Postcolumn Laser-Induced Fluorescence Detection," Anal Chem. 2001, 73, 1855-1861.
Eguchi et al., Giant mitochondria in acute lymphocytic leukemia. Exp Mol Pathol 1987, 47(1), 69-75.
Fernández-Vizarra et al., Isolation of biogenetically competent mitochondria from mammalian tissues and cultured cells. Methods 2002, 26 (4), 292-297.
Fiedler S. et al., "Dielectrophoretic Sorting of Particles and Cells in a Microsystem", Analytical Chemistry, vol. 70, Issue 9, pp. 1909-1915 (1998).
Fromme P et al., "Improved isolation and crystallization of Photosystem I for structural analysis", Biochimica et Biophysica Acta, vol. 1365, Issue 1-2, pp. 175-184 (1998).
Gan et al., "Six Helix Bundle and Triangle DNA Origami Insulator-Based Dielectrophoresis," Anal. Chem. 2013, 85, 11427-11434.
Gascoyne P.R. et al., "Particle separation by dielectrophoresis", Electrophoresis, vol. 23, Issue 13, pp. 1973-1983 (2002).
Gerion D. et al., "Sorting Fluorescent Nanocrystals with DNA", Journal of the American Chemical Society, vol. 124, Issue 24, pp. 7070-7074 (2002).
Giddings, "Unified Separation Science," Wiley ; New York 1991.
Gonzalez et al., Gonzalez, C. F.; Remcho, V. T., Fabrication and evaluation of a ratchet type dielectrophoretic device for particle analysis. Journal of Chromatography A 2009, 1216 (52), 9063-9070.
Gorre-Talini et al., Dielectrophoretic ratchets. Chaos 1998, 8(3), 650-656.
Green N.G. et al., "Dielectrophoresis of Submicrometer Latex Spheres. 1. Experimental Results", Journal of Physical Chemistry B, vol. 103, Issue 1, pp. 41-50 (1999).
Haenggi et al., Artificial Brownian motors: Controlling transport on the nanoscale. Reviews of Modern Physics 2009, 81 (1), 387-442.
Heffner et al., The early effects of ischemia upon skeletal muscle mitochondria. J Neurol Sci 1978, 38 (3), 295-315.
Hellmich W. et al., "Poly(oxyethylene) Based Surface Coatings for Poly(dimethylsiloxane) Microchannels", Langmuir, vol. 21, Issue 16, pp. 7551-7557 (2005).
Holmes D. et al., "On-chip high-speed sorting of micron-sized particles for high-throughput analysis", IEE proceedings Nanobiotechnology, vol. 152, Issue 4, pp. 129-135 (2005).
Holzel et al., "Trapping Single Molecules by Dielectrophoresis," Phys. Rev. Lett. 2005, 95, 128102.
Hornig-Do et al., "Isolation of functional pure mitochondria by superparamagnetic microbeads," Anal. Biochem. 2009, 389, 1-5.
Huang et al., "Current-monitoring method for measuring the electroosmotic flow rate in capillary zone electrophoresis," Anal. Chem. 1988, 60, 1837-1838.
Hunter M.S. et al., "Toward structure determination using membrane-protein nanocrystals and microcrystals", Methods, vol. 55, Issue 4, pp. 387-404 (2011).
Hunter M.S. et al., "X-ray Diffraction from Membrane Protein Nanocrystals", Biophysical Journal, vol. 100, Issue 1, pp. 198-206 (2011).
International Preliminary Report on Patentability for Application No. PCT/US2017/041708 dated Jan. 24, 2019, 8 pages.
International Search Report and Written Opinion for Application No. PCT/US2015/050616 dated Jan. 18, 2016, 11 pages.
International Search Report and Written Opinion for Application No. PCT/US2017/041708 dated Oct. 23, 2017, 9 pages.
International Search Report and Written Opinion for Application No. PCT/US2018/033944 dated Sep. 26, 2018, 14 pages.
International Search Report and Written Opinion for Application No. PCT/US2018/033989 dated Jul. 20, 2018, 13 pages.
Jeon N.L. et al., "Generation of Solution and Surface Gradients Using Microfluidic Systems", Langmuir, 16, 8311-8316 (2000).
Jones et al., "Continuous Separation of DNA Molecules by Size Using Insulator-Based Dielectrophoresis," Anal. Chem. 2017, 89, 1531-1539.
Jordan P. et al., "Three-dimensional structure of cyanobacterial photosystem I at 2.5 A resolution", Nature, vol. 411, Jun. 21, pp. 909-917 (2001).
Jores K. et al., "Investigations on the structure of solid lipid nanoparticles (SLN) and oil-loaded solid lipid nanoparticles by photon correlation spectroscopy, field-flow fractionation and transmission electron microscopy", Journal of Controlled Release, vol. 95, Issue 2, pp. 217-227 (2004).
Kale et al., Continuous-flow dielectrophoretic trapping and patterning of colloidal particles in a ratchet microchannel. Journal of Micromechanics and Microengineering 2014, 24 (7) 6 pages.
Kang et al., Separation of mitochondria by flow field-flow fractionation for proteomic analysis. Analyst 2008, 133 (4), 505-515.
Kim et al., "Deterministic Ratchet for Sub-micrometer (Bio)particle Separation," Anal. Chem., 2018, 90 (7), pp. 4370-4379.
Kim et al., "Dynmanic Constriction Insulator-Based Dielectrophoresis for Particle Manipulation," 2016, 1 page.
Kissick D.J. et al., "Second-Order Nonlinear Optical Imaging of Chiral Crystals", Annual Review of Analytical Chemistry, vol. 4, pp. 419-437 (2011).
Kralj J.G. et al., "Continuous Dielectrophoretic Size-Based Particle Sorting", Analytical Chemistry, vol. 78, Issue 14, pp. 5019-5025 (2006).
Lapizco-Encinas B.H. et al., "Insulator-based dielectrophoresis for the selective concentration and separation of live bacteria in water", Electrophoresis, vol. 25, Issue 10-11, pp. 1695-1704 (2004).
Latham A.H. et al., "Capillary Magnetic Field Flow Fractionation and Analysis of Magnetic Nanoparticles", Analytical Chemistry, vol. 77, Issue 15, pp. 5055-5062 (2005).
Li N. et al., "Parallel mixing of photolithographically defined nanoliter volumes using elastomeric microvalve arrays", Electrophoresis, 26, 3758-3764 (2005).
Liao et al., "Nanoscale Molecular Traps and Dams for Ultrafast Protein Enrichment in High-Conductivity Buffers," J. Am. Chem. Soc. 2012, 134, 8742-8745.
Lin et al., Highly selective biomechanical separation of cancer cells from leukocytes using microfluidic ratchets and hydrodynamic concentrator. Biomicrofluidics 2013, 7 (3) ; 034114.
Loutherback et al., Deterministic Microfluidic Ratchet. Physical Review Letters 2009, 102, 045301.
Lundstrom K., "Structural genomics and drug discovery", Journal of Cellular and Molecular Medicine, vol. 11, Issue 2, pp. 224-238 (2007).
Luo et al., Insulator-based dielectrophoresis of mitochondria. Biomicrofluidics 2014, 8 (2), 021801.
Luo, J. H.; Muratore, K. A.; Arriaga, E. A.; Ros, A., Deterministic Absolute Negative Mobility for Micro- and Submicrometer Particles Induced in a Microfluidic Device Analytical Chemistry 2016, 88 (11), 5920-5927.
Majewski P. et al., "Synthesis, Surface Modifications, and Size-Sorting of Mixed Nickel-Zinc Ferrite Colloidal Magnetic Nanoparticles", Chemistry: a European journal, vol. 14, Issue 26, pp. 7961-7968 (2008).
Marquet et al., Rectified motion of colloids in asymmetrically structured channels. Physical Review Letters 2002, 88 (16) 168301.
Martinez-Duarte R. et al., "Microfabrication technologies in dielectrophoresis applications—A review", Electrophoresis, vol. 33, Issue 21, pp. 3110-3132 (2012).
Martinez-Lopez et al., "Characterization of electrokinetic mobility of microparticles in order to improve dielectrophoretic concentration," Anal Bioanal. Chem. 2009, 394, 293-302.
Matias et al., Giant mitochondria and intramitochondrial inclusions in benign thyroid lesions. Ultrastruct Pathol 1991, 15 (3), 221-9.
Mcfaul et al., Cell separation based on size and deformability using microfluidic funnel ratchets. Lab on a Chip 2012, 12 (13), 2369-2376.
Michelsen et al., Isolation of Subcellular Organelles and Structures. Methods in Enzymology 2009, 463, 305-28.

(56) References Cited

OTHER PUBLICATIONS

Morgan et al., Separation of submicron bioparticles by dielectrophoresis. Biophysical Journal 1999, 77 (1), 516-525.
Muller T. et al., "A 3-D microelectrode system for handling and caging single cells and particles", Biosensors & Bioelectronics, vol. 14, Issue 3, pp. 247-256 (1999).
Spence et al., (2012). "X-ray lasers for structural and dynamic biology". Reports on Progress in Physics, 75, 102601.
Nakano A. et al., "Tuning direct current streaming dielectrophoresis of proteins", Biomicrofluidics, vol. 6, Issue 3, pp. 34108 (2012).
Nakano et al., "Temporal and Spatial Temperature Measurement in Insulator-based Dielectrophoretic Devices," Analytical Chemistry (2014) 86, 6516-6524.
Nakano et al., Immunoglobulin G and bovine serum albumin streaming dielectrophoresis in a microfluidic device. Electrophoresis 2011, 32 (17), 2314-2322.
Navratil et al., Giant mitochondria do not fuse and exchange their contents with normal mitochondria. Exp Cell Res 2008, 314 (1), 164-72.
Nelson et al., "Three-dimensional-printed gas dynamic virtual nozzles for x-ray laser sample delivery". Optics Express, 2016, 24, 11515-11530.
Novak J P. et al., "Purification of Molecularly Bridged Metal Nanoparticle Arrays by Centrifugation and Size Exclusior Chromatography", Analytical Chemistry, vol. 73, Issue 23, pp. 5758-5761 (2001).
Ozuna-Chacon S. et al., "Performance characterization of an insulator-based dielectrophoretic microdevice", Electrophoresis, vol. 29, Issue 15, pp. 3115-3222 (2008).
Pamme N. et al., "Continuous sorting of magnetic cells via on-chip free-flow magnetophoresis", Lab on A Chip, vol. 6, Issue 8, pp. 974-980 (2006).
Pamme N. et al., "On-Chip Free-Flow Magnetophoresis: Continuous Flow Separation of Magnetic Particles and Agglomerates", Analytical Chemistry, vol. 76, Issue 24, pp. 7250-7256 (2004).
Papadimitriou et al., Giant mitochondria with paracrystalline inclusions in paraganglioma of the urinary bladder correlation with mitochondrial abnormalities in paragangliomas of other sites. Ultrastruct Pathol 1994, 18 (6), 559-64.
Pethig, Review Article—Dielectrophoresis: Status of the theory, technology, and applications. Biomicrofluidics 2010, 4 (2) 022811-1-022811-35.
Pohl H.A. et al., "Di Electrophoresis of Cells", Biophysical Journal, vol. 11, pp. 711-727 (1971).
Pohl H.A. et al., "Dielectrophoretic Force", J Theor. Biol., vol. 37, pp. 1-13 (1972).
Pohl, Dielectrophoresis : The Behavior of Neutral Matter in Nonuniform Electric Fields. Cambridge ; New York : Cambridge University Press 1978.
Pommer M.S. et al., "Dielectrophoretic separation of platelets from diluted whole blood in microfluidic channels", Electrophoresis, vol. 29, Issue 6, pp. 1213-1218 (2008).
Redecke L. et al., "Natively Inhibited Trypanosoma brucei Cathepsin B Structure Determined by Using an X-ray Laser", Science, vol. 339, Issue 6116, pp. 227-230 (2013).
Regtmeier et al., "Dielectrophoretic manipulation of DNA: Separation and polarizability," A. Anal. Chem. 2007, 79, 3925-3932.
Regtmeier et al., Acceleration of absolute negative mobility. Journal of Separation Science 2007, 30 (10), 1461-1467.
Fromme P. et al., "Femtosecond nanocrystallography using X-ray lasers for membrane protein structure determination". Current Opinion in Structural Biology, vol. 21, Issue 4, pp. 509-516 (2011).
Safarik et al., Magnetic techniques for the isolation and purification of proteins and peptides. Biomagn Res Technol 2004, 2, 7, 18 pages.
Salomon S. et al., "A dielectrophoretic continuous flow sorterusing integrated microelectrodes coupled to a channel cnstriction". Electrophoresis, vol. 32, Issue 12, pp. 1508-1514 (2011).
Schubert W.D. et al., "Photosystem I of Synechococcus elongatus at 4 A Resolution: Comprehensive Structure Analysis", Journal of Molecular Biology, vol. 272, Issue 5, pp. 741-769 (1997).
Shafiq et al., Giant mitochondria in human muscle with inclusions. Arch Neurol 1967, 17 (6), 666-71.
Mafune, F, et al., "Microcrystal Delivery by Pulsed Liquid Droplet for Serial Femtosecond Crystallography", Acta Crystallographica Section D, Apr. 2016 [available online Mar. 2016], vol. 72, Part 4, pp. 520-523 <DOI:10.1107/S2059798316001480>.
Roessler, C. et al., "Acoustic Injectors for Drop-On-Demand Serial Femtosecond Crystallography", Structure, Apr. 2016 [available online Mar. 2016], vol. 24, No. 4, pp. 631-6410, S1-S19.
U.S. Appl. No. 15/930,239, filed May 12, 2020, Ros et al.
U.S. Appl. No. 15/930,313, filed May 12, 2020, Ros et al.
Devaraju, N. et al., "Pressure driven digital logic in PDMS based microfluidic devices fabricated by multilayer soft lithography", Lab on a Chip, Nov. 2012, vol. 12, No. 22, pp. 4809-4815 <DOI:10.1039/c2lc21155f>.
Kung, Y-C. et al., "Tunable dielectrophoresis for sheathless 3D focusing", IEEE International Conference on Micro Electro Mechanical Systems (Estoril, Portugal, Jan. 18-22, 2015), 2015 (Date added to IEEE Xplore: Mar. 2015), pp. 196-199 <DOI:10.1109/MEMSYS.2015.7050920>.
"Spence J.C. et al., ""X-ray lasers for structural and dynamic Biology"", Rep Prog Phys, vol. 75, Issue 10, pp. 102601 (2012)".
Sugiura, Y. et al., "Fabrication of Microfluidic Valves Using a Hydrogel Molding Method", Scientific Reports, Aug. 2015, vol. 5, No. 13375, 7 pages <DOI:10.1038/srep13375>.
Tang, S. et al., "Basic Microfluidic and Soft Lithographic Techniques", in: Optofluidics: Fundamentals, Devices and Applications (Ed. Y. Fainmain), 2010, Ch. 2, pp. 7-31.
Tice, J. et al., "A monolithic poly(dimethylsiloxane) electrostatic actuator for controlling integrated pneumatic microsystems", Sensors and Actuators A: Physical, Jul. 2013 (available online Mar. 2013), vol. 196, pp. 22-29 <DOI:10.1016/j.sna.2013.03.020>.
Vidal, C. et al., "Fabrication of Pneumatic Microvalves for PDMS Microfluidic Devices", International Congress of Mechanical Engineering (Gramado, Brazil, Nov. 15-20, 2009), 2009, 7 pages.
Srivastava S.K. et al., "A continuous DC-insulator dielectrophoretic sorter of microparticles", Journal of chromatography. A, vol. 1218, Issue 13, pp. 1780-1789 (2011).
Srivastava S.K. et al., "DC insulator dielectrophoretic applications in microdevice technology: a review", Analytical and Bioanalytical Chemistry, vol. 399, Issue 1, pp. 301-321 (2011).
Srivastava S.K. et al., "Direct current insulator-based dielectrophoretic characterization of erythrocytes: ABO-Rh human blood typing", Electrophoresis, vol. 32, Issue 18, pp. 2530-2540 (2011).
Sturm et al., Ratchets in hydrodynamic flow: more than waterwheels. Interface Focus 2014, 4 (6) 9 pages.
Thoenes et al., On matrix-rich giant mitochondria. Electron microscopic observations on tubular epithelium of the human kidney in the nephrotic syndrome. Z Zellforsch Mikrosk Anat 1966, 75 (2), 422-33.
Unger et al., "Monolithic microfabricated valves and pumps by multilayer soft lithography," Science, 288, 113-16 (2000).
Viefhues M. et al., "Physisorbed surface coatings for poly(dimethylsiloxane) and quartz microfluidic devices", Analytical and Bioanalytical Chemistry, vol. 401, Issue 7, pp. 2113-2122 (2011).
Wampler R.E. et al., "Selective Detection of Protein Crystals by Second Harmonic Microscopy", Journal of the American Chemical Society, vol. 130, Issue 43, pp. 14076-14077 (2008).
Weierstall U. et al., "Injector for scattering measurements on fully solvated biospecies", Review of Scientific Instruments. vol. 83, Issue 3, pp. 035108 (2012).
Yamada et al. "Differential Permeabilization Effects of Ca2+ and Valinomycin on the Inner and Outer Mitochondrial Membranes as Revealed by Proteomics Analysis of Proteins Released from Mitochondria," Mol. Cell Proteomics, 2009, 8, 1265-1277.
Yang et al, "Toward Analysis of Proteins in Single Cells: A Quantitative Approach Employing Isobaric Tags with MALDI Mass Spectrometry Realized with a Microfluidic Platform," Anal. Chem. 2016, 88, 6672-6679.
Yang et al., High Speed Size Sorting of Subcellular Organelles by Flow Field-Flow Fractionation. Analytical Chemistry 2015, 87 (12), 6342-6348.

(56) References Cited

OTHER PUBLICATIONS

Yang J. et al., "Size sorting of Au and Pt nanoparticles from arbitrary particle size distributions", Analytica Chimica Acta, vol. 546, Issue 2, pp. 133-138 (2005).

Yates et al, "Proteomics of organelles and large cellular structures," Nat. Rev. Mol. Cell Biol. 2005, 6, 702-714.

Zhu J. et al., Dielectrophoretic focusing of particles in a microchannel constriction using DC-biased AC flectric fields, Electrophoresis, vol. 30, Issue 15 pp. 2668-2675 (2009).

Acero et al., "A new flow focusing technique to produce very thin jets," J. Micromech. Microeng., vol. 23, No. 6, p. 065009, 2013.

DePonte, D. P., et al. "Gas Dynamic Virtual Nozzle for Generation of Microscopic Droplet Streams," J. Phys. D. Appl. Phys. 2008, 41, 195505, 7.

Gañán-Calvo et al., "Liquid Capillary Micro/Nanojets in Free-Jet Expansion," Small, vol. 6, No. 7, pp. 822-824, Apr. 2010.

Mancuso, A. P., "The Single Particles, Clusters and Biomolecules and Serial Femtosecond Crystallography instrument of the European XFEL: initial installation", J. Synchrotron Radiation 2019, 26, 660-676.

Martin-Garcia, J. M., et al. "Serial Femtosecond Crystallography: A Revolution In Structural Biology," Arch. Biochem. Biophys. 2016, 602, 32-47.

Ros et al., "Co-flow injection facilitates improved injection for MHz Crystallography," published Mar. 2, 2020, (2 pages).

Vega et al., "Global and local instability of flow focusing: The influence of the geometry," Physics of Fluids, vol. 22, No. 6, p. 064105, Jun. 2010.

Weierstall, U., et al. "Lipidic cubic phase injector facilitates membrane protein serial femtosecond crystallography," Nat. Commun. 2014, 5, 1, 3309.

Wiedorn, M., et al. "Megahertz Serial Crystallography," Nat. Commun. 2018, 9, 1, 4025.

\* cited by examiner

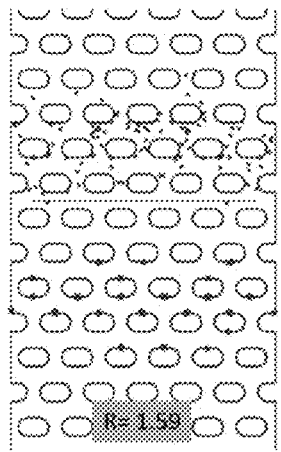
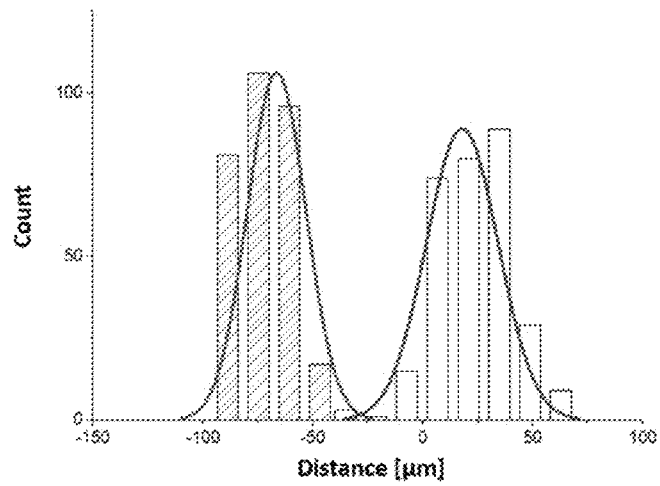
FIG. 3A　　　　　　　　　　FIG. 3B
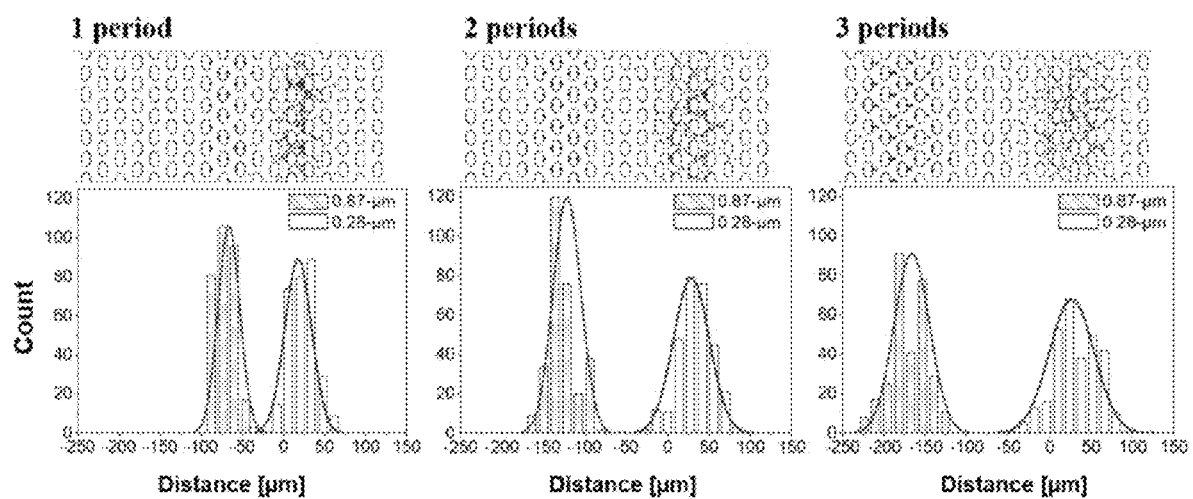
FIG. 4A　　　　　　　　FIG. 4B　　　　　　　　FIG. 4C Video S-1

Read frames from left to right and from top to bottom

Video S-1

Read frames from left to right and from top to bottom

Video S-1

Read frames from left to right and from top to bottom

Video S-1

Read frames from left to right and from top to bottom

Video S-1

Read frames from left to right and from top to bottom

Video S-1

Read frames from left to right and from top to bottom

Video S-1

Read frames from left to right and from top to bottom

Video S-2

Read frames from left to right and from top to bottom

Video S-2

Read frames from left to right and from top to bottom

Video S-2

Read frames from left to right and from top to bottom

Video S-2

Read frames from left to right and from top to bottom

Video S-2

Read frames from left to right and from top to bottom

Video S-2

Read frames from left to right and from top to bottom

Video S-2

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-3

Read frames from left to right and from top to bottom

Video S-4

Read frames from left to right and from top to bottom

Video S-4

Read frames from left to right and from top to bottom

Video S-4

Read frames from left to right and from top to bottom

Video S-4

Read frames from left to right and from top to bottom

Video S-4

Read frames from left to right and from top to bottom

Video S-4

Read frames from left to right and from top to bottom

DETERMINISTIC RATCHET FOR SUB-MICROMETER BIOPARTICLE SEPARATION

CROSS REFERENCE TO RELATED APPLICATIONS

This application is a non-provisional of and claims the benefit of U.S. Provisional Patent Application No. 62/607,820, filed on Dec. 19, 2017, which is hereby incorporated by reference in its entirety.

STATEMENT REGARDING FEDERALLY SPONSORED RESEARCH

This invention was made with government support under R01 GM127562 awarded by the National Institutes of Health. The government has certain rights in the invention.

BACKGROUND OF THE INVENTION

The vast complexity of biological particles requires efficient strategies for separation and fractionation in order to study variations of biomolecular signatures qualitatively and quantitatively. Bioparticles span a large size range comprising, for example, several orders of magnitude from a few hundred nanometers to several tens of micrometers (μm). Typically, mammalian cells have extensions of several tens of micrometers, whereas their sub-cellular organelles are mostly sub-μm sized. The latter are crucial for many cell functions, such as cell metabolism or energy generation and their malfunction can give rise to disease. Other bioparticles such as exosomes comprise ~50-100 nm sized entities, are excreted from cells and thus found in body fluids. The analysis of such small bioparticles is extremely important for diagnostic purposes. Fractionation and separation techniques for such sub-μm bioparticles are, however, scarce limiting fundamental bioanalytical studies and diagnostic applications.

An intrinsic problem in organelle analysis is the complexity of cell lysate from which they need to be recovered. Ultracentrifugation approaches are suitable for separating into specific organelle fractions, such as in differential centrifugation or density gradient centrifugation. Other approaches are based on biomarkers, allowing extraction strategies based on binding to suitable affinity reagents often bound to a solid support such as beads. However, this approach is limited by the selectivity of the affinity reagents and the availability of a biomarker on the target bioparticle. In addition, in some cases, the biological malfunction may be associated with the size of the bioparticles requiring effective methods for separation of sub-populations by size to further study the underlying biomolecular causes of malfunction. This is apparent for mitochondria and lipid droplets, where abnormally sized or giant organelles indicate malfunction of cells. They have been attributed to playing a role in diseases such as amyotrophic lateral sclerosis and atrophy, lesions, acute lymphocytic leukemia, Huntington's disease, paraganglioma and kidney nephrotic syndrome.

As noted above, methods allowing fractionation of organelles by size are limited and only a few approaches based on free flow fractionation or continuous sorting in a microdevice have been previously demonstrated. Ratchet migration mechanisms have been demonstrated to induce size selective transport. Such migration mechanisms typically involve an asymmetric structure, a periodic driving force for particles, and a stochastic element such as Brownian motion. The interplay of these 'ingredients' allows transport at zero applied force, size-selective transport, and under-selected conditions steering of differently sized particles into opposite directions. Ratchet devices have been used for fast transport of particles and have shown to induce separation in periodic systems with broken spatial symmetry, or with symmetrical post arrays when combined with hydrodynamic flow. However, applications for biological particles are often limited to objects of similar size to whole cells, not allowing the application for sub-μm sized particles, such as organelles.

Designing ratchet devices for sub-μm particles typically requires designing nm-sized features to restrict particle migration into a specific direction and induce a ratchet-like migration. However, combining ratchet concepts with additional trapping forces, such as for example, dielectrophoresis can lead to deterministic ratchet transport, as recently shown for μm-sized latex beads. Such concepts can in principle also be applied to bioparticles, but the complexity of the structural design elements inducing ratchet migration and the interplay of the underlying dielectrophoretic forces require detailed analysis of the involved size selectivity, which has not been addressed comprehensively.

Dielectrophoresis (DEP) refers to the migration of polarizable particles in a non-uniform electric field. The DEP force scales with the particle size to the third power as well as the electric field gradient, thus providing a tunable parameter for size-based separation of μm- and sub-μm sized particles. Recently, DEP has been used to induce ratchet migration as a tool for trapping and patterning colloidal particles and for analyzing particles differing in their electrical properties. Also, a Brownian ratchet employing dielectrophoretic potential barriers has been used for latex particles.

SUMMARY OF THE INVENTION

In some embodiments, the device described herein utilizes a novel migration mechanism capable of separating sub-μm sized species by size using a deterministic DEP-based ratchet device. A deterministic DEP-based ratchet separation is realized in a non-linear microfluidic post array. Specifically, a microchannel in a microfluidic chip comprises a periodic array of micro-post including, for example, a constant distance with a period of 20 μm between rows of the array, where each second row is shifted in the x-direction (laterally) by 12.5 μm compared to the previous row. This creates a symmetric structure to which an asymmetric periodic electrical potential including a periodic electro-kinetic flow and dielectrophoretic trapping force was applied to induce migration in the microfluidic channel. Ratchet behavior was experimentally demonstrated with sub-μm particles (0.87 μm) whereas 0.28 μm beads showed normal migration when subject to the same electric conditions. It is thus envisioned that this novel migration mechanism is applicable to a wide range of separation problems in which size selectivity is required, such as in the fractionation of organelles and their subpopulations, in nanotechnology-based applications or as fractionation method for protein nanocrystals.

One objective or purpose for DEP-based ratchet mechanism is to apply this mechanism for analyzing subcellular level organelles. This is important because resolving the heterogeneity of particle populations by size is important when the particle size is a signature of abnormal biological properties leading to disease. Accessing size heterogeneity in the sub-micrometer regime is particularly important to resolve populations of sub-cellular species or diagnostically relevant bioparticles.

In some embodiments, the device and methods described herein can be applied to micro- and nano-sized particles, biological cells or subcellular species, such as endosomes and exosomes, crystals, natural or artificial DNA, viruses, bacteria, pathogens in comparable size ranges.

This is the first experimental realization of directing differently sized sub-micron particles into opposite directions by DEP-based ratchets with substantially improved average migration velocities as compared to previous absolute negative mobility approaches. Consequently, the versatile DEP-based ratchet is a powerful separation method and can be applied to a wide range of separation (from few hundred nanometers to micron size of particles) problems in which critical size selectivity is required.

DEP-based ratchet devices can be applied to separating sub-µm sized species by size. The selection of sizes to be separated from other species can be adjusted by modifying the voltage application protocol. Furthermore, this device showed separation capabilities of six different particle species in the sub-µm size range and demonstrated the application for organelles in a microfluidic device which exhibits fast migration allowing separation in tens of seconds. This allows application for a wide variety of size-varying analytes and provides flexibility for the device to be used for various analytes including sub-micron biological particles. The device can be up-scaled to high throughput applications, allowing the study of proteins and metabolites in sub-population fractions of organelles.

In some embodiments, a system for separating sub-micrometer sized bioparticles comprises a structure. The structure includes a microfluidic channel and a plurality of micro-posts disposed within the microfluidic channel. A fluidic sample is stored in the microfluidic channel. The fluidic sample includes sub-micrometer sized bioparticles. An electric field source is configured to apply an electric field gradient to the fluidic sample to induce transport of sub-micrometer sized bioparticles in the fluidic sample. The electric field source is driven with a first waveform for a first period of time, and a second waveform is applied with the first waveform for a second period of time to separate the sub-micrometer sized bioparticles by size.

In some embodiments, a method for separating sub-micrometer sized bioparticles comprises storing a fluidic sample in microfluidic channel. The microfluidic channel comprising a structure that has a plurality of micro-posts. An electric field gradient is applied by an electric field source to the fluidic sample to induce transport of sub-micrometer sized bioparticles in the fluidic sample. The electric field source is driven with a first waveform for a first period of time. A second waveform is applied with the first waveform for a second period of time to separate the sub-micrometer sized bioparticles by size.

In some embodiments, a system for separating sub-micrometer bioparticles by size utilizing ratchet migration comprises a microfluidic channel. A structure is configured within the microfluidic channel. The structure includes an array of posts arranged in rows, where some rows of posts in the array are shifted in a lateral direction relative to other rows of posts in the array. A reservoir is disposed at each of two opposite ends of the microfluidic channel. An electrode is immersed into fluid in each of the reservoirs. A biased alternating electrical potential is applied via the electrodes. The biased alternating electrical potential comprises a first waveform with a first frequency that induces electro-kinetic flow of sub-micrometer bioparticles in the microfluidic channel, and an intermittent superimposed second waveform with a second higher frequency. The second waveform selectively induces a dielectrophoretic trapping force to selectively impart ratchet migration based on particle size for separating the sub-micrometer bioparticles by particle size in the microfluidic channel.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the United States Patent Office upon request and payment of the necessary fee.

FIG. 3A is a snapshot image of particle end positions after one complete period as obtained from the numerical model, in accordance with some embodiments.

FIG. 3B is a histogram and Gaussian fit of the particle end positions, in accordance with some embodiments.

FIGS. 4A-4C illustrates histogram and Gaussian fit for the 0.87 µm (red) and 0.28 µm (blue) beads and provide a comparison of the resolution at the end of multiple periods, in accordance with some embodiments.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one example, materials for assembling a system and executing a method for a deterministic ratchet for sub-micrometer particle separation include a 0.28-μm-diameter (FP-0262-2) and 0.87-μm-diameter (FP-0852-2) polystyrene beads that exhibit negative surface charges. In this example, the polystyrene beads were purchased from Spherotech (Lake Forest, Ill., USA). SYLGARD® 184 silicone elastomer kit for polydimethylsiloxane (PDMS) was purchased from Dow Corning Corporation (Midland, Mich., USA). 4-(2-hydroxyethyl)piperazine-1-ethanesulfonic acid (HEPES), poly(ethylene glycol)-block-poly(propylene glycol)-blockpoly(ethylene glycol) (brand name Pluronic® F108), potassium hydroxide (KOH), potassium chloride (KCl), potassium phosphate dibasic anhydrous (K2HPO4), magnesium chloride (MgCl2), dimethyl sulfoxide (DMSO), and sucrose were purchased from Sigma-Aldrich (St. Louis, Mo., USA). Deionized (DI) water was obtained from a Synergy purification system (Millipore, USA). Fisherbrand® Plain Microscope glass slides (75×50×1.0 mm; USA) were purchased from Thermo Fisher Scientific Inc. (Waltham, Mass., USA). Gold-Seal coverslips were purchased from Electron Microscopy Sciences (48×60 mm, No. 1; Hatfield, Pa., USA). Platinum wire was purchased from Alfa Aesar (Ward Hill, Mass., USA).

Figure 1A:
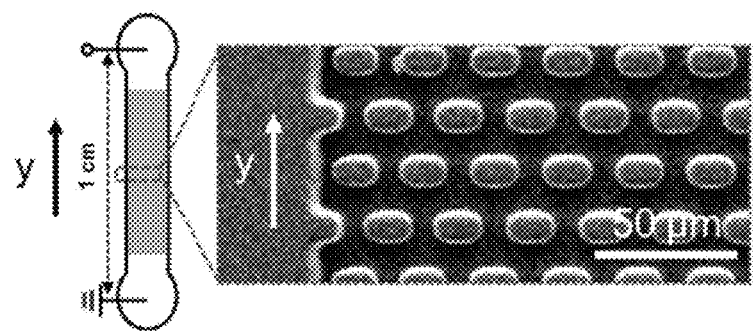
FIG. 1A illustrates a top view of a microfluidic channel including a post array region and an enlargement including a partial view of the post region, in accordance with some embodiments.

FIG. 1A illustrates a top view of an exemplary 1-cm long microfluidic channel substrate (or structure). A shaded area (gray) indicates a post array region in the substrate. In some embodiments, the substrate may be made of PolyDimethylSiloxane (PDMS). The enlarged area shows a scanning electron microscope (SEM) image of a partial view of a PDMS post region in a microfluidic channel. Electrodes are immersed into the reservoirs of the microfluidic channel to apply potentials across the microchannel. In some embodiments the reservoirs may have a 2-mm-diameter; however, the disclosure is not limited in this regard. In this example, a silicon master wafer patterned with the inverse of the microfluidic structures was fabricated by photolithography. The master wafer was employed for elastomer molding using soft lithography. The PDMS silicone elastomer base and curing agent were mixed at a 10:1 ratio (w/w), poured onto the master wafer, degassed under vacuum, and cured in an oven for at least 4 h at 80° C. The PDMS mold was then peeled off from the master wafer resulting in channels with a depth of 10 μm, and 2-mm-diameter reservoirs were manually punched at the channel ends. The PDMS mold was then cleaned with isopropanol and distilled water and was dried in a stream of nitrogen. A glass slide was cleaned, dried and then spin-coated at 1300 rpm for 30 seconds with PDMS pre-polymer similarly prepared as the PDMS mold. Subsequently, the PDMS-coated glass was placed in an oven for at least 4 hours at 80° C. resulting in an approximately 20 μm thick PDMS layer. In order to minimize the PDMS autofluorecence, the PDMS mold comprising the microchannel and the PDMS-coated glass were exposed to UV light for 1 hour. Then they were treated with oxygen plasma (PDC-001; Harrick Plasma, Ithaca, N.Y., USA) at high RF for 1 min and assembled to form a sealed microchannel. The microfluidic channel was 1 cm long and included an array of posts. Although the above described microfluidic channel structure is described in detail, the disclosure is not limited in this regard and other microfluidic structures or variations of the above example may be utilized to implement the deterministic ratchet for sub-micrometer particle separation. The post distance in one row, the distance from row to row and the dimensions of the post base can be changed. The post can also be changed into differently shaped geometries, such as for example tips, to increase the electric field gradients in the device. The device can be made longer if a very complex mixture is to be separated. The device can be constructed in a way that the separation can be carried out perpendicular to the longitudinal direction. That way a much larger volume can be processed in the order of μL, which will allow the processing of much larger particle and organelle numbers (up to $10^5$ particles envisioned). Also, although the posts shown in FIG. 1A have an oval shape, other shape posts, such as rods, circles, half circles, tip-shaped, or needle shaped, etc. may also be used in the microfluidic channel to implement the ratchet. For example, in systems having triangular posts with a tip, higher electric fields have been measured. Moreover, electrodes may be used instead of post arrays to implement the same ratchet (i.e., using electrode based DEP). For example, 2D or 3D electrodes may be patterned on the channel walls to create the electric field effects for particle separation by size.

Experiments were performed using the exemplary microfluidic device schematically shown in FIG. 1A. After assembly, each channel was filled with solution A (1 mM F108, 10 mM HEPES, pH adjusted to 7.4 by KOH, sterile-filtered to 0.2 μm) by capillarity immediately and the chip was placed in a humid environment overnight (16-24 hours) to coat all surfaces with F108. Solution B (250 mM sucrose in solution A, pH 7.4, 0.03 S/m, sterile-filtered to 0.2 μm) was used to prepare the mitochondria or the polystyrene bead suspension (see also below) and to rinse the channel for three times right before use. A 0.5-cm-thick PDMS holder was employed to increase reservoir volume and provide stability for the electrodes on top of the assembled device. The prepared bead or mitochondrial suspension was added to an inlet reservoir and solution B to another reservoir. Mineral oil was added on top of the liquid layer in both reservoirs to prevent evaporation. Pt electrodes attached to the reservoirs were connected via micro-clamps (LabSmith, Livermore, Calif., USA) to an AC power supply from a high voltage amplifier (AMT -3B20, Matsusada Precision Inc.) driven through a Multifunction DAQ card (USB X Series, National Instruments, TX, USA) programmed by LabVIEW 2014 (version 14.0, National Instruments).

The bead suspension was prepared by diluting 1 μL original bead suspension from the manufacturer in 100 μL solution B. Then, the beads were rinsed for three times by repeating a procedure of 1 min vortex, centrifugation at 10000 g for 5 min, removing the supernatant and resuspension of the pellet in 100 μL solution B. After rinsing, the bead suspension was sonicated for 1 hour.

The mitochondrial samples were prepared from the liver of a four-week old male C57BL/6 mouse. All mice were housed in a designated clean facility and treated in accordance with protocols approved by the Institutional Animal Care and Use Committee at the University of Minnesota. In general, once the mitochondrial samples were prepared according to the procedures described previously, they were flash-frozen in a liquid nitrogen Dewar. Then, the mitochondrial samples were shipped from the University of Minnesota to Arizona State University on dry ice and stored in a nitrogen Dewar flask when received.

One day prior to the experiment, a vial of the mitochondrial sample was transferred to a −80° C. freezer. At the time of experimentation, 1 mM MitoTracker Green (Life Technologies, USA) stock solution in DMSO was thawed to room temperature, diluted by solution C (100 mM sucrose, 125 mM KCl, 10 mM HEPES, 2 mM K2HPO4, 5 mM MgCl2, pH adjusted to 7.4 by KOH, sterile-filtered to 0.2 μm) and added to mitochondria sample to reach a final concentration of 800 nM MitoTracker Green. The mitochondrial suspension was incubated at 37° C. with gentle shaking (160 RPM) for 15 min and then centrifuged (10000 g) for 10 min followed by removal of the supernatant. The resulting pellet was re-suspended gently in solution B followed by a 5-min centrifugation (10000 g) step. After removing the supernatant, the resulting mitochondrial pellet was re-suspended in solution B.

With respect to detection and data analysis, fluorescence images were acquired with an inverted microscope (IX71, Olympus, Center Valley, Pa., USA) equipped with a 100 W mercury burner (U-RFL-T, Olympus, Center Valley, Pa., USA) and fluorescence filter set (for mitochondria and 0.87-μm beads: exciter ET470/40, dichroic T495LP, emitter ET525/50, Semrock, USA; for 0.28-μm beads: exciter 607/36, emitter 670/39). The migration of mitochondria in the microchannel was visualized by a 60× (UPLSAPO60×W, water immersion, NA=1.20) objective and the bead migration was visualized by the 60× objective or a 40× (LUCPlanFLN, NA=0.60) objective. Images were captured by a CCD camera (QuantEM:512SC, Photometrics, Tucson, Ariz., USA) and Micro-Manager software (version 1.4.7, Vale Lab, UCSF, CA, USA).

The obtained videos (discussed below) for mitochondria or beads were then processed by ImageJ software (version 1.49, NIH). For each data point in the ratchet velocity profile for beads (FIG. 3) or mitochondria (FIG. 4), twenty individual trajectories of beads or mitochondria per microchannel in a complete period at the specific driving conditions were evaluated using the Manual Tracking plugin. The experiment was repeated in three channels for beads and mitochondria, respectively.

Figure 1B:
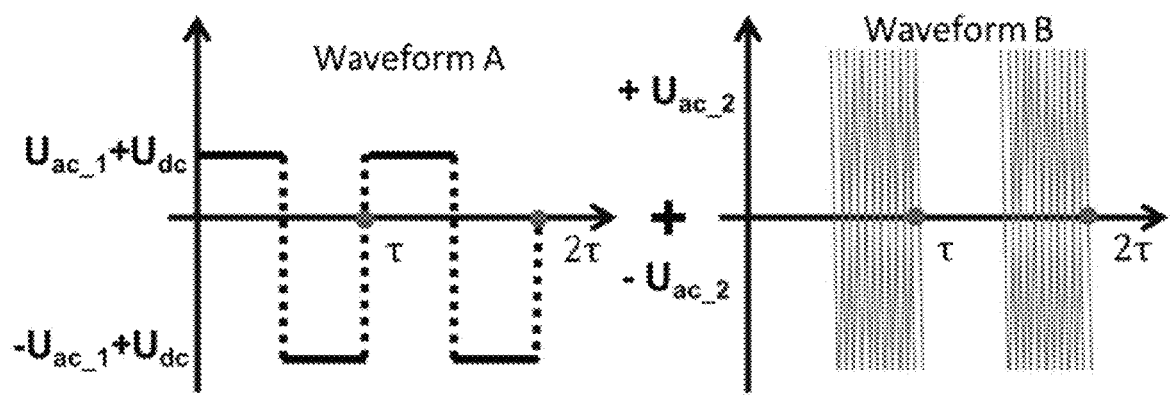
FIG. 1B illustrates a combined time-dependent voltage applied in the experiments and simulations, in accordance with some embodiments.

FIG. 1B illustrates a combined time-dependent voltage that is applied in the experiments and simulations described herein. Waveform A switches periodically between $\pm U_{ac\_1}$ with a DC potential offset, $U_{dc}$, giving rise to a biased voltage (shown here for $U_{dc}<0$). Waveform A is superimposed with a high frequency sinusoidal signal of amplitude $U_{ac\_2}$ and frequency $f$. $\tau$ indicates the length of each complete period, and two periods are depicted here. Although the above described waveforms A and B are described here in detail, the disclosure is not limited in this regard and other waveforms or variations of these waveforms may be utilized to implement the deterministic ratchet for sub-micrometer particle separation. For example, the frequency and amplitude of both $U_{ac\_1}$ and $U_{ac\_2}$ can be changed to induce the ratchet migration for differently sized particles or different bioparticles. If the particles are large, a sufficiently large DC potential might also suffice to induce the ratchet migration. The period and repetition of $U_{ac\_1}$ and $U_{ac\_2}$ might also be changed.

Numerical modeling was performed using COMSOL Multiphysics 5.2a with a model previously described by Luo et al. The model was adapted to reflect the AC waveform employed in this manuscript as shown in FIG. 1B. The non-linear spatially periodic structure was reproduced in the model with the dimensions of virtual walls adapted to the particle sizes used in this paper. Three physical concepts relevant to model the particle migration were: electrokinetic force (EK) which includes electrophoresis (EP) and electroosmosis (EOF), DEP, and Brownian force. To consider an electrokinetic component, the electrokinetic velocity (u) was modeled with electrokinetic mobility ($\mu_{ek}$) values as experimentally determined (see below). It resulted for the 0.28 μm beads ($\mu_{ek\_0.28\_\mu m}$) in $3.24\pm0.41\times10^{-9}$ $m^2\cdot V^{-1}\cdot s^{-1}$, for the 0.87 μm beads ($\mu_{ek\_0.87\_\mu m}$) in $2.52\pm0.45\times10^{-9}$ $m^2\cdot V^{-1}\cdot s^{-1}$, and for the 0.60 μm diameter mitochondria in $2.10\pm0.12\times10^{-9}$ $m^2\cdot V^{-1}\cdot s^{-1}$. DEP was considered through the DEP velocity ($u_{dep}$) and mobility ($\mu_{dep}$). The two particle sizes of 0.28 μm and 0.87 μm diameter were simulated with calculated $\mu_{dep}$ values of $-2.48\times10^{-21}$ $m^4\cdot V^{-2}\cdot s^{-1}$ and $-2.39\times10^{-20}$ $m^4\cdot V^{-2}\cdot s^{-1}$, respectively. For the 0.60 μm diameter mitochondria, $-1.20\times10^{-20}$ $m^4\cdot V^{-2}\cdot s^{-1}$ was used (see below).

Briefly, the static study result of an Electric Current module was combined with a rectangle and an analytic function, resulting in a tunable alternating electric field with a complex waveform represented schematically in FIG. 1B and described with equation 1 (below). The result was then coupled with a time-dependent study using a Creeping Flow module generating an alternating flow profile in which the electrokinetic components were considered. Finally, the particle trajectories were obtained for individual particles considering the DEP force ($F_{dep}$), the drag force ($F_D$), and the Brownian force ($F_B$) with the Particle Tracing for Fluid Flow module according to $$\frac{m_p v}{\Delta t} = F_D + F_{dep} + F_B \quad \text{eq. 1}$$

where, v is the particle velocity, $m_p$ is the particle mass, and $\Delta t$ is the time step. To reflect the electrophoretic force acting on the particles, the electrophoretic mobility was included in $F_D$ as a velocity component. The particle trajectory was then visualized by solving the instant velocity of a particle time-dependently.

In this example, the waveform used to induce migration via applying an electric potential across the entire channel with waveform g(t) is defined as follows:

$$g(t) = \underbrace{\left\{-U_{ac\_1} \times \text{sgn}\left[\sin\left(\frac{2\pi}{\tau}t\right)\right] + U_{dc}\right\}}_{\text{Waveform A}} + \quad \text{eq. 2}$$

$$\underbrace{\left\{U_{ac\_2} \times \frac{1}{2}\left\{\text{sgn}\left[\sin\left(\frac{2\pi}{\tau}t\right)\right] - 1\right\} \times \sin(2\pi f t)\right\}}_{\text{Waveform B}}$$

Figure 2:
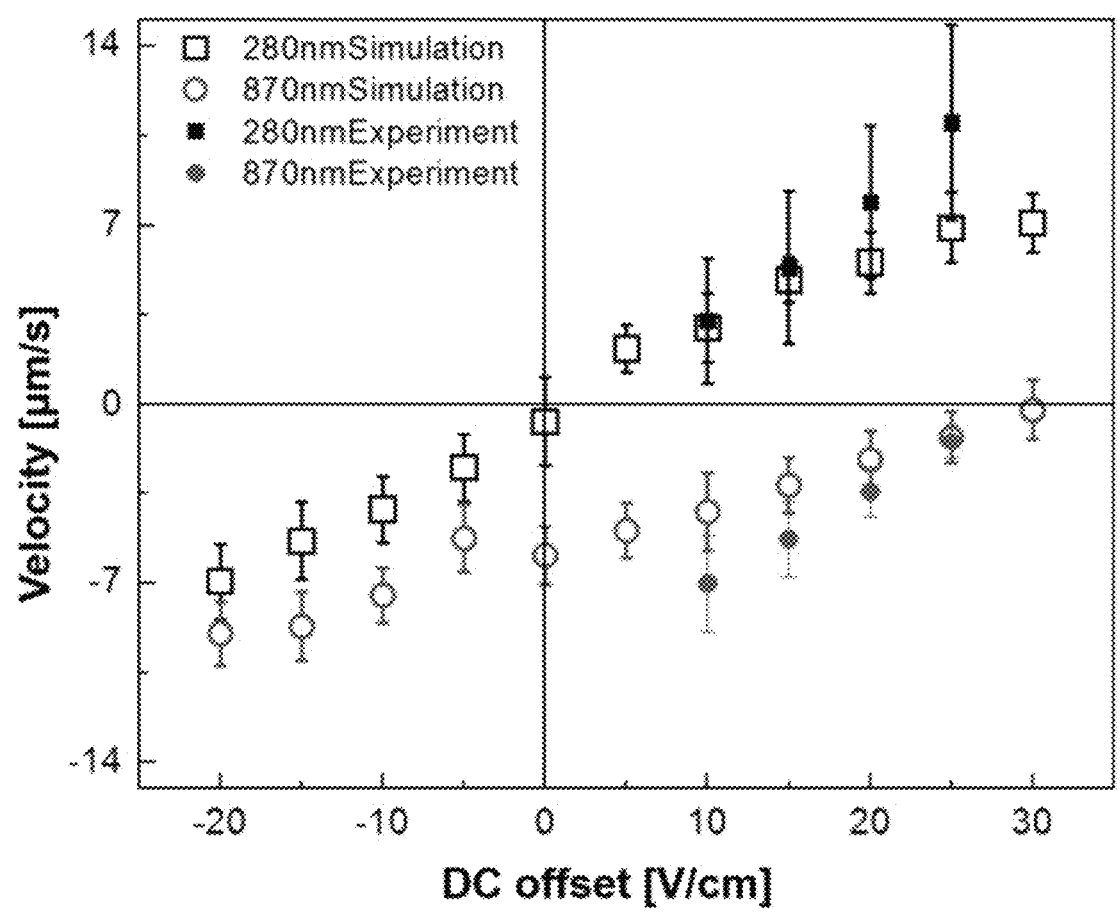
FIG. 2 provides a summary of migration mechanisms for small and large particle species and compares experimental data with numerical modeling data, in accordance with some embodiments.

Here, t is the time, $\tau$ is the period of waveform A and B, and $U_{dc}$ corresponds to the magnitude of the DC offset voltage. $U_{ac\_1}$ and $U_{ac\_2}$ denote the amplitudes for the low frequency and high frequency AC waveforms respectively. The frequency of waveform B is denoted $f$. In the numerical model, the dielectrophoretic force is included via the size-selective particle trapping induced by the magnitude of $U_{ac\_2}$. The results obtained from this model are shown in FIG. 2 and discussed in detail below.

A useful parameter to describe separation problems is the resolution, R, which may be defined as:

$$R = \frac{1.18(d_1 - d_2)}{w_1 + w_2} \quad \text{eq. 3}$$

where $d_1$ and $d_2$ refer to the average distance from the initial position and $W_1$ and $W_2$ are the full widths at half maximum of Gaussian fits of the position distribution. R was obtained for both particle number and period variation by extracting the location of both particle sizes after each period from the resulting end coordinates in the COMSOL model. The corresponding positions were represented in a histogram by splitting the data into bins of equal size with Origin software (OriginLab Corp., Northampton, Mass., USA). Then, a Gaussian curve was fitted to the histogram, and the resolution (eq. 3) was calculated from the full width at half maximum for each Gaussian.

The exemplary method and system provided a ratchet device and migration mechanism. To demonstrate the novel DEP-based ratchet for sub-μm sized particles, an exemplary device as depicted in FIG. 1A was employed. This device geometry was chosen to induce the ratchet mechanisms for particles exhibiting negative DEP, such as polystyrene beads or mitochondria. The microchannel included a periodic array of micro-posts as depicted in FIG. 1A. All of the rows had a constant distance with a period of 20 μm whereas each second row was shifted in the x-direction (laterally) by 12.5 μm compared to the previous row. This geometry created a non-linear symmetric structure within a microfluidic channel to which an asymmetric periodic electrical potential (FIG. 1B) was applied to induce migration. The array of posts induces an inhomogeneous electric field in the microfluidic channel, allowing DEP trapping of beads and mitochondria according to insulator-based dielectrophoresis. The migration mechanism thus is composed of a combination of the particles' intrinsic electrokinetic migration, DEP migration, and trapping components.

The applied potentials are shown in a depictive scheme in FIG. 1B and described in equation 1 (see above). Initially, a periodic driving potential comprising a square wave with amplitude $U_{ac\_1}$ is induced, to which a DC offset ($U_{dc}$) is added. Considering this waveform only, electrokinetic migration is induced with opposing directions in the two half periods of waveform A (as long as $|U_{dc}|<|U_{ac\_1}|$). In addition, an AC component of higher frequency with waveform B is overlaid in the second half period of waveform A inducing DEP. (Note that the amplitudes of waveform A are too small to induce DEP trapping, as determined experimentally for the employed particles.) Therefore, if DEP forces are large enough, particle trapping occurs in the second half driving period.

Figure 1C:
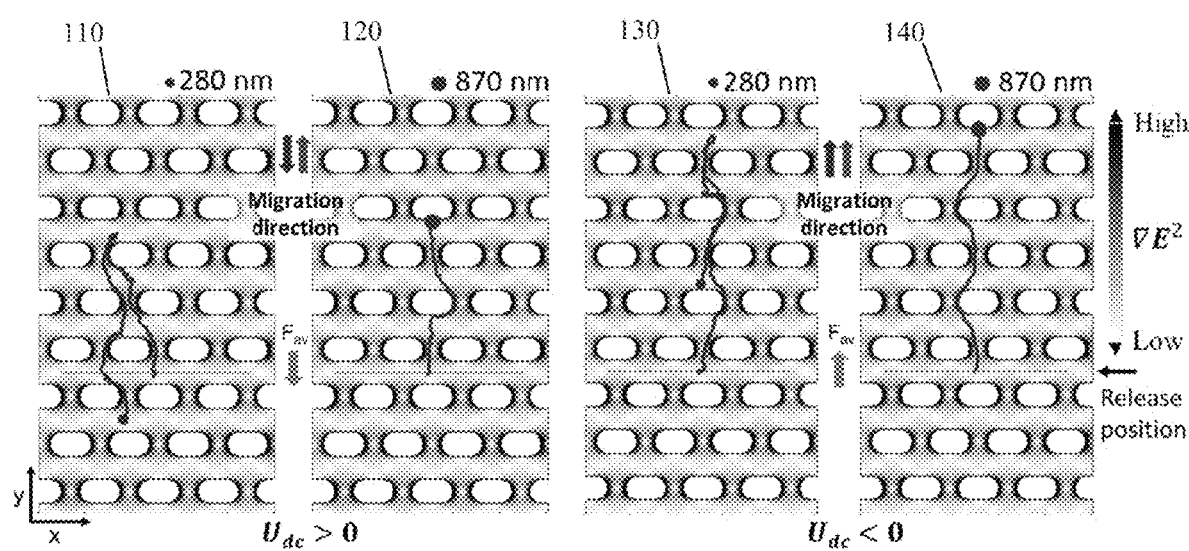
FIG. 1C illustrates bead trajectories obtained from a numerical model for small and large beads, in accordance with some embodiments.

FIG. 1C illustrates an example of bead trajectories obtained from a numerical model for small and large beads. Images 110, 120, 130, and 140 show trajectories obtained from the numerical model for small and large beads. Images 110 and 120 depict the case of a positive offset ($U_{dc}$=10 V) and images 130 and 140 depict the case of a negative offset ($U_{dc}$=-10 V) after one driving period with Uac_1=50 V, $U_{ac\_2}$=800 V (with f=30 kHz) and $\tau$=20 s. Trajectories are shown for 0.87 μm (red) and 0.28 μm (blue) and the distribution of the electric field gradient is shown in gray scale in images 110-140. The electric field is applied along the y-direction. Particles were released at t=0 from the release line (black horizontal line) in images 110-140.

Videos that indicate the migration behavior for the two exemplary particle sizes for selected driving parameters are discussed below (Videos S1 and S2 described with respect to FIGS. 23A-23E and 24A-24E). The example migration of particles for $U_{dc}$>0 results in two paths as shown in FIG. 1C, images 110 and 120:

1) In the path shown in image 110 (blue), particles are too small to induce DEP trapping. Thus, in one entire driving period, the small particle (blue) migrates in one direction first (first half driving period of waveform A), but reverses direction in the second half period (second half driving period of waveform A). The particle ceases migration just below the starting point. See FIG. 1C in image 110.

2) A larger particle shown in image 120 (red), starting at the same position as the blue particle, migrates similarly to the smaller particle in the first half driving period. However, in the second half driving period of waveform A, DEP trapping is induced due to waveform B. As a result, the larger particle is trapped and migration is stalled. DEP trapping occurs at positions near the posts where the electric field gradient is smallest, thus the trapping behavior originates due to negative DEP (nDEP). Correspondingly, the resulting trapping positions are at the flat side of the posts where the electric field gradients are lowest. See FIG. 1C in image 120.

The resulting migration direction of a particle over one entire driving period thus depends critically on the size of the particle and the induced DEP trapping force in the second half driving period. In the $U_{dc}$>0 case, the smaller particles migrate in the opposite direction compared to the larger particles, as can be observed from the positions of the particles after one full driving period. See FIG. 1C in images 110 and 120. Overall, the smaller particles follow the average applied force in the "normal" direction, whereas the larger particles show a ratchet effect i.e. migration in the opposite direction.

For $U_{dc}$<0, however, the two differently sized particles migrate overall into the same direction and show "normal" migration. This can be explained through the detailed migration in the first and second half driving periods of $U_{ac\_1}$. Both particles respond to the applied potential with a migration in the same direction in the first half period of waveform A. See FIG. 1C in images 130 and 140. The larger particles are trapped in the second half period (whereas their response to the first half period is almost identical to that of the smaller particles). The migration of the larger particles is thus primarily governed by the sum of $U_{ac\_1}$ and $U_{dc}$ in the first half driving period. See FIG. 1C in image 140. The smaller particles are not trapped in the second half period and migrate in the opposite direction towards the release position. Since the absolute value of $U_{ac\_1}$ and $U_{dc}$ now is smaller but opposite in sign (than in the first half driving period), the smaller particles cannot migrate fully to the release position. See FIG. 1C in image 130. Overall they also show "normal" migration behavior, but of smaller velocity than compared with the larger particles. As a result, both particles migrate into the same direction overall.

FIG. 2 provides a summary of the above-described migration mechanism for the small and large particle species and compares experimental data with numerical modeling results data. FIG. 2 illustrates an example of velocity variations of 0.28-µm-diameter and 0.87-µm-diameter polystyrene beads (empty symbols represent numerical modeling results and solid symbols represent experimental data) along the microchannel constriction at various $U_{dc}$ offsets. The magnitude of $U_{ac\_1}$ (τ=20s) and $U_{ac\_2}$ (f=30 kHz) were maintained at 50 V and 800 V, respectively. The error bars indicate the standard deviation of average velocity obtained at each $U_{dc}$ offset by tracking 60 individual trajectories from the experimental results, or 40 individual trajectories from the simulation results. At the applied $U_{dc}$ conditions from 0 to +30 V in both the experiment and the numerical modeling, the average velocities of 0.87 µm particles were in the opposite direction to the applied $U_{dc}$, showing apparent ratchet characteristic. Whereas 0.28 µm particles showed the normal response with their migration velocities according to the magnitude of the $U_{dc}$ offset. The model parameters are further described below.

According to the model results shown in FIG. 2, the ratchet signature was apparent for 0.87 µm diameter particles, whereas 0.28 µm diameter particles exhibited normal migration behavior. For positive $U_{dc}$ offset, the larger particles show negative velocities, whereas smaller particles show positive velocities. The larger particles thus migrate in opposite directions compared to the smaller particles. This situation is advantageous for a separation or fractionation approach based on size, since the particles are spatially separated and can easily be collected. For negative $U_{dc}$ offset, both particles migrated in the same direction, however, the larger particle somewhat slower, due to the induced DEP forces. The following description focuses on the situation of positive $U_{dc}$ offset, since largest differences in the migration velocities have been observed in this regime.

To investigate the ratchet migration experimentally, electrical driving parameters matching the numerical model were tested. The recorded migration velocities are shown in FIG. 2 (filled symbols). The observed ratchet migration matches the numerical results in the occurrence of the ratchet migration for the 0.87 µm particles and the normal migration for the smaller 0.28 µm particles. It is apparent that the migration velocities as quantified from the numerical study match experimentally observed values in excellent agreement for large $U_{dc}$ offsets. Only at smaller offsets, the experimentally observed values start to deviate. This discrepancy could be attributed to an overestimation of the dielectrophoretic trapping component as well as an underestimation of the electrophoretic component of the particles in the model. Since $\mu_{ek}$ was experimentally quantified for each particle size and the corresponding values employed in the simulation, the electrophoretic component has been adapted to the experimental conditions and can be excluded as the source of discrepancy within experimental errors. However, $\mu_{dep}$ is more difficult to be accessed experimentally through a direct measurement. $\mu_{dep}$ was estimated based on known dielectric properties of polystyrene beads and measured medium conductivity (see details below). It is noted that $\mu_{dep}$ may change if other polarization mechanisms such as surface conductivity contribute to the DEP behavior of beads which were not considered here. In addition, other sources such as slight differences in the post geometries between experiments and modelled geometry could also attribute to the differences in the migration velocities between model and experiment.

It is further noted that the ratchet mechanism was only observed for amplitudes of $U_{ac\_1}$ between 30 and 50 V (see below and FIG. 6). In this range, the migration velocities were independent of the applied amplitude of $U_{ac\_1}$. In addition, the ratchet mechanism and necessary insulator diectrophoresis (iDEP) trapping were independent of the applied frequency and amplitude of waveform B, as long as trapping was induced. The here observed trapping regime matches previous observations for iDEP trapping of similarly sized beads.

To employ the novel DEP-based ratchet mechanism for separation applications, parameters describing the separation quality are important to assess. Therefore, the framework of the numerical modeling in conjunction with particle tracing analysis was employed to investigate the separation resolution (R) of the DEP-based ratchet mechanism. For this purpose, the particle positions were analyzed for N=40, 100, 300 and 500 particles after n periods (with n=0, 1, 2, . . . ) of length τ. From the resulting particle positions, R can be obtained.

FIG. 3A is a snapshot image of particle end positions after one complete period (20s) as obtained from the numerical model (0.28 µm particles are represented with blue dots and 0.87 µm particles in red). Particles are subject to one driving period at $U_{ac\_1}$=50 V, $U_{dc}$=20 V and $U_{ac\_2}$=800 V at frequency 30 kHz. Particles were released at t=0 from the release line (black horizontal line) in the middle of the channel section. FIG. 3B is a histogram and Gaussian fit of the particle end positions (for N=300 particles). The red curve indicates the Gaussian fit for the 0.87 µm particles and the blue curve for the 0.28 µm particles. The resultant resolution is 1.59. FIG. 3A shows the image of particle positions for driving conditions of $U_{ac\_1}$=50 V, $U_{dc}$=10 V, and $U_{ac\_1}$=800 V at f=30 kHz. Depicted is the case of 300 particles for both small (0.28 µm) and large (0.87 µm) particle diameters. The model allows construction of histograms of particle positions as shown in FIG. 3B, which can be fit with a Gaussian to calculate R according to eq. 3. Particle numbers from 40 up to 500 particles (see FIGS. 7A-7C for these histograms and fits) were investigated but it was shown that the resolution does not change significantly when >100 particles are modelled. Videos showing particle migration and separation with the numerical model are discussed below.

TABLE 1

R obtained at $U_{ac\_1}$ = 50 V and $U_{ac\_2}$ = 800 V, at f = 30 kHz.

| $U_{dc}$ [V] | R |
|---|---|
| 0 | 1.38 |
| 5 | 1.56 |
| 10 | 1.59 |
| 15 | 1.57 |
| 20 | 1.42 |

The numerical model allows retrieving additional information on the parameters influencing the separation resolution (R). Table 1 shows R depending on $U_{dc}$ offset. In all cases, the resolution is satisfying for a separation experiment.

Figure 16:
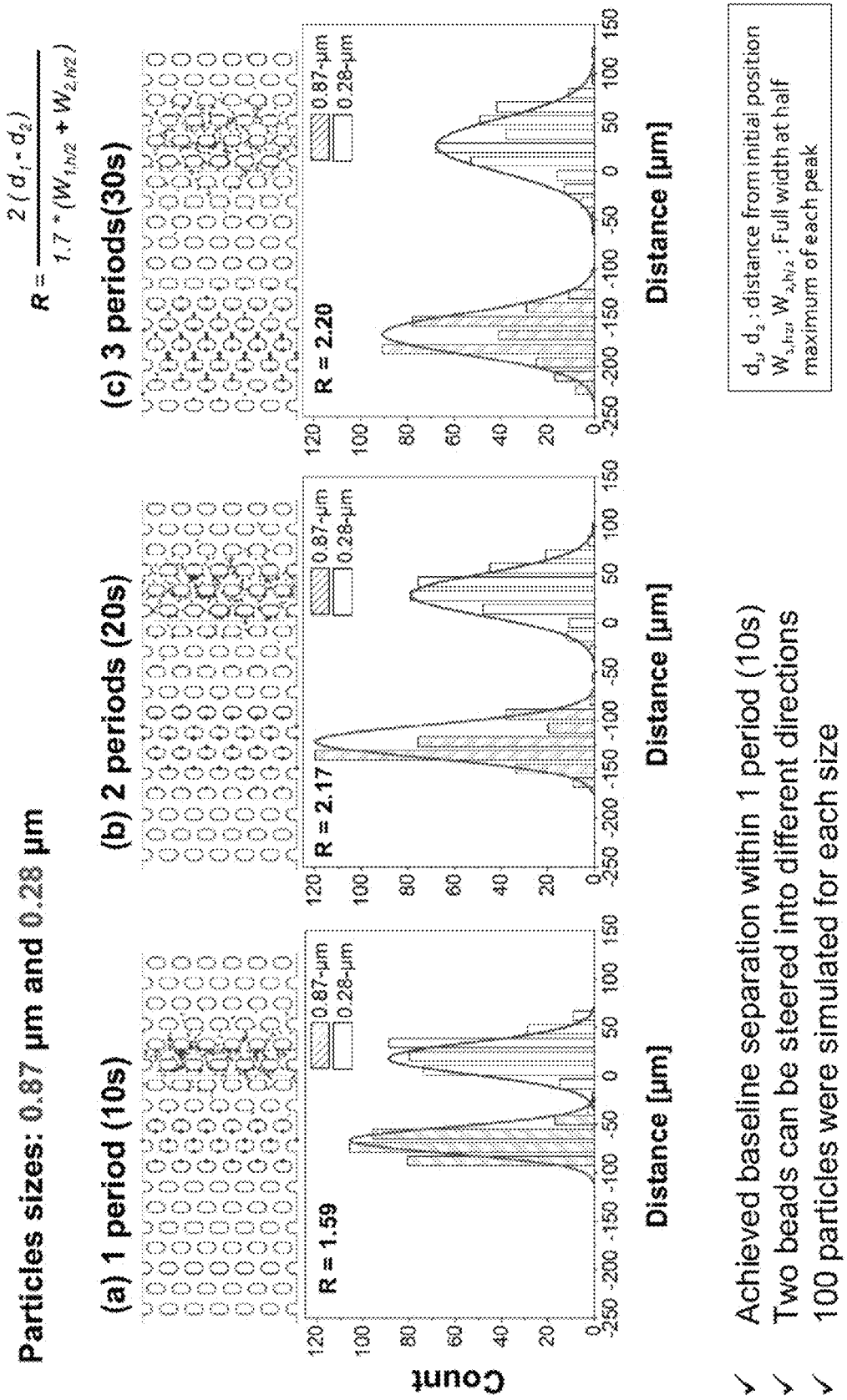
FIG. 16 illustrates variations in particle separation resolution over multiple periods of driving cycles as obtained from a numerical model and shown in FIG. 4, in accordance with some embodiments.

The influence of the number of periods employed is represented in FIGS. 4A-4C. FIGS. 4A-4C illustrate histogram and Gaussian fit for the 0.87 μm (red) and 0.28 μm (blue) beads and provides a comparison of the resolution at the end of multiple periods (n=1, 2, 3). 300 particles were studied at Uac_1=50 V, Udc=10 V and Uac_2=800 V at f=30 kHz (τ=20 s) in the numerical study. FIG. 16 includes additional information about the results shown in FIGS. 4A-4C. The resultant resolution values are 1.59 (for FIG. 4A), 2.17 (for FIG. 4B), and 2.20 (for FIG. 4C). As noted, up to three periods were tested, and not surprisingly, the separation resolution increased from 1.59 to 2.20. A baseline separation was achieved within one 10 second period. As shown in FIGS. 4A-4C and FIG. 16, two beads can be steered into two different directions. Video S-3 described below with respect to FIGS. 25A-25I, indicates the results for three example periods.

Figure 9A:
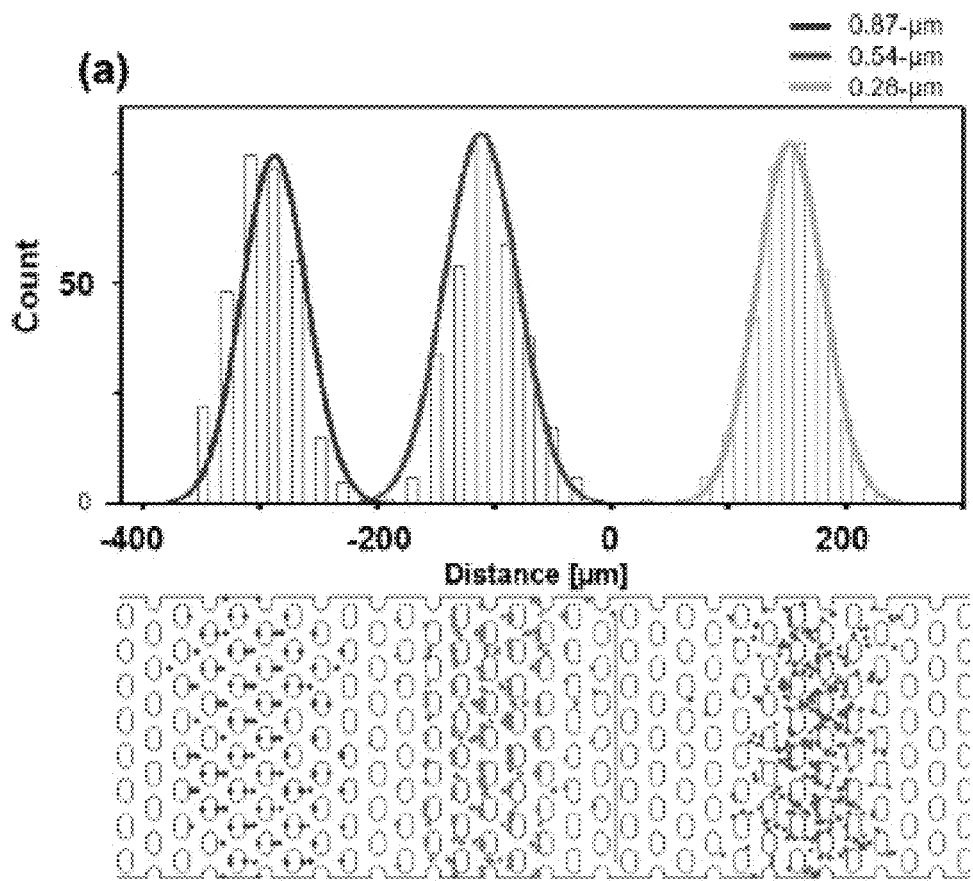
FIGS. 9A-9B illustrate histogram and Gaussian fit for particle positions and corresponding images of the channel section with particle positions at the end of four periods, in accordance with some embodiments.
Figure 9B:
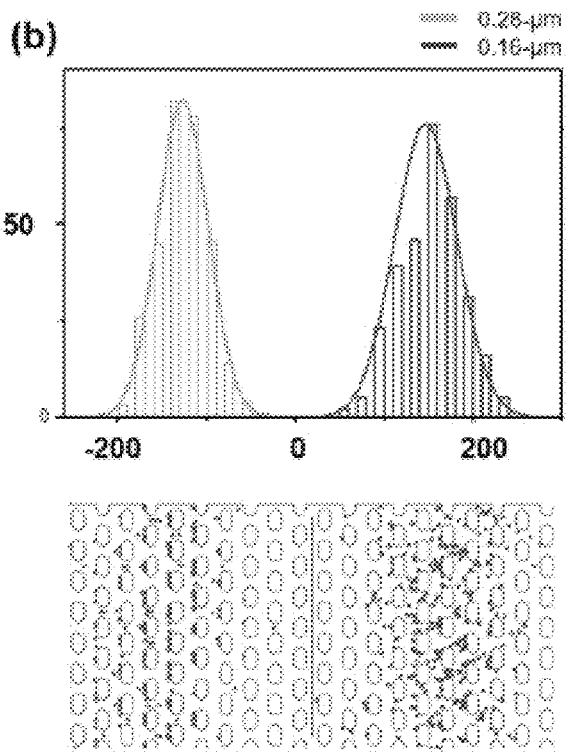

Beyond studying two particle species, studies were extended for four particle size species. FIGS. 9A-9B (top) illustrate histogram and Gaussian fit for particle positions at the end of four periods. Particle sizes include 0.87 (red), 0.52 (green), 0.28 (cyan), and 0.16 (purple) beads. FIGS. 9A-9B (bottom) illustrate corresponding images of the channel section with particle positions at the end of four periods. Referring to FIG. 9A, 300 particles per size were studied at Uac_1=50 V, Udc=10 V, and Uac_2=800 V at ƒ=30 kHz (τ=10 s) with the numerical model. All three particles can be separated with baseline resolution. Referring to FIG. 9B, with Uac_2=1400 V but otherwise same conditions as in FIG. 9A, 0.28 and 0.18 μm particles can be separated with baseline resolution. Note: The illustrated dots are not reflective of particle size and are adjusted for visualization. The distance in micrometers on the x-axis indicates the particle migration distance from the particle release line in the numerical model.

FIG. 9A shows the positions of three differently sized particles for Uac_1=50 V, Udc=10 V, and Uac_2=800 V at ƒ=30 kHz (τ=10 s) after four driving periods. The simulation was carried out with 300 particles each for 0.87 (red), 0.52 (green), and 0.28 μm (cyan) polystyrene beads with a period length of 40 s and n=4. Histograms of the resulting particle location were constructed for the three different particle species and fit with a Gaussian, as shown in FIG. 9A. Particles with sizes above 0.52 μm showed ratchet migration behavior (0.87 and 0.52 μm) and those below showed normal migration. Interestingly, the species with 0.52 and 0.28 μm are well resolved (R=2.19) indicating that the applied conditions allow separation of particles with 240 nm size difference. Also of note, the 0.28 μm particles and 0.16 μm particles can be resolved with baseline resolution for Uac_2=1400 V as shown in FIG. 9B. The represented ratchet migration thus allows for separating sub-micrometer species.

Also tested was the minimum particle size for which a ratchet migration mechanism could be induced. For that purpose, the amplitude of $U_{ac\_2}$ was varied. As shown in Table 2 below, by increasing the applied potential, smaller particles begin to demonstrate ratchet migration at higher applied potentials. By increasing the amplitude of $U_{ac\_2}$, it was noted that the ratchet migration can be induced for particles down to 0.28 μm in size. This was attributed to stronger DEP trapping with higher potentials. As shown in Table 2 (below), 300 particles were studied at each bead size. Positive (+) signs represent normal migration and negative (−) signs represent ratchet migration, respectively.

TABLE 2

Migration behavior obtained at $U_{ac\_1}$ = 50 V with various conditions of $U_{ac\_2}$ at f = 30 kHz.

| Amplitude of | Migration behavior for given size of particle | | | | |
|---|---|---|---|---|---|
| $U_{ac\_2}$ (V/cm) | 0.87 μm | 0.52 μm | 0.28 μm | 0.16 μm | 0.08 μm |
| 1400 | − | − | − | + | + |
| 1000 | − | − | + | + | + |
| 900 | − | − | + | + | + |
| 850 | − | − | + | + | + |

The ratchet mechanism was also investigated for an example bioparticle including isolated mouse hepatic mitochondria for which example size heterogeneity from 300 nm to 1600 nm was verified by dynamic light scattering (see below).

Figure 5:
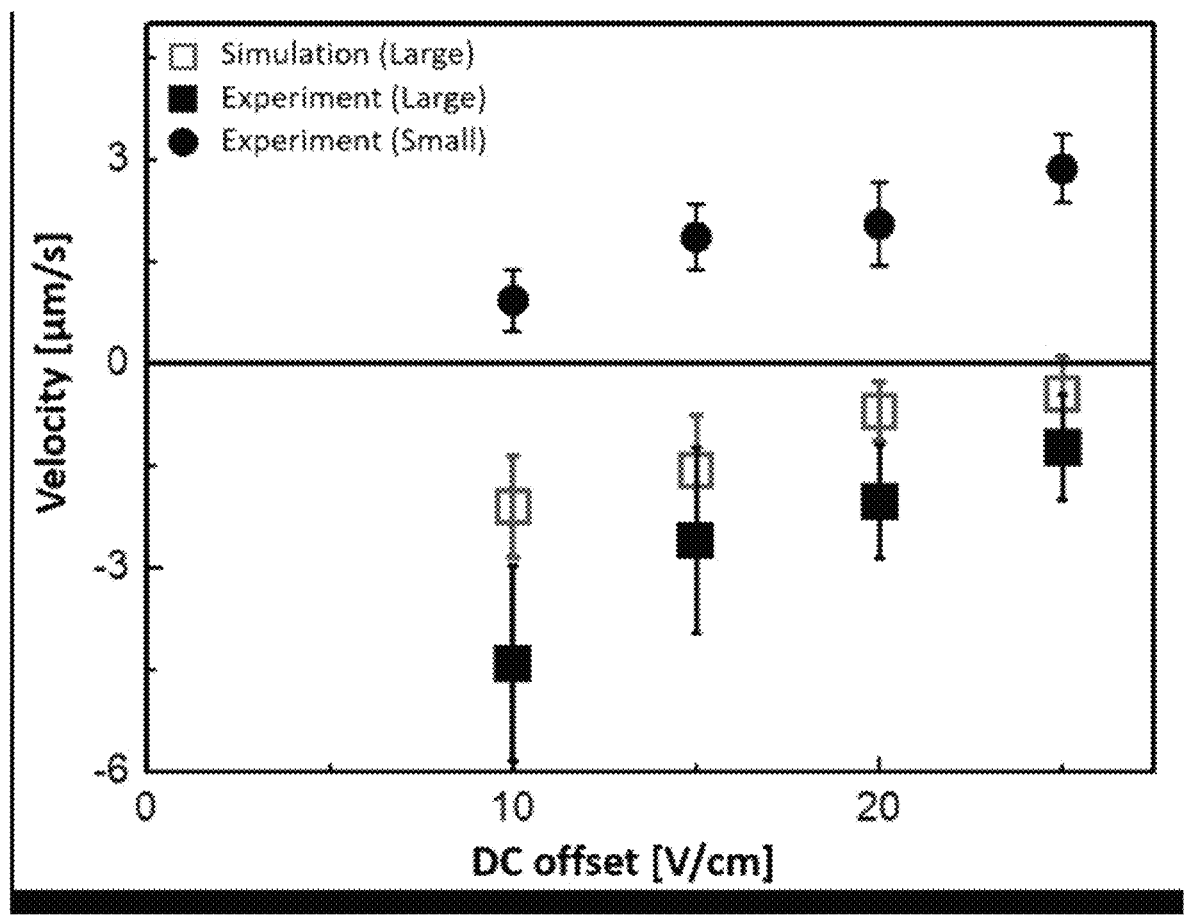
FIG. 5 illustrates experimental and simulation results of velocity vs. $U_{dc}$ offset for the isolated mouse hepatic mitochondria, in accordance with some embodiments.

FIG. 5 illustrates experimental and simulation results of velocity vs. $U_{dc}$ offset for the isolated mouse hepatic mitochondria. The error bars indicate the standard deviation of average velocity obtained at each $U_{dc}$ offset by tracking individual trajectories (10 particles for the small mitochondria and 60 particles for large mitochondria) from the experimental or the simulation results, respectively. Here, $U_{ac\_1}$=35 V for $U_{dc}$=25 V, $U_{ac\_1}$=40 V for $U_{dc}$=20 V, $U_{ac\_1}$=45 V for $U_{dc}$=15 V, and $U_{ac\_1}$=50 V for $U_{dc}$=10 V were applied for one complete period with a $U_{ac\_2}$ of 800 V and f=30 kHz to induce DEP-based ratchet migration. At these experimental conditions, the average migration velocities of large mitochondria (black square) were negative demonstrating the ratchet mechanism and the average migration velocities of small mitochondria (black circles) were positive showing the normal migration. Red open squares indicate simulation results for 600 nm sized organelles.

As shown in FIG. 5, a ratchet migration is apparent for large mitochondria since the resultant migration velocity is negative. For data analysis, organelles were analyzed that were trapped during the second half driving period, similarly to the model study with beads. These mitochondria showed the highest fluorescence intensities and were thus counted as large mitochondria. Importantly, the analysis of trajectories of small mitochondria (with fluorescence intensities just barely allowing tracking analysis) not trapped in the second half driving period reveals positive migration velocities, thus a normal migration effect. It is concluded that the ratchet effect can be induced for large mitochondria in a size-heterogeneous sample and that mitochondria of different size can be steered into different directions taking advantage of the coexistence of normal and ratchet-like migration for the small and large species, respectively.

The ratchet mechanism also offers a speed advantage over other related mechanisms. The maximum velocity of mitochondria undergoing ratchet migration in this work amounts to ~5 μm/s, which is two orders of magnitude larger than reported for absolute negative mobility migration and is up to two times larger in magnitude to ratchet approaches with micrometer-sized particles. This also holds for the sub-μm sized beads employed in this study, as described above. Thus, the deterministic ratchet mechanism described here induces significantly larger migration velocities, which is a highly desirable feature in the design of fast separation of particles and organelles.

The experimentally obtained migration velocities for mitochondria are also compared to the numerical model, in which parameters are employed matching experimentally determined electrokinetic and calculated dielectrophoretic particle mobilities, which is stated below. FIG. 5 shows a reasonable agreement between numerical model and experiment. In both cases, a negative velocity could be observed (also described below with respect to FIGS. 26A-26D including frames from video S-4). The absolute velocity values deviate, however, from experiment to the numerical model. This is attributed to slight variations in the experimental conditions differing in the chip geometry compared to the post array in the model or experimental deviations from the estimated mitochondrial DEP mobility. It is also noted that the larger errors associated with the experimental measurements are attributed to the large size distribution of the mouse mitochondria considered for data analysis. Trajectories result from mitochondria being trapped by DEP, which relates to all sizes above a certain threshold, potentially also containing larger aggregates.

As demonstrated, large mitochondria show a ratchet-like migration mechanism similarly to the numerical and experimental study for sub-micrometer sized beads, whereas small mitochondria showed normal migration. Therefore, the demonstrated migration mechanism has great potential as a tool for the separation of mitochondrial subpopulations.

Figures 10A, 10B:
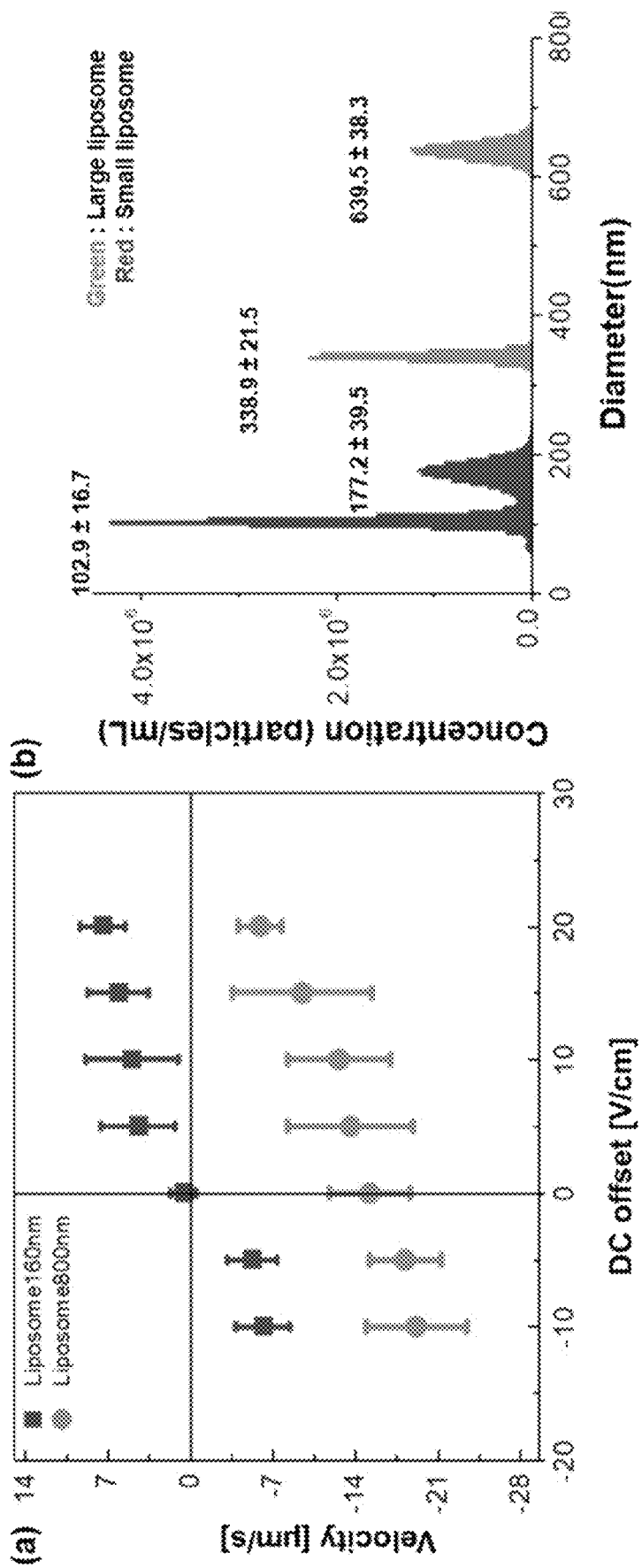
FIGS. 10A-10B illustrate ratchet migration that was observed for liposomes, in accordance with some embodiments.

Furthermore, the ratchet migration mechanism has been applied to liposomes labeled with lipophilic dye molecules. FIGS. 10A-10B illustrate ratchet migration that was observed for liposomes. FIG. 10A includes experimental results of migration velocity vs $U_{dc}$. The error bars indicate the standard deviation obtained by tracking 60 individual liposome trajectories. $U_{ac\_1}$ was 30 V and $U_{ac\_2}$ was 800 V with $f=25$ kHz. The large liposome species in green (average size, 640±40 nm diameter) show the ratchet migration mechanism, and small liposomes in red (average size, 177±40 and 102.9±16.7 nm diameters) exhibited normal migration. FIG. 10B illustrates the particle size distribution of liposomes in HEPES-sucrose buffer solution determined by nanoparticle tracking analysis demonstrate an average size of 340±20 and 640±40 nm diameters for larger liposomes (green) and an average size of 177±40 and 102±20 nm diameters for the smaller liposomes (red).

A smaller liposome fraction was prepared via an extrusion method rendering liposomes <0.2 μm labeled with a red fluorophore. Accordingly, a larger size fraction with liposomes >0.3 μm was prepared containing a green fluorophore. FIG. 10A summarizes the average migration velocities for the two liposome species for variations in $U_{dc}$. The sizes of the liposomes as measured by nanoparticle tracking analysis are shown in FIG. 10B. Small liposomes (red) showed two major distributions at 102.9±16.7 and 177.2±39.5 nm. The sizes of the large liposome (green) resulted in two major distributions with a mean of 338.9±21.5 nm and of 639.5±38.3 nm. As apparent from FIG. 10B, when the driving conditions of $U_{ac\_1}=30$V with $U_{ac\_2}$ of 800 V with $f=25$ kHz were applied for one complete period, the small liposomes showed normal migration whereas the large liposomes showed ratchet migration behavior. FIGS. 10A-10B thus demonstrate that the developed separation mechanism can be applied for sub-micrometer particles such as liposomes, which serve as a model for biological species consisting of membranes such as other organelles.

Overall, as demonstrated, large mitochondria and liposomes show a ratchet-like migration mechanism similarly to the numerical and experimental study for sub-micrometer sized beads, whereas small mitochondria and liposomes showed normal migration. Compared to cumbersome ultracentrifugation methods, our ratchet approach is highly selective to sub-micrometer particle sizes and allows tuning of the size range via the applied driving conditions. In addition, our method allows separations in the time scales of 1 min, an improved speed over field-flow-fractionation techniques and ultracentrifugation methods. Moreover, our method does not require any affinity capturing using magnetic beads or immobilized affinity agents for specific screening and separation of organelles. The numerical model and the experiments with mitochondria and liposomes show that the ratchet migration mechanism can be applied to sub-micrometer particles with tunable selectivity and that it gives access to separations down to ~200 nm sized particles suitable for typical organelle sizes or even smaller bioparticles such as exosomes. Therefore, the demonstrated migration mechanism has a large potential as a tool for the separation of organelle subpopulations.

In summary of this work, a deterministic DEP-based ratchet separation was realized in a nonlinear microfluidic post array to explore this migration mechanism for organelle separations. It was demonstrated experimentally with sub-micrometer polystyrene particles, mitochondria, and liposomes. The migration mechanism was reproduced with a numerical model, capturing the experimentally observed migration directions and absolute velocities in excellent agreement. The numerical model could be employed as a predictive tool for separation parameters, as demonstrated with particle species varying from 0.08 to 0.87 μm. Employing decreasing particle sizes, the numerical model demonstrated that the ratchet effect can be induced down to 0.28 μm particles for polystyrene beads. Furthermore, a binary mixture of 0.28 and 0.16 μm particles could be separated with excellent separation resolution after only one driving period. It was also shown that the separation resolution can be increased by increasing the number of driving periods. Moreover, the deterministic ratchet mechanism could be demonstrated experimentally with large mitochondria, whereas small organelles showed normal migration. In addition, we could experimentally demonstrate the coexistence of normal and ratchet migration for two sub-micrometer sized liposome samples. It was further noted that the here presented iDEP-based ratchet approach can be readily realized with standard photolithographic and soft lithographic techniques and allows the adjustment of the DEP trapping forces through the variation of the externally applied potentials. It is thus envisioned that the investigated driving conditions can be adapted to a wide range of separation problems in which size selectivity is required, such as in the fractionation of organelles and their subpopulations, in nanotechnology-based applications, or as fractionation method for protein nanocrystals.

Supplemental to the above, electrokinetic mobility measurements were taken for 0.28 µm and 0.87 µm polystyrene beads and mitochondria. For the electrokinetic (EK) mobility measurement, a microfluidic channel without posts was employed. The chip and bead solution preparation were similar to the procedures for the ratchet experiments as described above. Beads and mitochondria were introduced into the channel by capillary action, the liquid level was well balanced and subsequently a DC signal was supplied to electrodes immersed in the buffer reservoirs by the high voltage amplifier. The resulting bead velocity was recorded with a video camera as described above. The migration of beads was imaged at 10, 20, 30, and 40 V/cm. The experiments were repeated in three microchannels. Twenty individual trajectories for the beads or 60 individual trajectories for mitochondria per channel were analyzed by the Manual Tracking plugin to obtain the migration distances over defined time intervals. After plotting the average migration velocity versus the applied DC electric field, by calculating the slope of the least squares line, the electrokinetic mobility of 0.28 µm beads ($\mu_{ek\_0.28\ \mu m}$) was found to be $3.24\pm0.41\times10^{-9}$ $m_2 \cdot V^{-1} \cdot s^{-1}$ and that of 0.87 µm beads ($\mu_{ek\_0.87\ \mu m}$) was $2.52\pm0.45\times10^{-9}$ $m^2 \cdot V^{-1} \cdot s^{-1}$. And the electrokinetic mobility of the mitochondria ($\mu_{ek\_mito}$) was found to be $2.10\pm0.19\times10^{-9}$ $m^2 \cdot V^{-1} \cdot s^{-1}$. These EK mobility values were applied in the simulation as described above.

Example dielectrophoretic mobility was determined for 0.28 µm and 0.87 µm polystyrene beads and mitochondria. The DEP force acting on a spherical particle can be expressed as:

$$F_{DEP} = 2\pi\varepsilon_m r^3 f_{CM} \nabla E^2 \qquad \text{eq. 4}$$

where r is the particle radius and $\varepsilon_m$ is the medium permittivity ($\varepsilon_m = \varepsilon_{r,m} \varepsilon_0$, with $\varepsilon_{r,m}$ the relative permittivity of the medium (80 for water) and $\varepsilon_0$ is the vacuum permittivity). The Clausius-Mossoti factor $f_{CM}$ under DC and low frequency conditions is calculated given by:

$$f_{CM} = \frac{\sigma_p - \sigma_m}{\sigma_p + 2\sigma_m} \qquad \text{eq. 5}$$

where $\sigma_p$ and $\sigma_m$ are the particle and medium conductivity, respectively. The particle radii are reported above and the medium conductivity was measured to value 0.03 S/m. The dielectrophoretic mobilities for the three particles used in the model were calculated as follows:

$$\mu_{dep} = \frac{R^2 \varepsilon_m f_{CM}}{3\eta} \qquad \text{eq. 6}$$

where $\eta$ is the viscosity. This resulted in $-2.48\times10^{-21}$ $m^4 \cdot V^{-2} \cdot s^{-1}$ for the 0.28 µm beads ($\mu_{dep\_0.28\ \mu m}$), $-2.39\times10^{-20}$ $m^4 \cdot V^{-2} \cdot s^{-1}$ for the 0.87 µm beads ($\mu_{dep\_0.28\ \mu m}$), and $-8.13\times10^{-13}$ $m^4 \cdot V^{-2} \cdot s^{-1}$ for mitochondria ($\mu_{dep\_mito}$) with a radius of 300 nm as experimentally determined (see FIG. 8).

Figure 6:
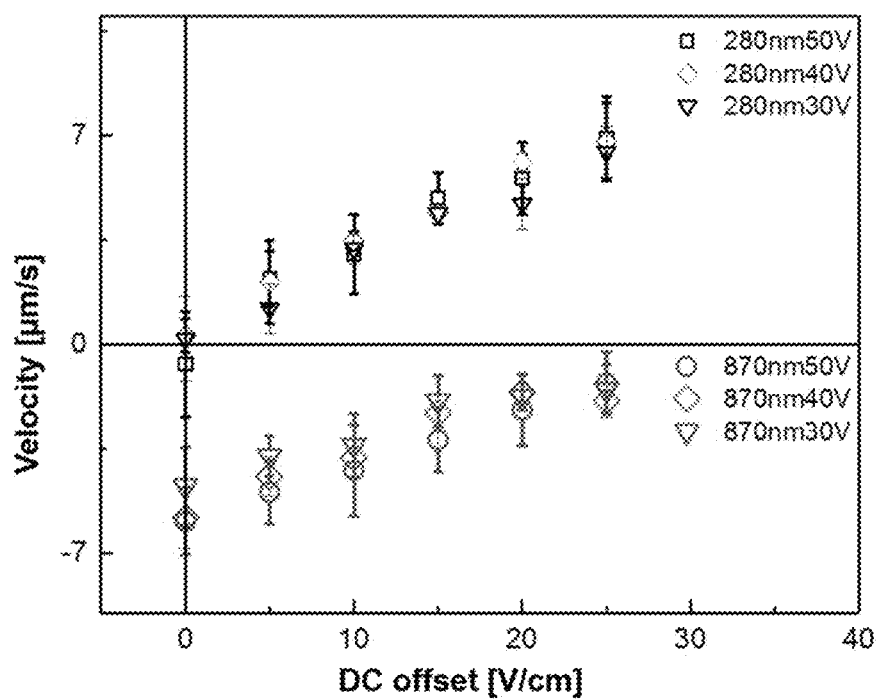
FIG. 6 illustrates average migration velocity vs. $U_{ac\_1}$ amplitudes for different DC offsets as obtained from the numerical study, in accordance with some embodiments.

FIG. 6 illustrates average migration velocity vs. $U_{ac\_1}$ amplitudes for different DC offsets as obtained from the numerical study. Particle diameters of 0.87 µm are represented in black and of 0.28 µm in red. The $U_{ac\_1}$ amplitude 30 V, 40 V and 50 V is represented by hollow squares, diamonds, and triangles, respectively. The error bars represent the standard deviations of the particle velocities at each applied $U_{dc}$ offset by tracking 40 particle trajectories for 0.87 µm and 0.28 µm beads. The average particle velocity is independent to the amplitude of $U_{ac\_1}$ within the range of $U_{dc}$ offsets tested.

Figures 7A, 7B, 7C:
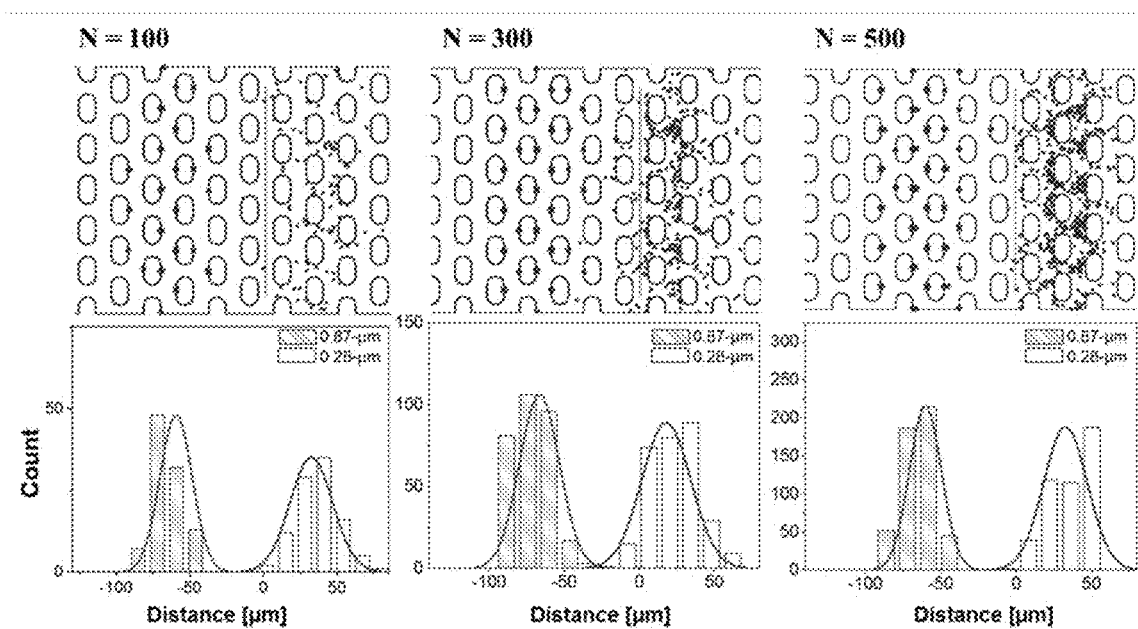
FIGS. 7A-7C illustrate particle velocities for various numbers of particles employed in the numerical model, in accordance with some embodiments.

FIGS. 7A-7C illustrate particle velocities for various numbers of particles (N) employed in the numerical model. Histogram and Gaussian fit are shown for the 0.87 µm (red) and 0.28 µm (blue) beads with N=100 beads as shown in FIG. 7A, N=300 beads as shown in FIG. 7B, and N=500 beads as shown in FIG. 7C. Applied potentials for the particles include $U_{ac\_1}=50$ V, $U_{dc}=10$ V and $U_{ac\_2}=800$ V at a frequency of 30 kHz with one complete driving period ($\tau=20$ seconds). The resultant resolution is 1.61 for N=100 beads as shown in FIG. 7A, 1.59 for N=300 beads as shown in FIG. 7B, and 1.58 for N=500 beads as shown in FIG. 7C.

Figure 8:
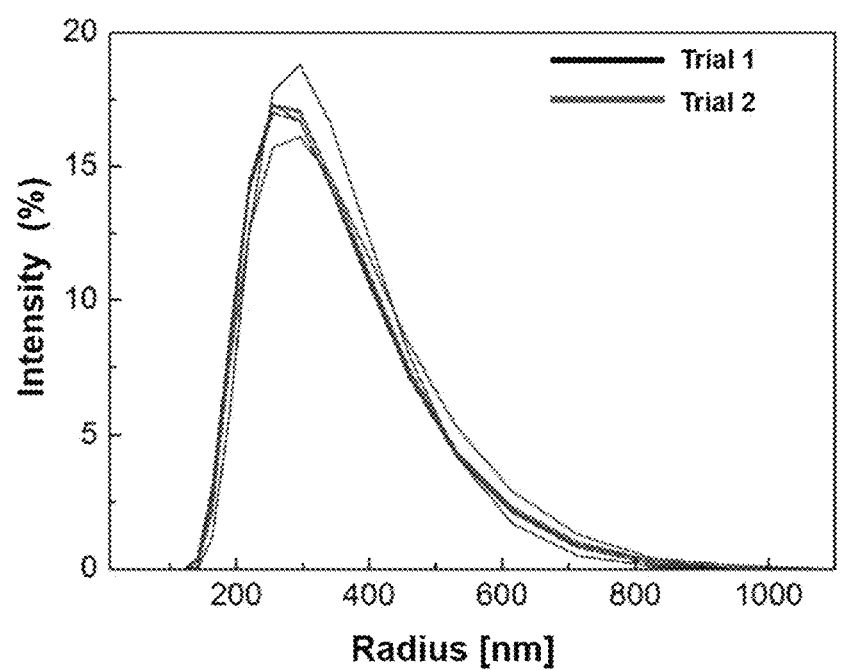
FIG. 8 illustrates the hydrodynamic radius of mitochondria determined in solution by a dynamic light scattering (DLS) instrument, in accordance with some embodiments.

FIG. 8 illustrates the hydrodynamic radius of mitochondria determined in solution C (100 mM sucrose, 125 mM KCl, 10 mM HEPES, 2 mM $K_2HPO_4$, 5 mM $MgCl_2$, pH adjusted to 7.4 by KOH, sterile-filtered to 0.2 µm) by a dynamic light scattering (DLS) instrument equipped with Zetasizer Software Ver. 6.12 (Zetasizer Nano ZS, Malvern Instruments Ltd., Worcestershire, U.K.) at 25° C.

Simulation and experimental results were captured in four videos identified as S-1, S-2, S-3, and S-4, which are described below.

FIGS. 23A-23E are frames from Video S-1 that indicate simulation results and show polystyrene beads' migration behavior under the positive $U_{dc}$ offset. The frames in FIGS. 23A-23E should be read from left to right and from the top of the page to the bottom of the page. The particles in this simulation were subjected to $U_{ac\_1}=50$ V, $U_{dc}=10$ V with the effect of DEP trapping force induced by $U_{ac\_2}$ ($U_{ac\_2}=800$ V at $f=30$ kHz). The time step size ($\Delta t$) was 0.1 s and the video was exported from COMSOL at 10 frames/s.

FIGS. 24A-24E are frames from Video S-2 that indicate simulation results and show polystyrene beads' migration behavior under the negative $U_{dc}$ offset. The frames in FIGS. 24A-24E should be read from left to right and from the top of the page to the bottom of the page. The particles in this simulation were subjected to $U_{ac\_1}=50$ V, $U_{dc}=-10$ V with the effect of DEP trapping force induced by $U_{ac\_2}$ ($U_{ac\_2}=800$ V at $f=30$ kHz). The time step size ($\Delta t$) was 0.1 s and the video was exported from COMSOL at 10 frames/s.

FIGS. 25A-25I are frames from Video S-3 that indicate simulation results and show ratchet behavior of 0.87 µm beads and normal behavior of 0.28 µm beads (polystyrene beads). The frames in FIGS. 25A-25I should be read from left to right and from the top of the page to the bottom of the page. The particles in this simulation were subjected to $U_{ac\_1}=50$ V, $U_{dc}=10$ V, and $U_{ac\_2}=800$ V at frequency 30 kHz in three multiple periods (simulation duration was 100 s and $\tau=20$ seconds). The time step size ($\Delta t$) was 0.1 s and the video was exported from COMSOL at 10 frames/s. After three periods, the net migration of the 0.87 µm beads was upwards (y-direction) demonstrating ratchet behavior. Meanwhile, both the net migration of the 0.28 µm beads and the average driving force pointed downwards demonstrating normal migration behavior.

FIGS. 26A-26D are frames from Video S-4 that indicate experimental results and show ratchet behavior of mouse liver mitochondria experimentally at $U_{ac\_1}=50$ V, $U_{dc}=10$ V, and $U_{ac\_2}=800$ V, at frequency 30 kHz. The frames in FIGS. 26A-26D should be read from left to right and from the top of the page to the bottom of the page. The video was recorded at 4.3 frames/s with 150 ms exposure time. The mouse liver mitochondria sample was labeled by MitoTracker Green and was imaged by fluorescence video microscopy (as described above). Mitochondria were trapped by the nearby posts immediately upon the application of waveforms indicating the potential of separation of sub-micron size subpopulations of mitochondria.

Figure 11:
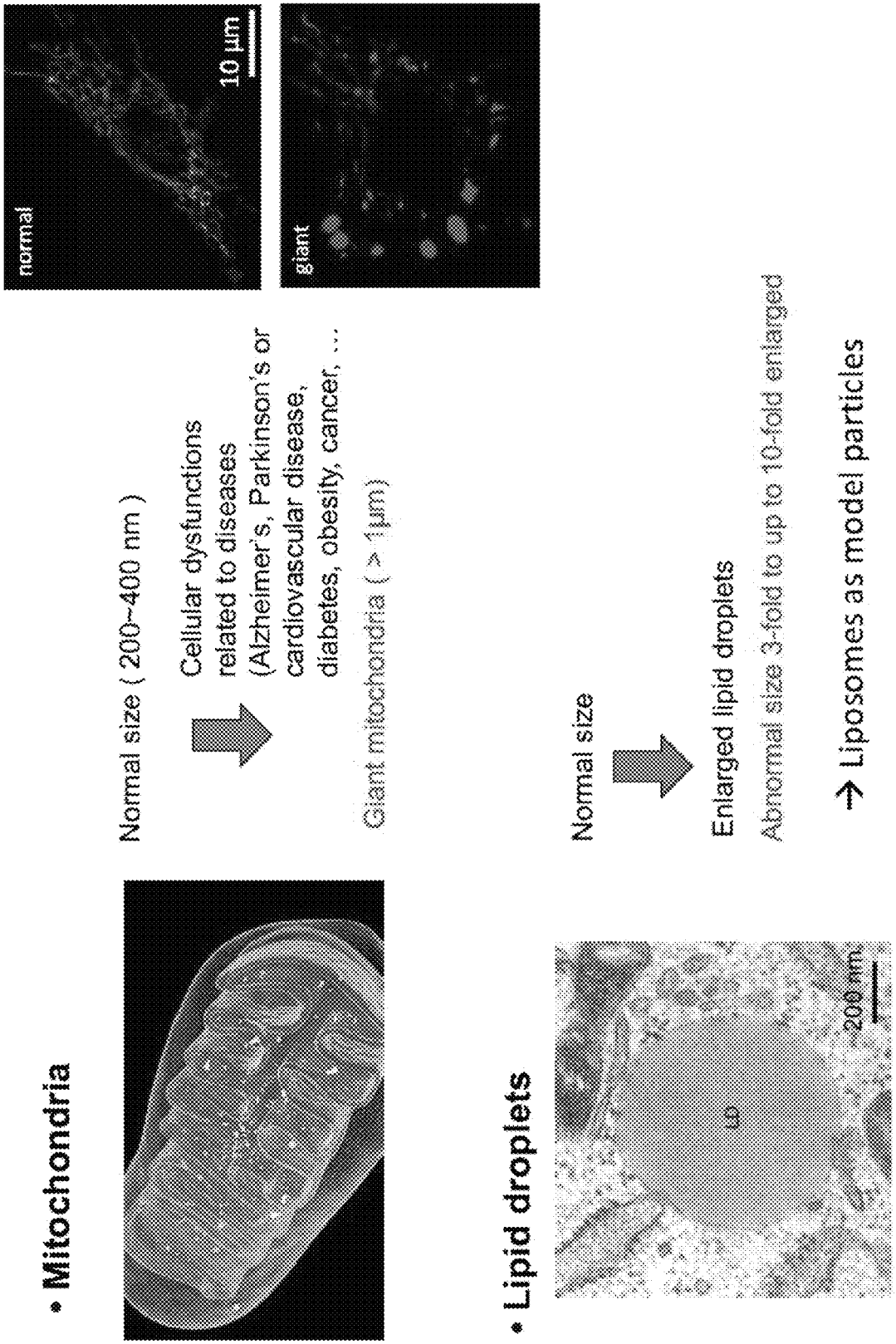
FIG. 11 illustrates mitochondria and lipid droplets as studied in medical research.

FIG. 11 illustrates several examples of mitochondria and lipid droplets as studied in medical research. Although FIG. 11 characterizes the mitochondria and lipid droplets as normal, enlarged, and giant with respect to medical conditions, the disclosure is not limited with respect to these definitions of size, size ranges, or size categories in regard to how different sized bioparticles separate using the disclosed ratchet mechanism.

Figure 12:
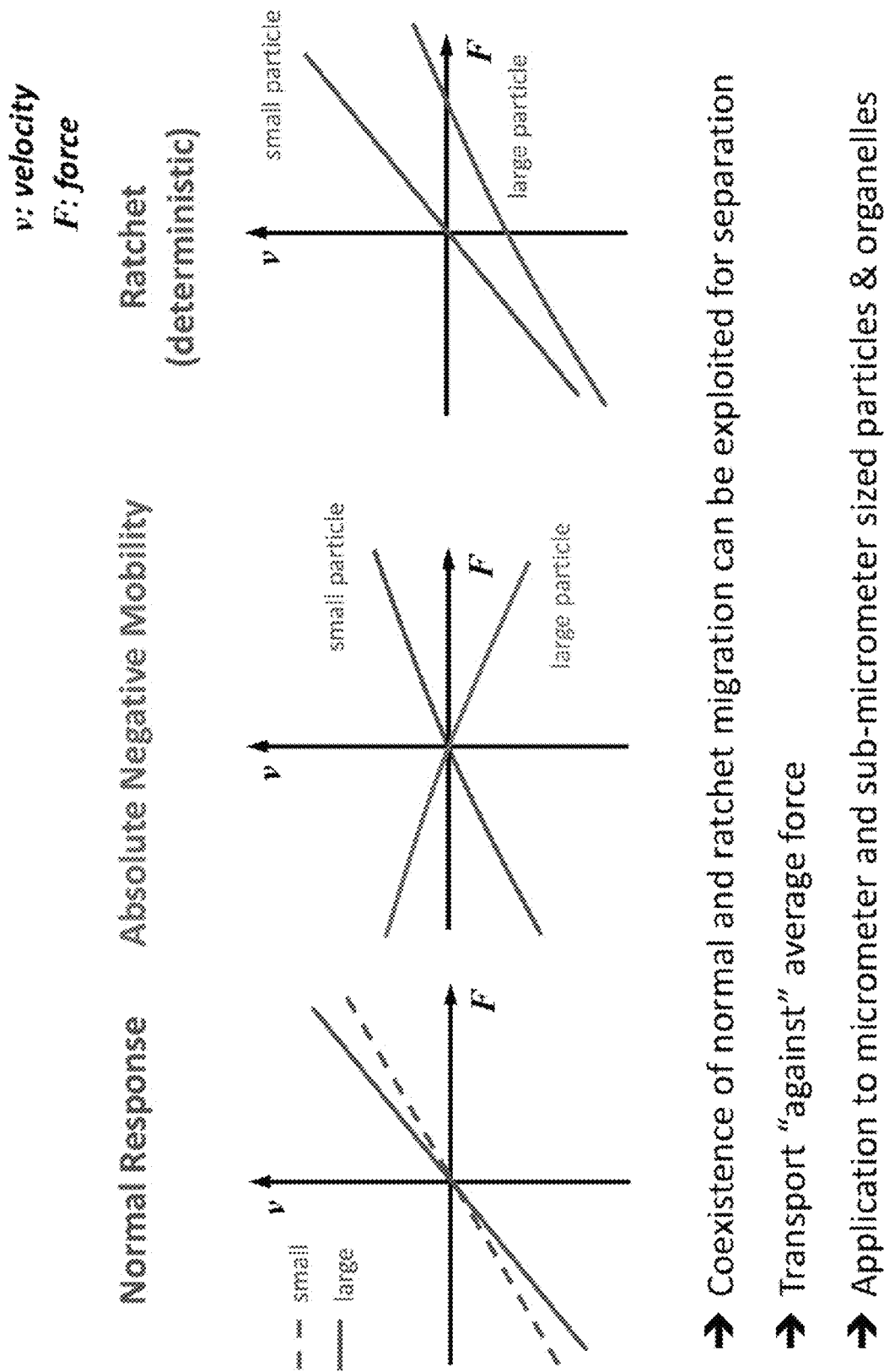
FIG. 12 illustrates normal migration and non-intuitive migration through force vs. velocity curves for small and large particles, in accordance with some embodiments.

FIG. 12 illustrates normal migration and non-intuitive migration through force vs. velocity curves for small and large particles. The force vs. velocity curves include a normal response, absolute negative mobility, and a deterministic ratchet for small and large particles. As shown, coexistence of normal and ratchet migration can be used for separation of small and large particles. Particles may be transported against the average force. Separation by ratchet migration applies to micrometer and sub-micrometer sized particles and organelles.

Figure 13:
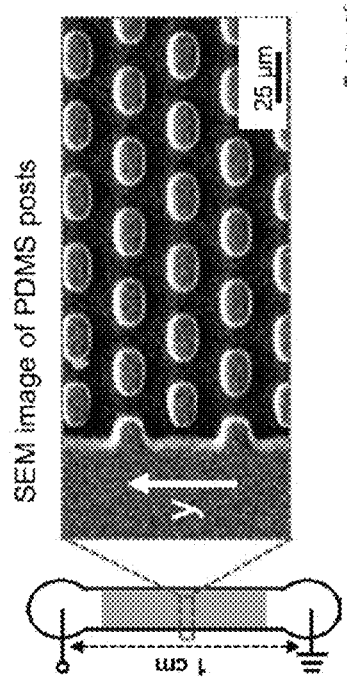
FIG. 13 illustrates an example of a design for a ratchet mechanism that separates particles by size including a post array geometry and ratchet migration waveforms, in accordance with some embodiments.
Figure 13:
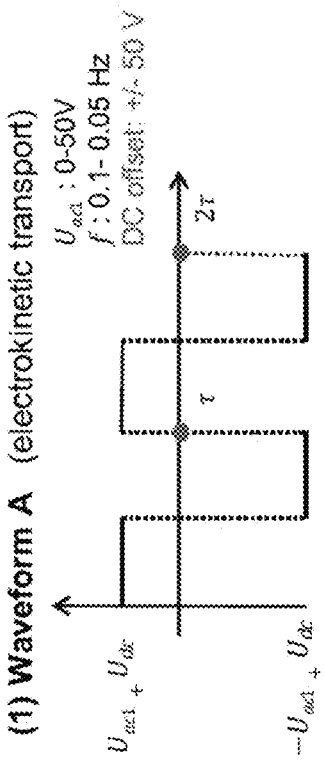
Figure 13:
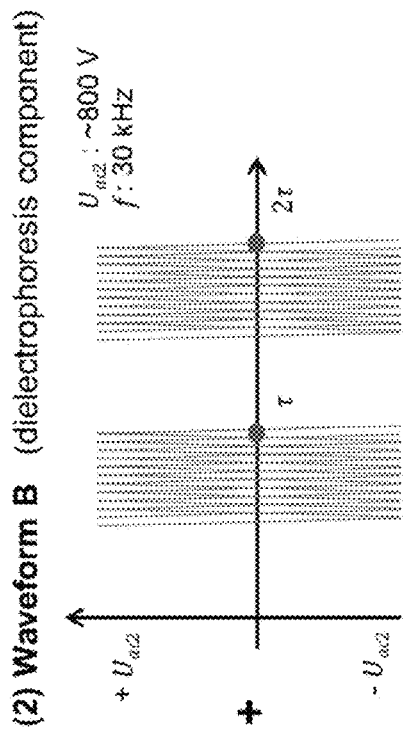

FIG. 13 illustrates an example of a design for a ratchet mechanism that separates particles by size including a post array geometry and ratchet migration waveforms. Shown in FIG. 13 is a microfluidic channel. Electrodes are submerged in end reservoirs of the microfluidic channel. An enlargement of a portion of the channel shows PDMS posts arranged in a non-linear symmetrical array. Also shown is a non-uniform (i.e., inhomogeneous) electric field that occurs within the microfluidic channel when a potential is applied via the submerged electrodes. The inhomogeneous electric field is varied by the geometry of the non-linear symmetric post array. The inhomogeneous electric field allows DEP to occur in the microfluidic channel. Also shown are waveform A that induces electrokinetic transport of particles, and waveform B that imparts a dielectrophoresis component for controlling a selective ratchet mechanism.

Figure 14:
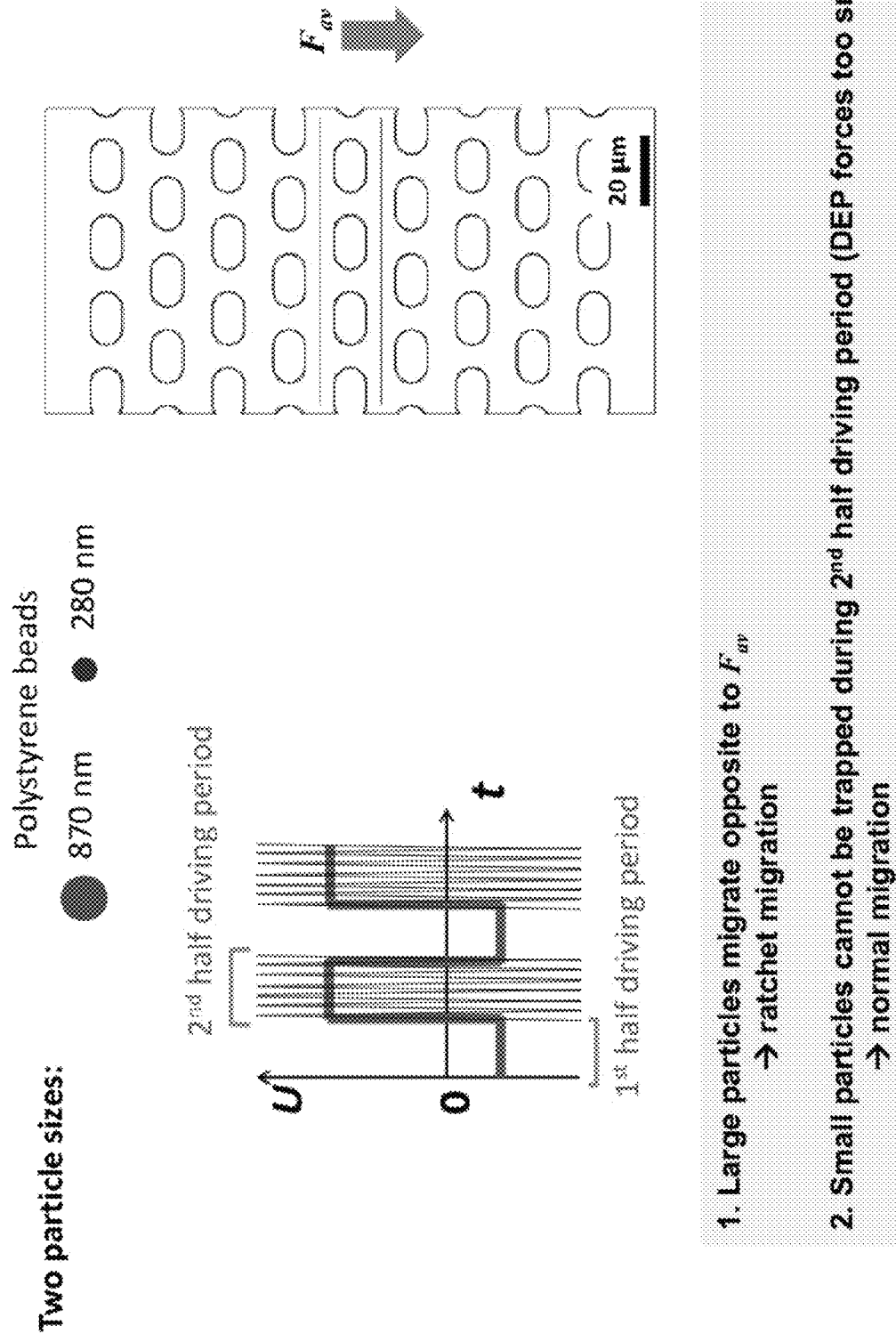
FIG. 14 illustrates waveform and structural elements for separating large and small particles, in accordance with some embodiments.

FIG. 14 illustrates waveform and structural elements for separating large and small particles. Shown in FIG. 14 are two example particles sizes including 840 nm and 280 nm polystyrene beads. Also shown, are waveforms during a first half of a driving period and a second half of a driving period. The larger particles migrate opposite to the direction of the average force due to ratchet migration. However, the smaller particles undergo normal migration in the direction of the average force because the DEP force imparted during the second half of the driving period by the higher frequency waveform is too weak to trap the small particles.

Figure 15:
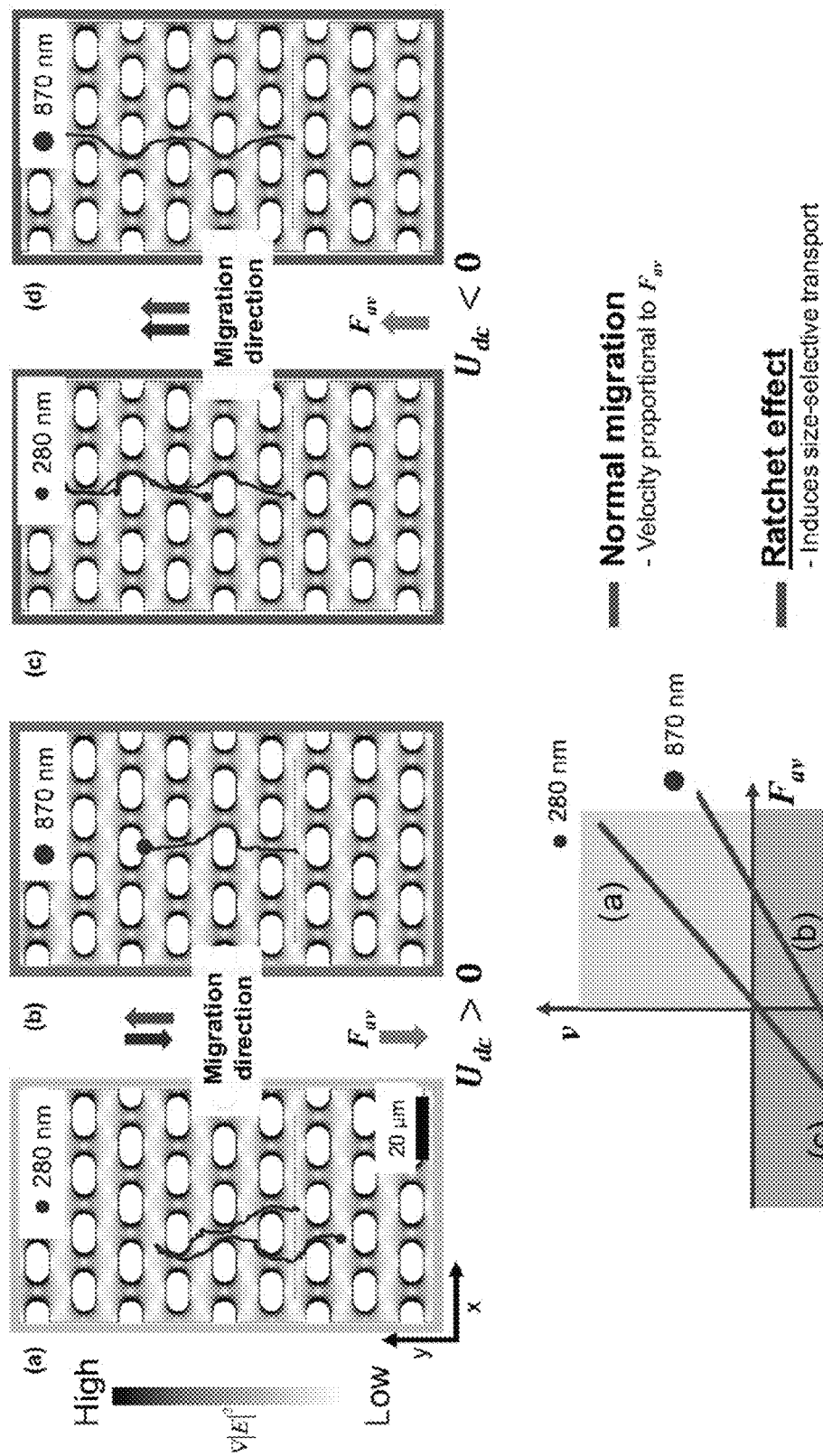
FIG. 15 illustrates particle migration under normal migration and a ratchet mechanism for positive and negative DC biases, in accordance with some embodiments.

FIG. 15 illustrates particle migration under normal migration and a ratchet mechanism for positive and negative DC biases. As shown in FIG. 15, for a positive DC bias, a smaller particle (280 nm, blue) travels with normal migration from a starting point in a first direction for a first distance (during a first half of a driving cycle), and travels in an opposite direction for a greater distance with normal migration (during the second half of the driving cycle) such that it passes the starting point. Thus the migration of the smaller particle occurs in the direction below the starting point. The larger particle (870 nm, red) travels from the same starting point with normal migration in the first direction (for the first half of the driving cycle). However, the larger particle is trapped during the second half of the driving cycle such that migration of the larger particle occurs in the direction above the starting point. For the case of a negative DC bias, a smaller particle (280 nm, blue) travels with normal migration from a starting point in a first direction for a first distance (during a first half of a driving cycle), and travels in an opposite direction for a shorter distance by normal migration (during the second half of the driving cycle). Thus the migration of the smaller particle occurs in the direction above the starting point. Whereas, the larger particle (870 nm, red) travels with normal migration from the same starting point in the first direction (for the first half of the driving cycle) and is trapped above the starting point during the second half of the driving cycle. Therefore with the negative bias, migration of both particles occurs in the direction above the starting point. The average-force vs. velocity curve in FIG. 15 shows a range of average force where the smaller particle and the larger particle undergo opposite sign velocities.

Figure 17:
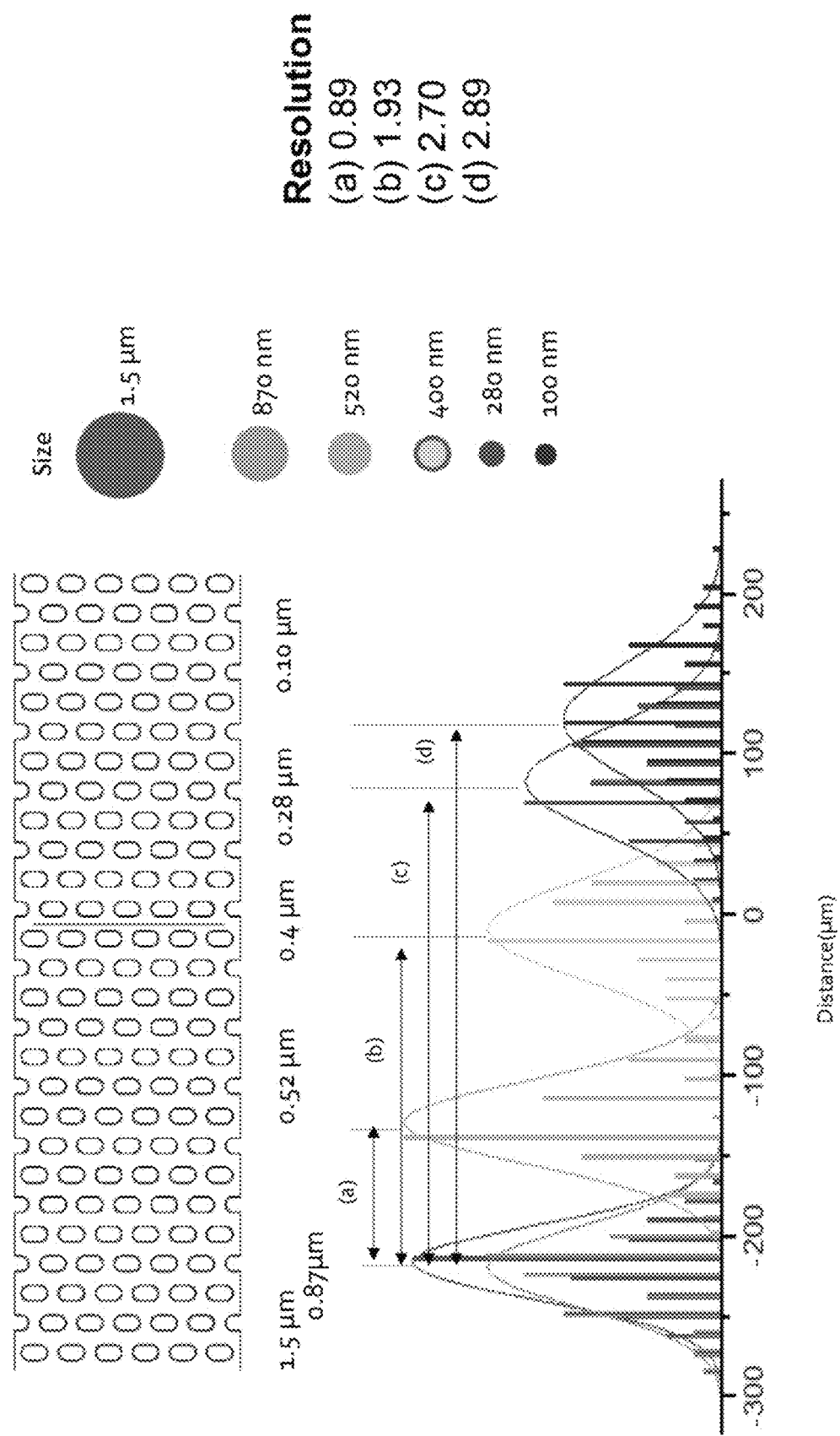
FIG. 17 illustrates simulation results for distances travelled for a distribution of particle sizes, in accordance with some embodiments.

FIG. 17 illustrates simulation results for distances travelled over a distribution of particle sizes. As shown in FIG. 17, for a simulation including six distinct particle sizes with the largest particle being 870 nm which is used as a reference point for migration distance, the resolution achieved depends on particle size. The smaller a particle is relative to the 870 nm reference particle, the greater the expressed resolution. The model parameters are shown in FIG. 17.

Figure 18:
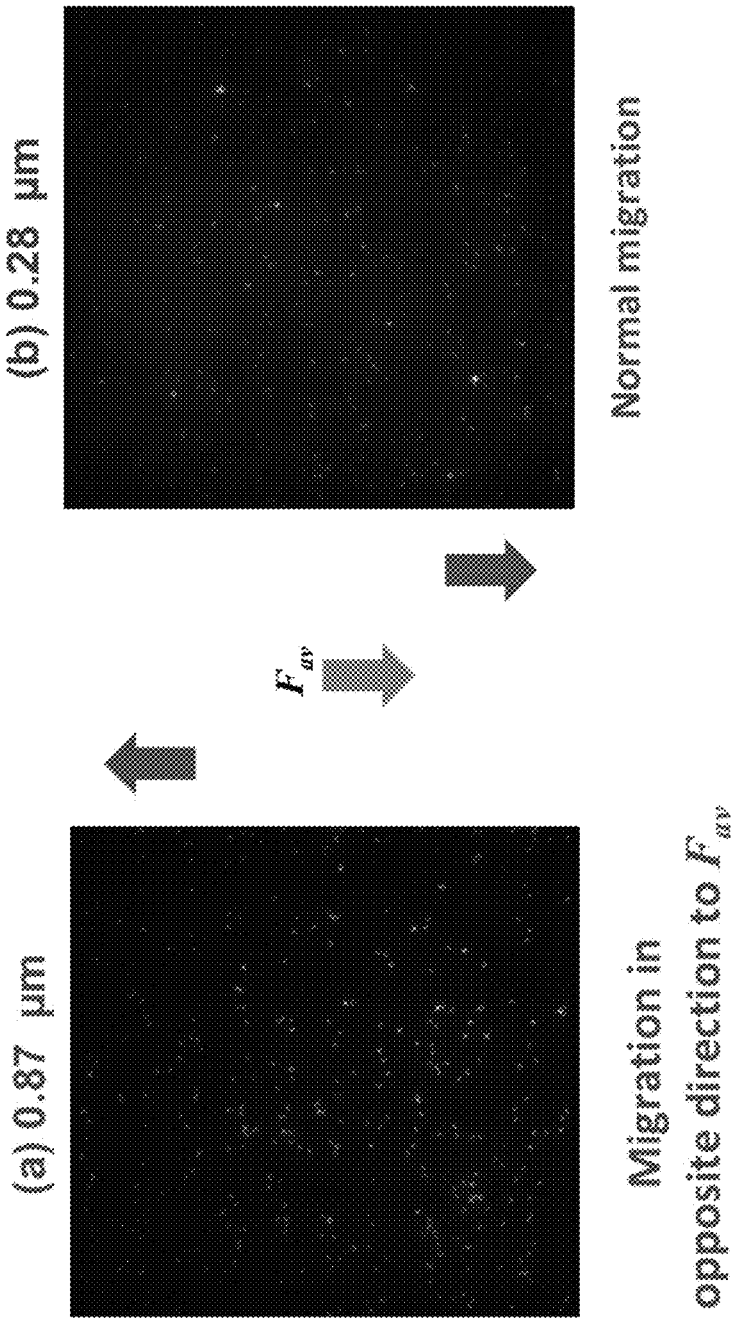
FIG. 18 illustrates experimental results showing migration in a binary particle mixture, in accordance with some embodiments.

FIG. 18 illustrates experimental results showing migration in a binary particle mixture. As shown in the images, larger 870 nm particles migrate in an opposite direction relative to the average force and the smaller 280 nm particles undergo normal migration in the direction of the average force.

Figure 19:
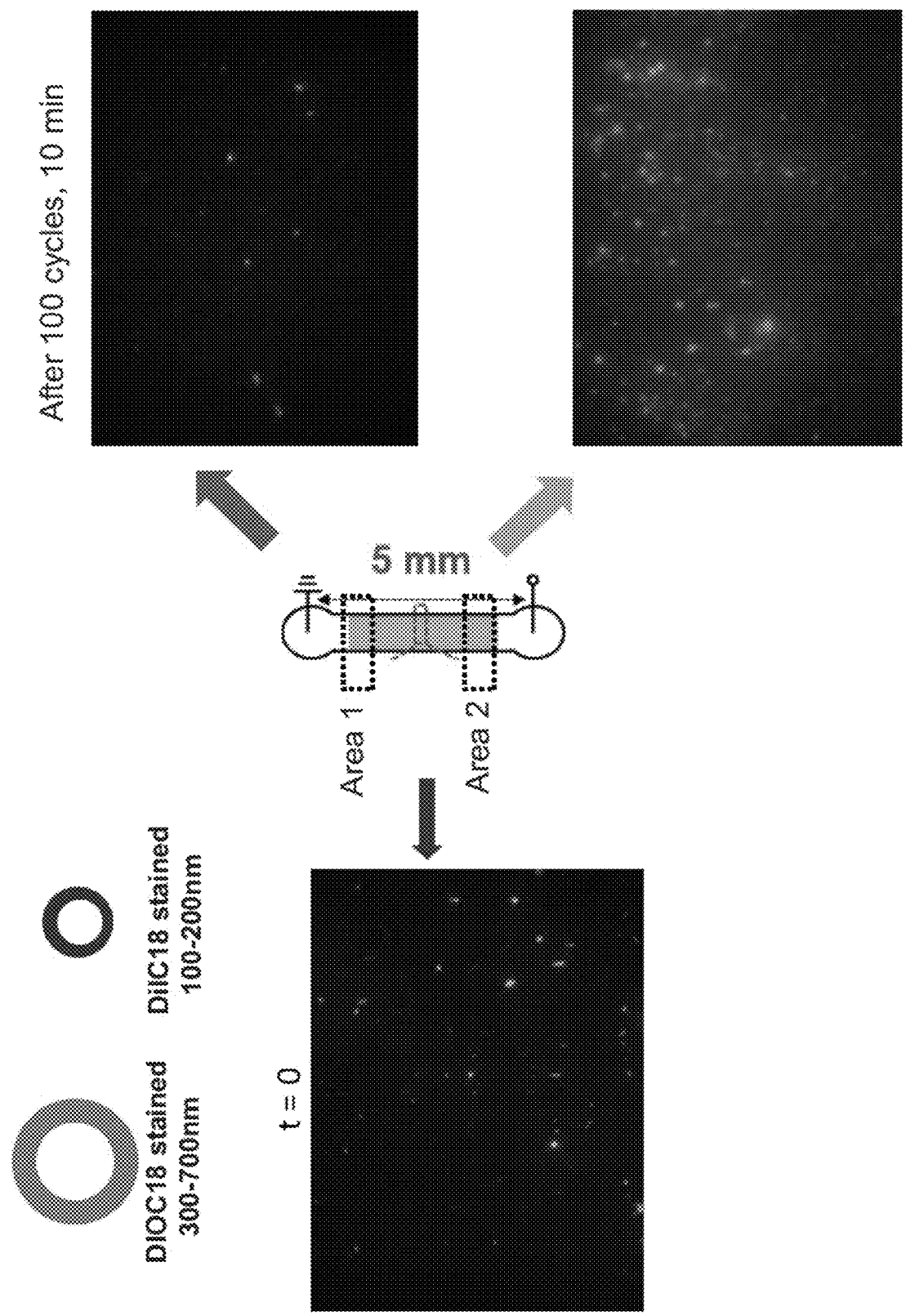
FIG. 19 includes images that illustrate separation of stained large and small liposomes to distant areas of a microfluidic channel, in accordance with some embodiments.

FIG. 19 includes images that illustrate separation of stained large and small liposomes to distant areas of a microfluidic channel. Referring to FIG. 19, larger liposomes of 300-700 nm are stained with DIOC 18 to fluoresce green, and smaller 100-200 nm liposomes are stained with DilC18 to fluoresce red. As shown in the images, at time equal to zero, the particles are intermingled in the center of the microfluidic channel. After 100 driving periods, the larger (green) and smaller (red) liposomes migrate to opposite ends of the microfluidic channel.

Figure 20:
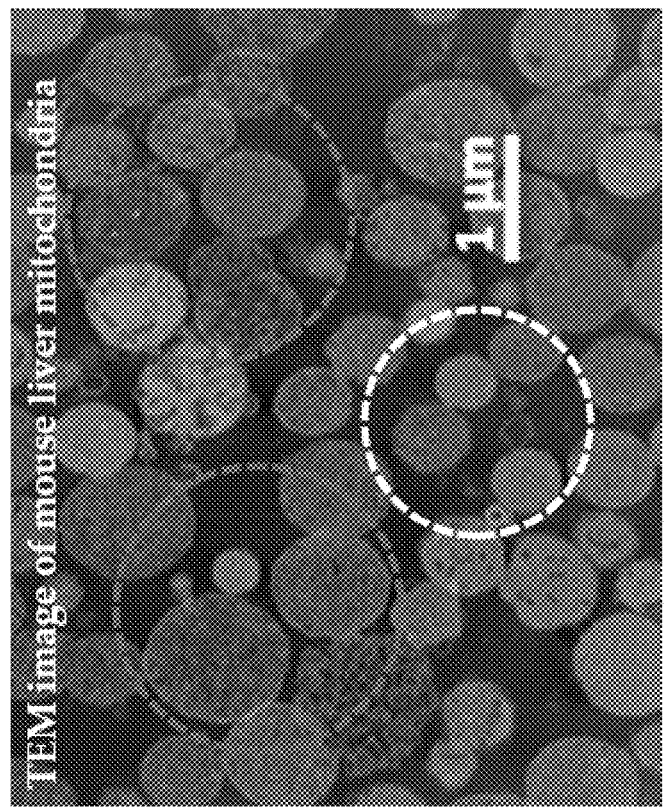
FIG. 20 illustrates various sizes of mitochondria as observed in medical studies.

FIG. 20 illustrates various sizes of mitochondria as observed in medical studies. Although FIG. 20 characterizes the mitochondria as normal and giant with respect to medical conditions, the disclosure is not limited with respect to these definitions of size, size ranges, or size categories in regard to how different sized bioparticles separate using the disclosed ratchet mechanism.

Figure 21:
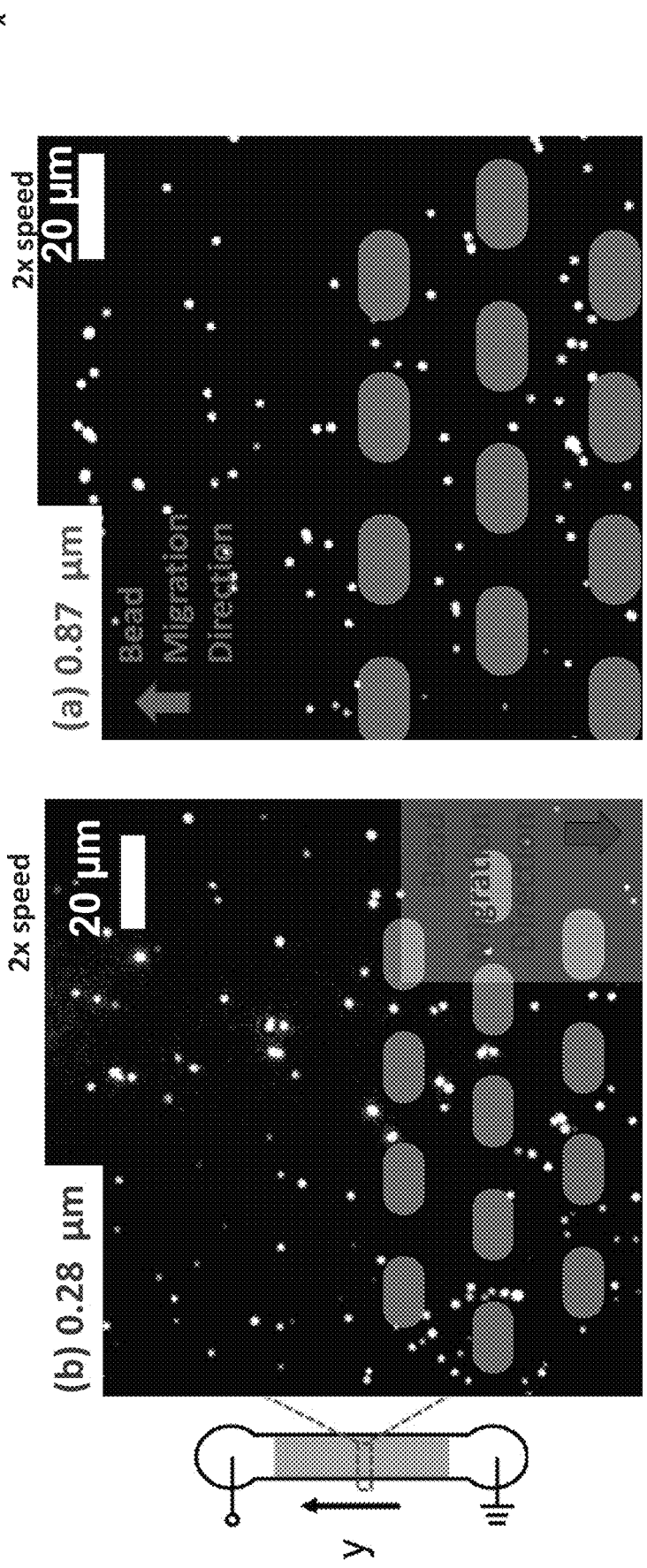
FIG. 21 illustrates another example of particle dynamics in a binary mixture of polystyrene beads, in accordance with some embodiments.

FIG. 21 illustrates another example of particle dynamics in a binary mixture of polystyrene beads (similar to FIG. 18). Smaller 280 nm particles travel downward with normal migration and larger 870 nm beads migrate in the opposite direction due to ratchet behavior.

Figure 22:
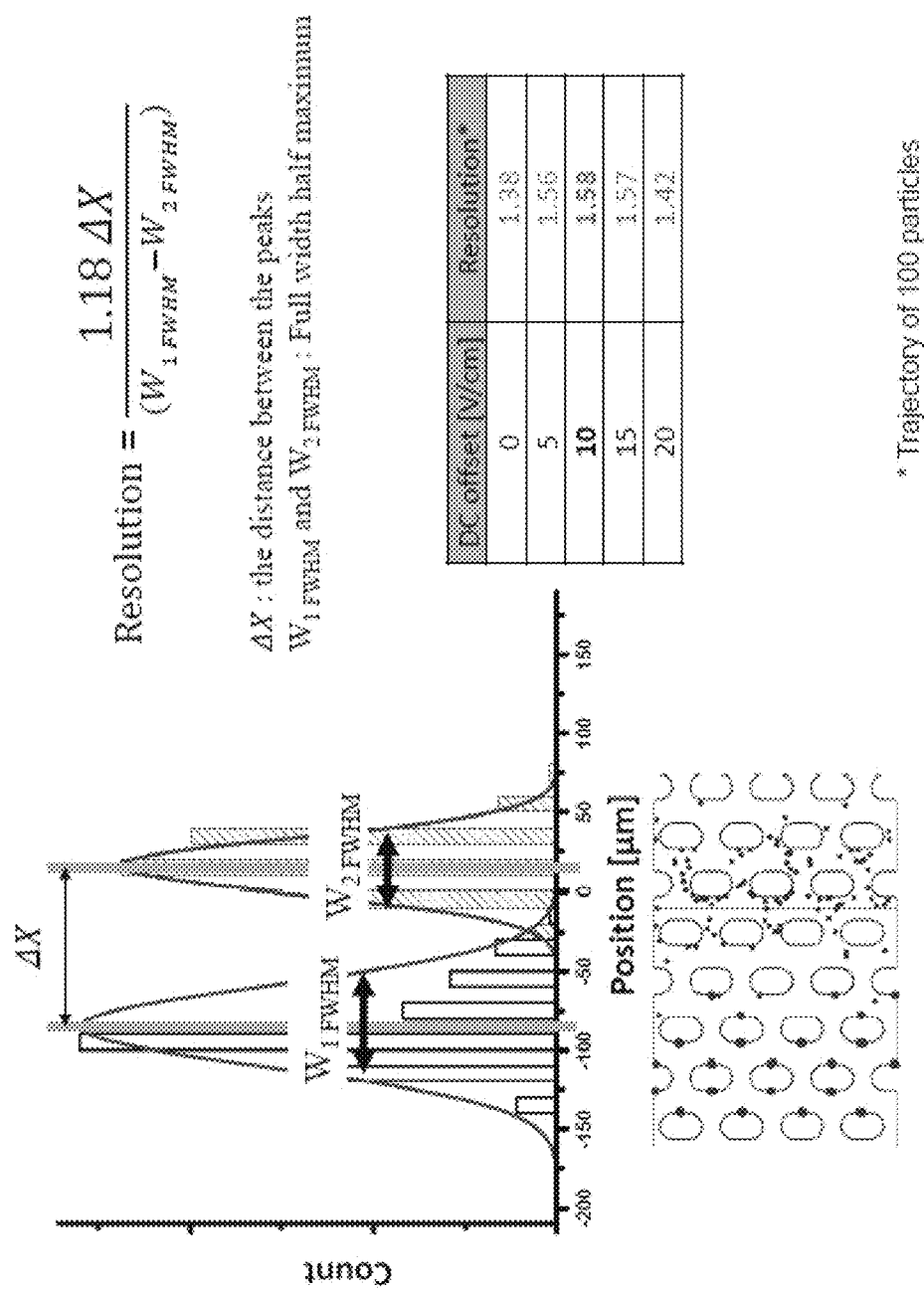
FIG. 22 illustrates resolution vs. DC offset for trajectories of 100 particles, in accordance with some embodiments.
Figure 23A:
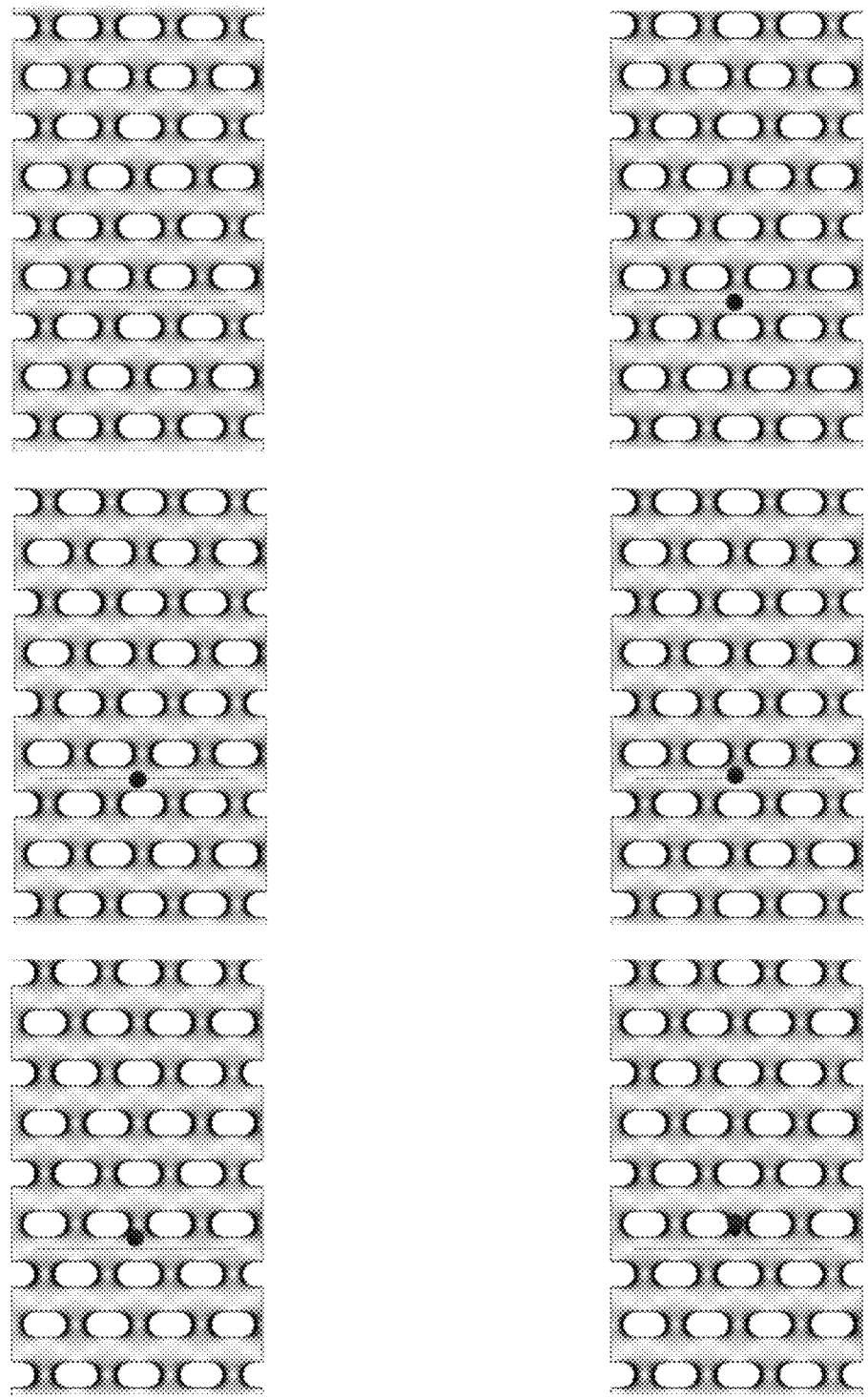
FIGS. 23A-23E are frames from Video S-1 that indicate simulation results and show polystyrene beads' migration behavior under the positive $U_{dc}$ offset, in accordance with some embodiments.
Figure 23B:
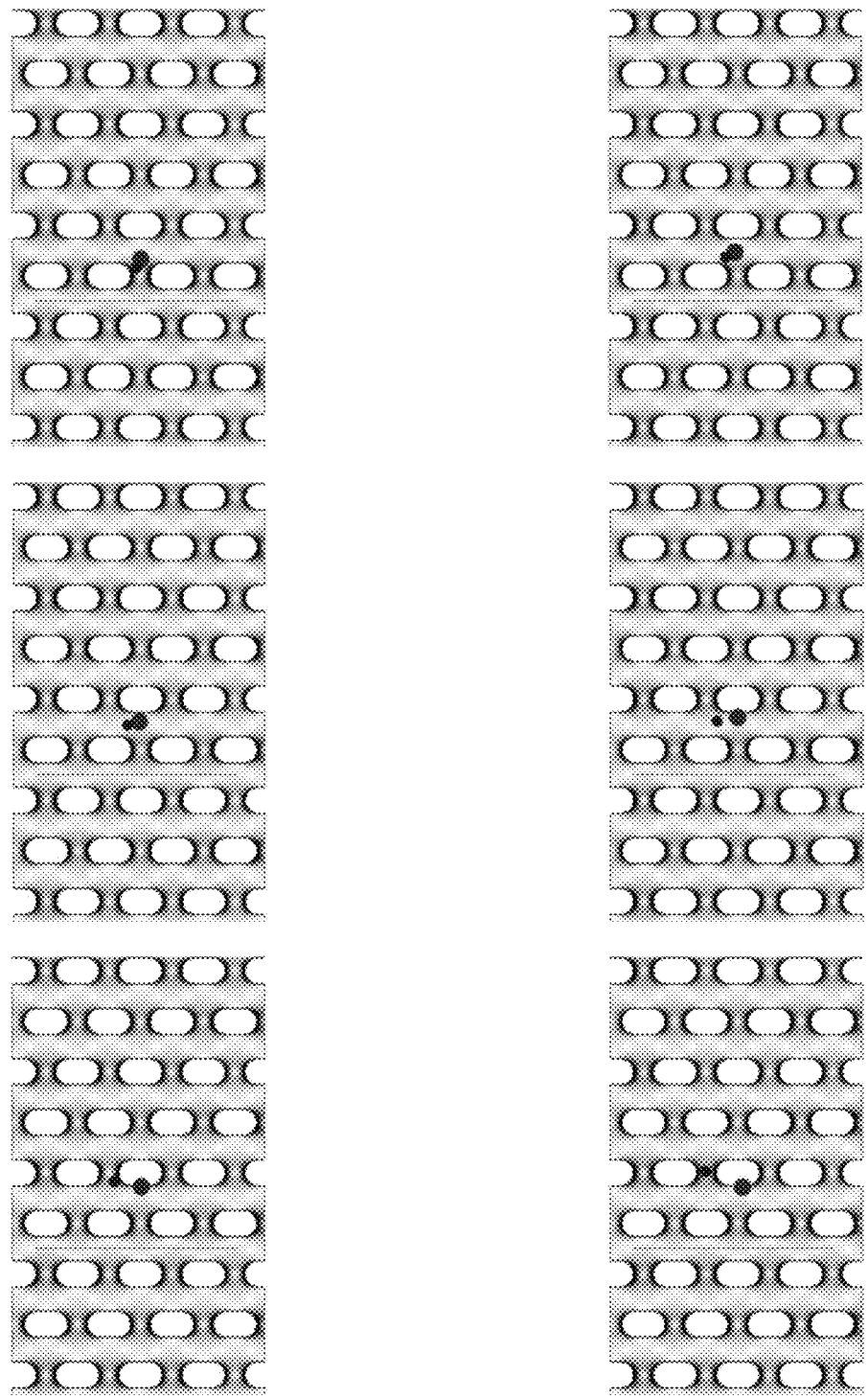
Figure 23C:
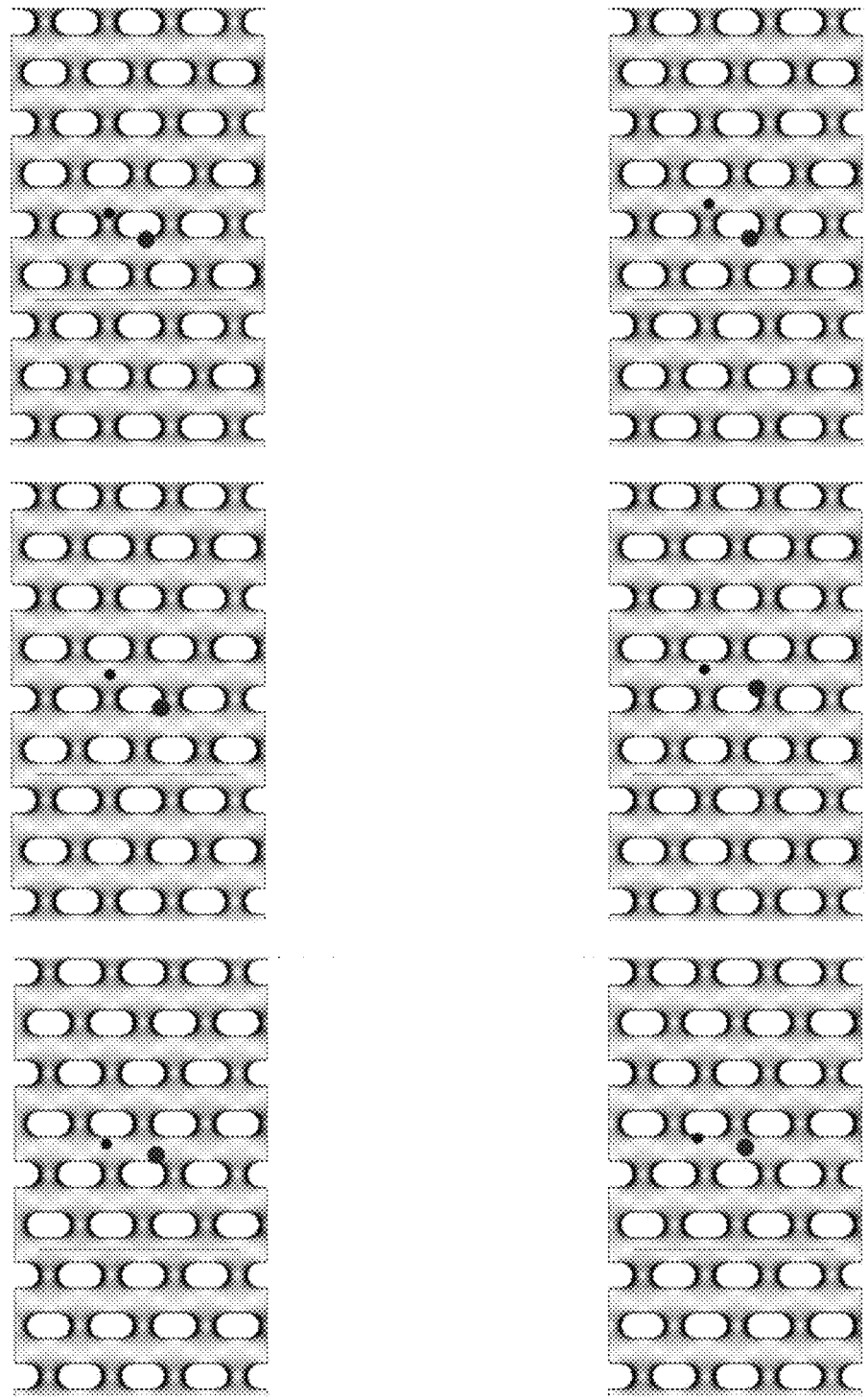
Figure 23D:
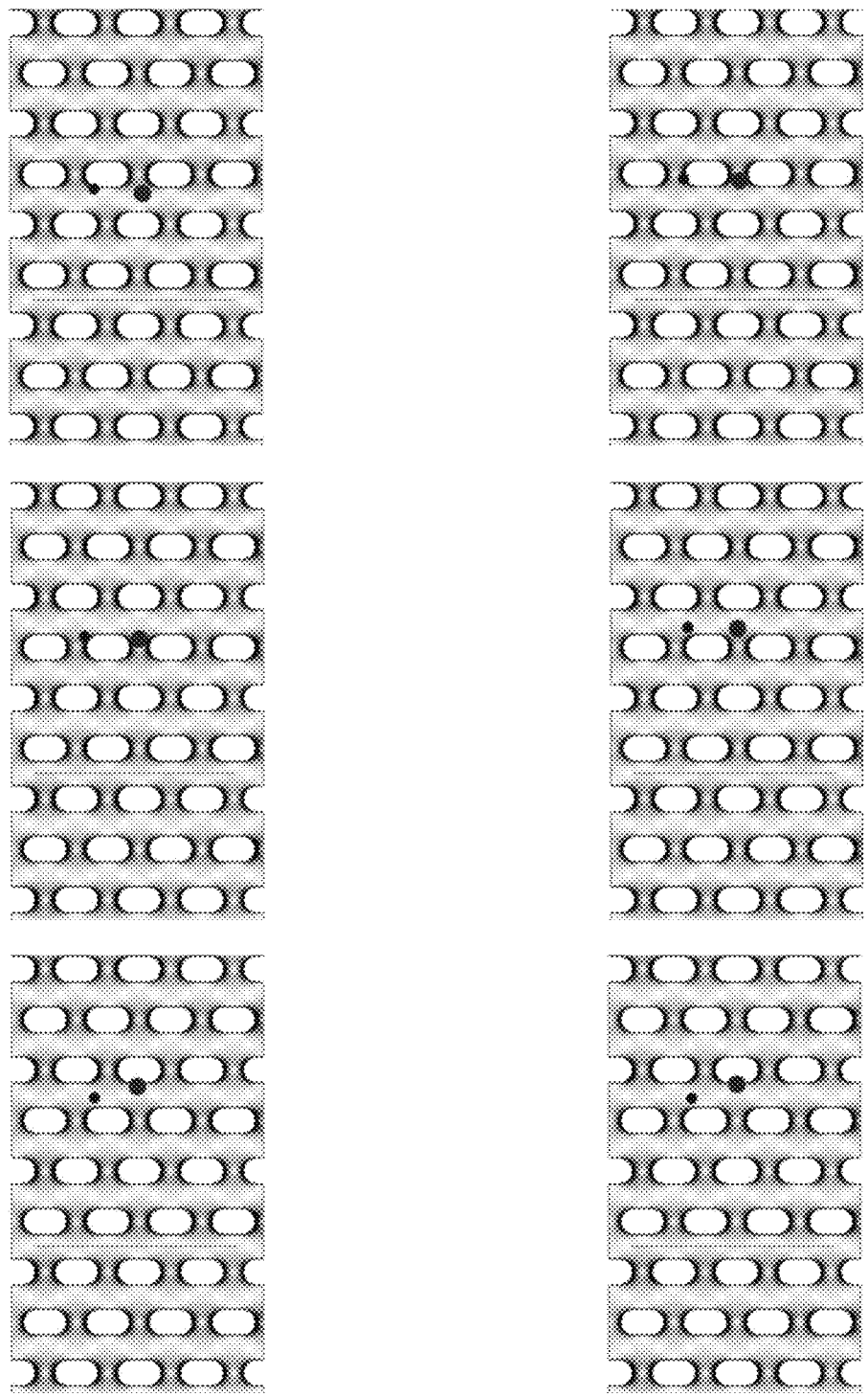
Figure 23E:
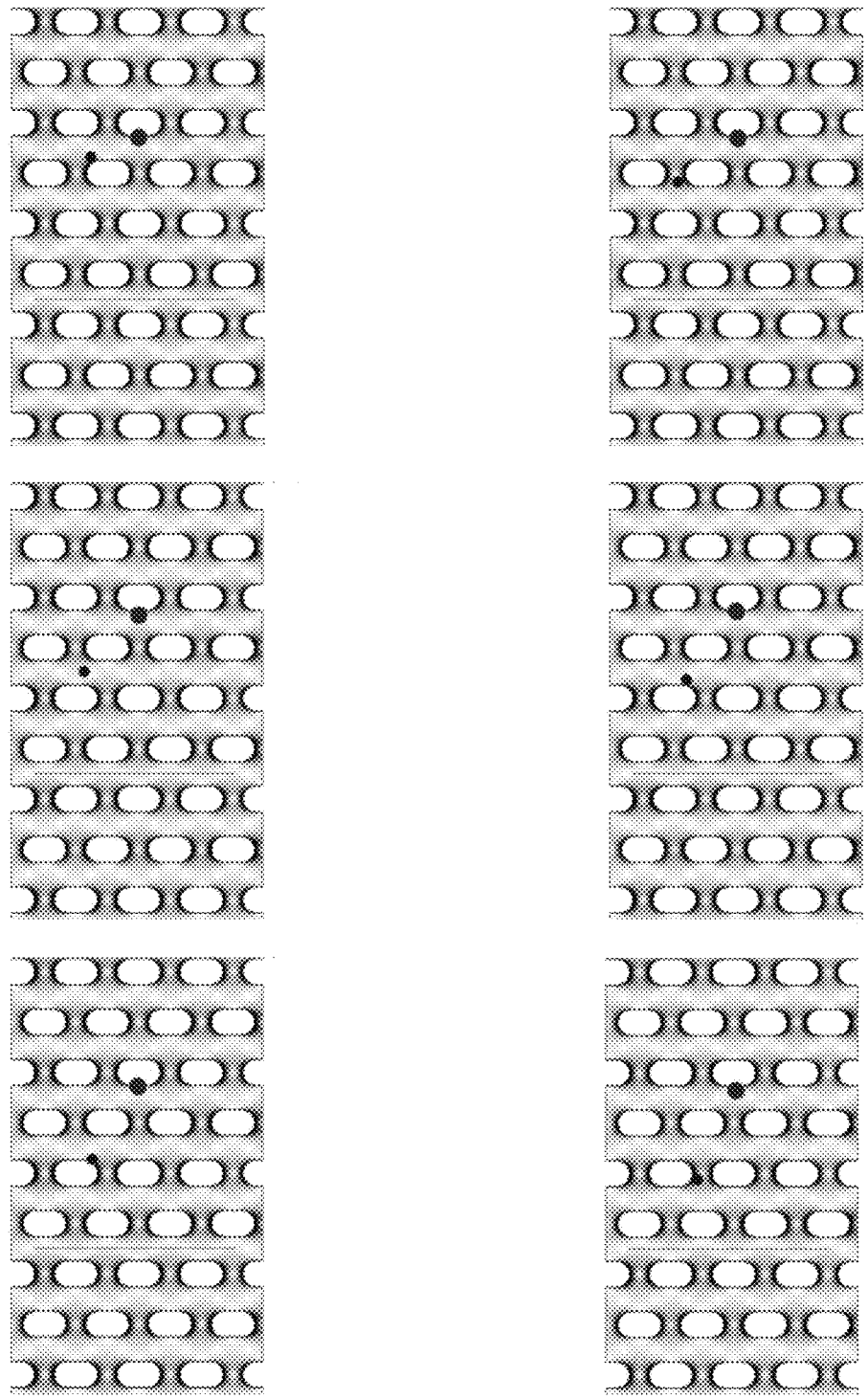
Figure 23F:
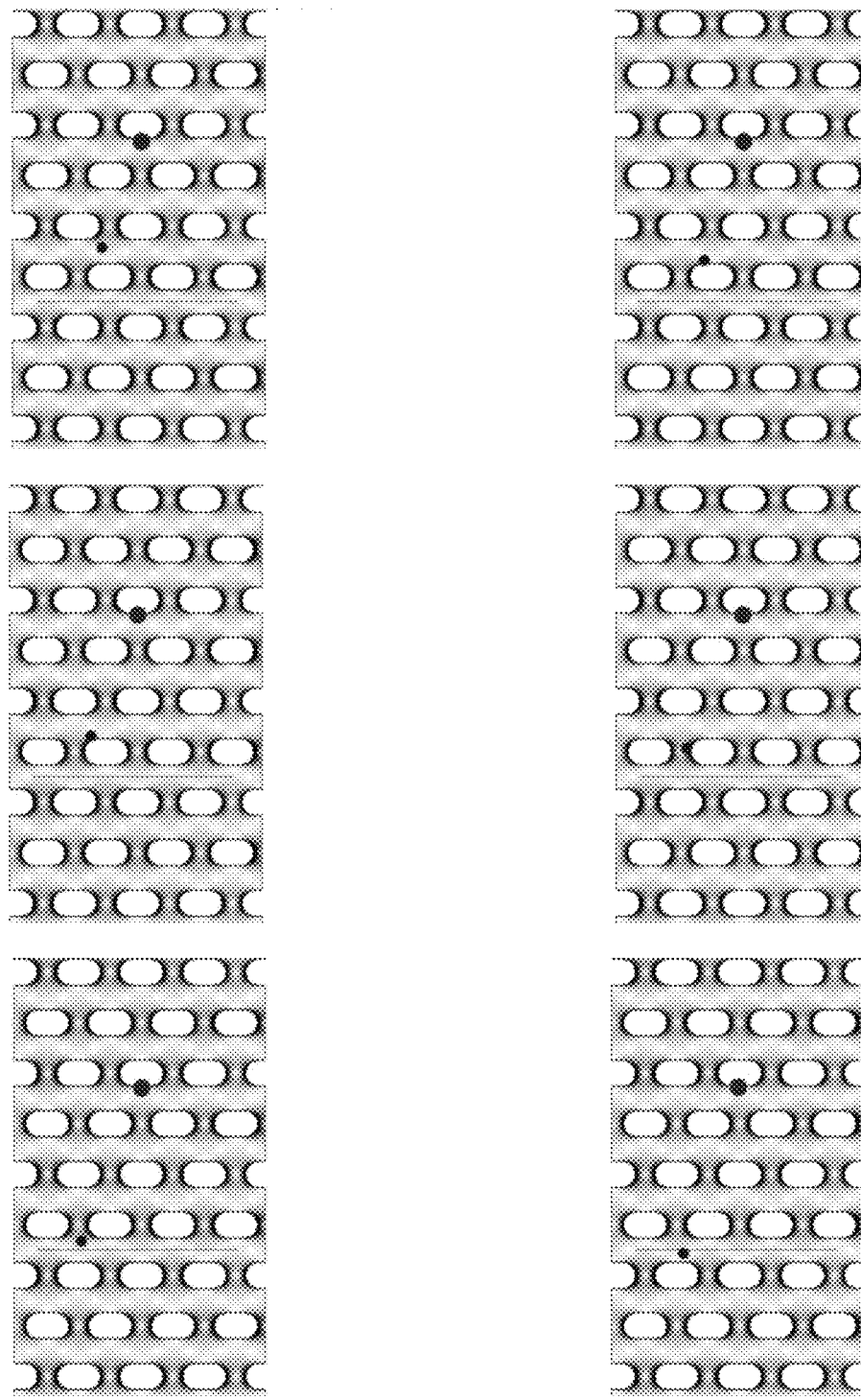
Figure 23G:
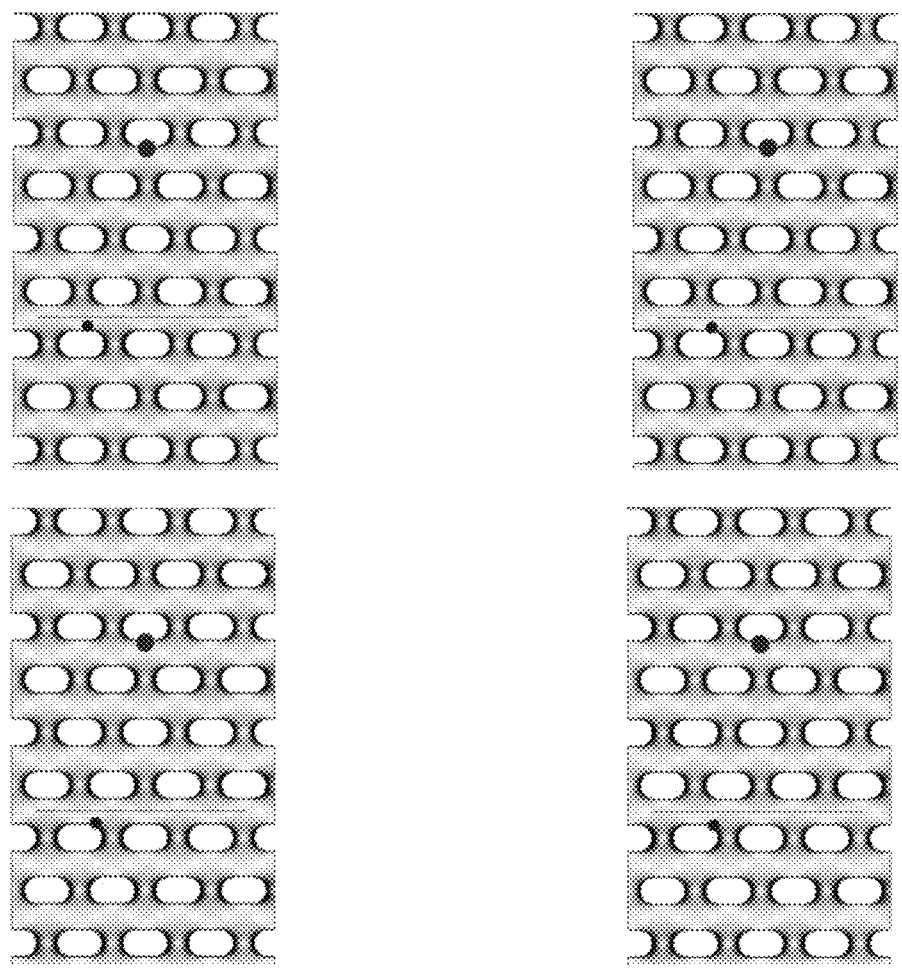
Figure 24A:
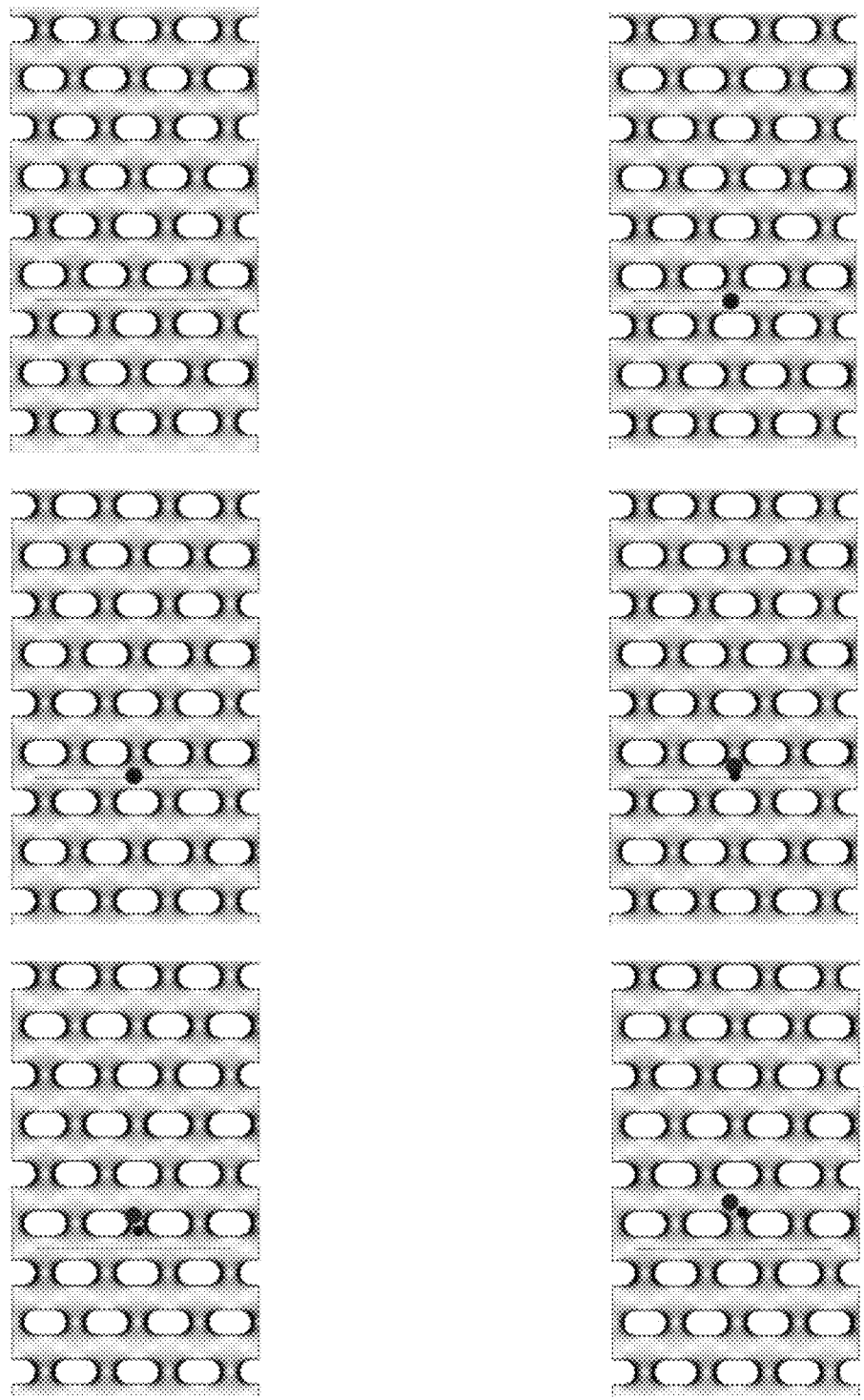
FIGS. 24A-24E are frames from Video S-2 that indicate simulation results and show polystyrene beads' migration behavior under the negative $U_{dc}$ offset, in accordance with some embodiments.
Figure 24B:
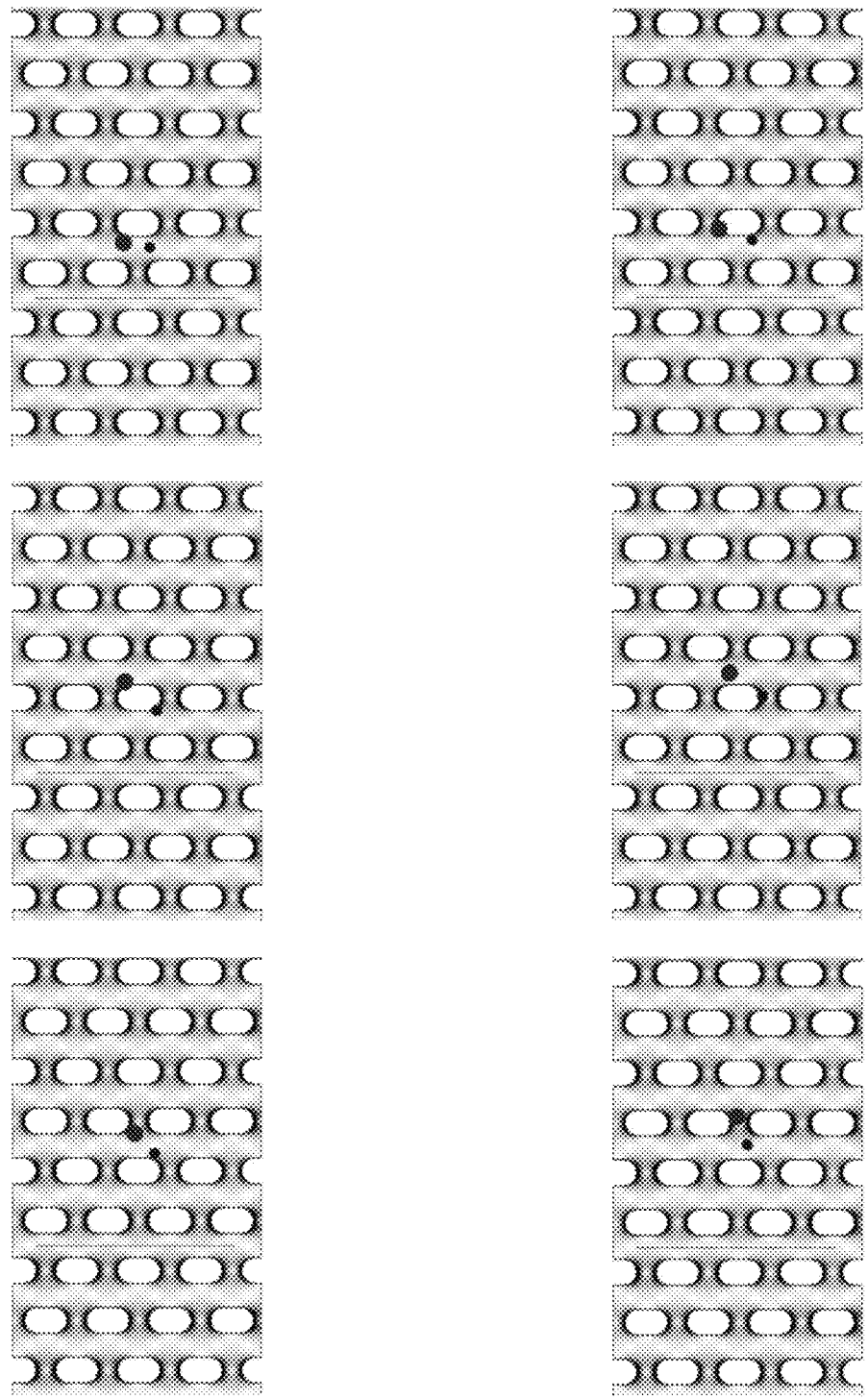
Figure 24C:
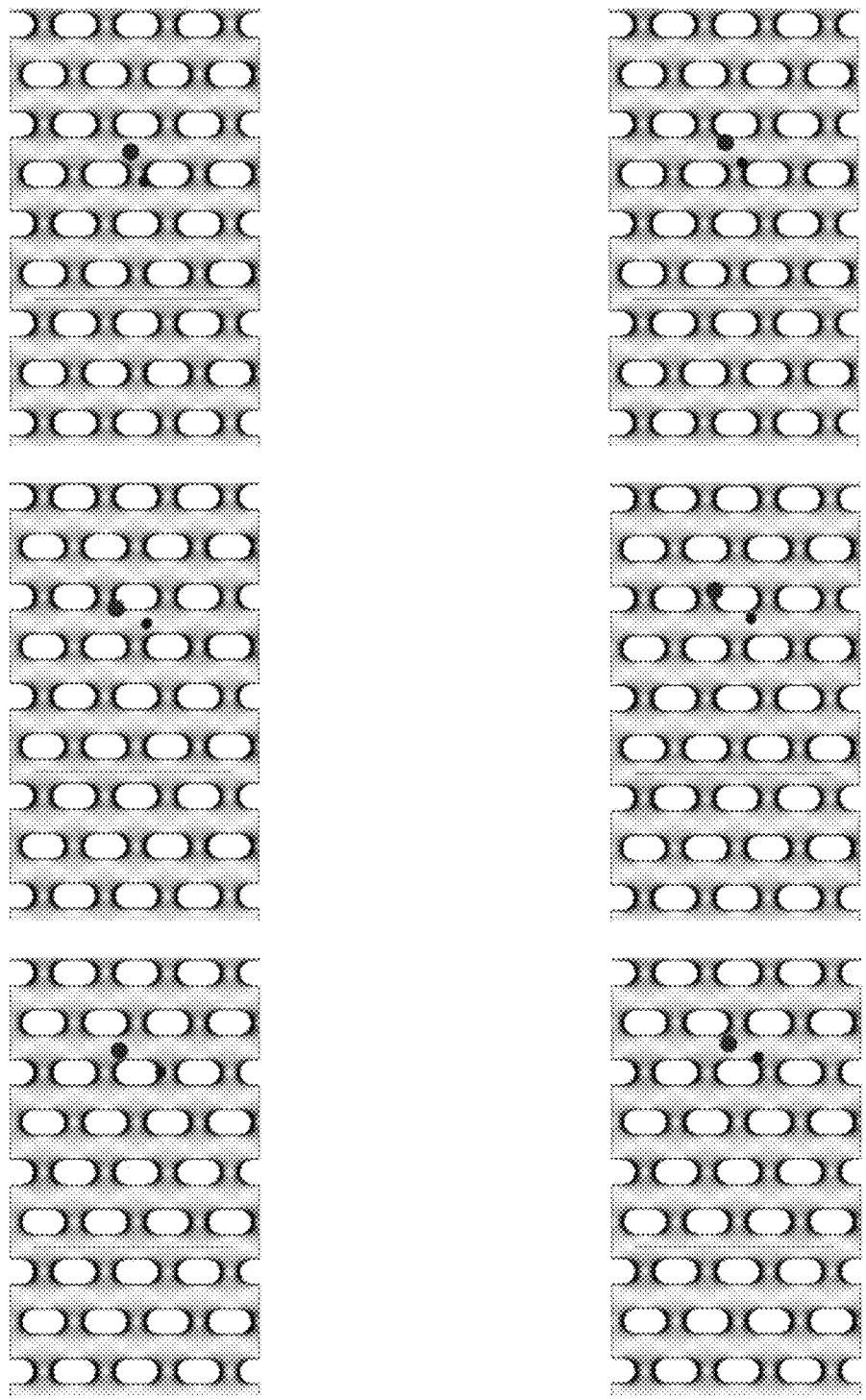
Figure 24D:
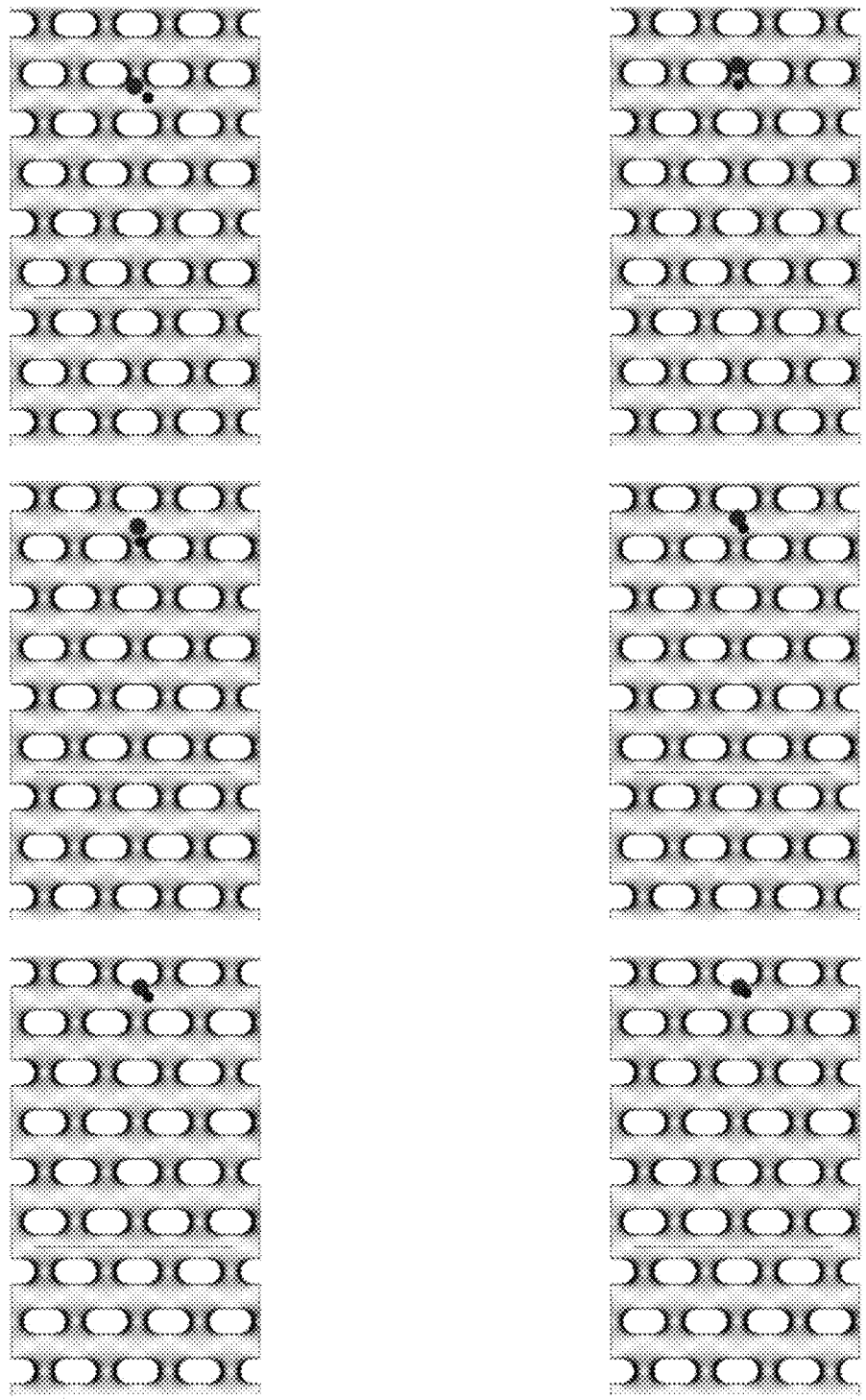
Figure 24E:
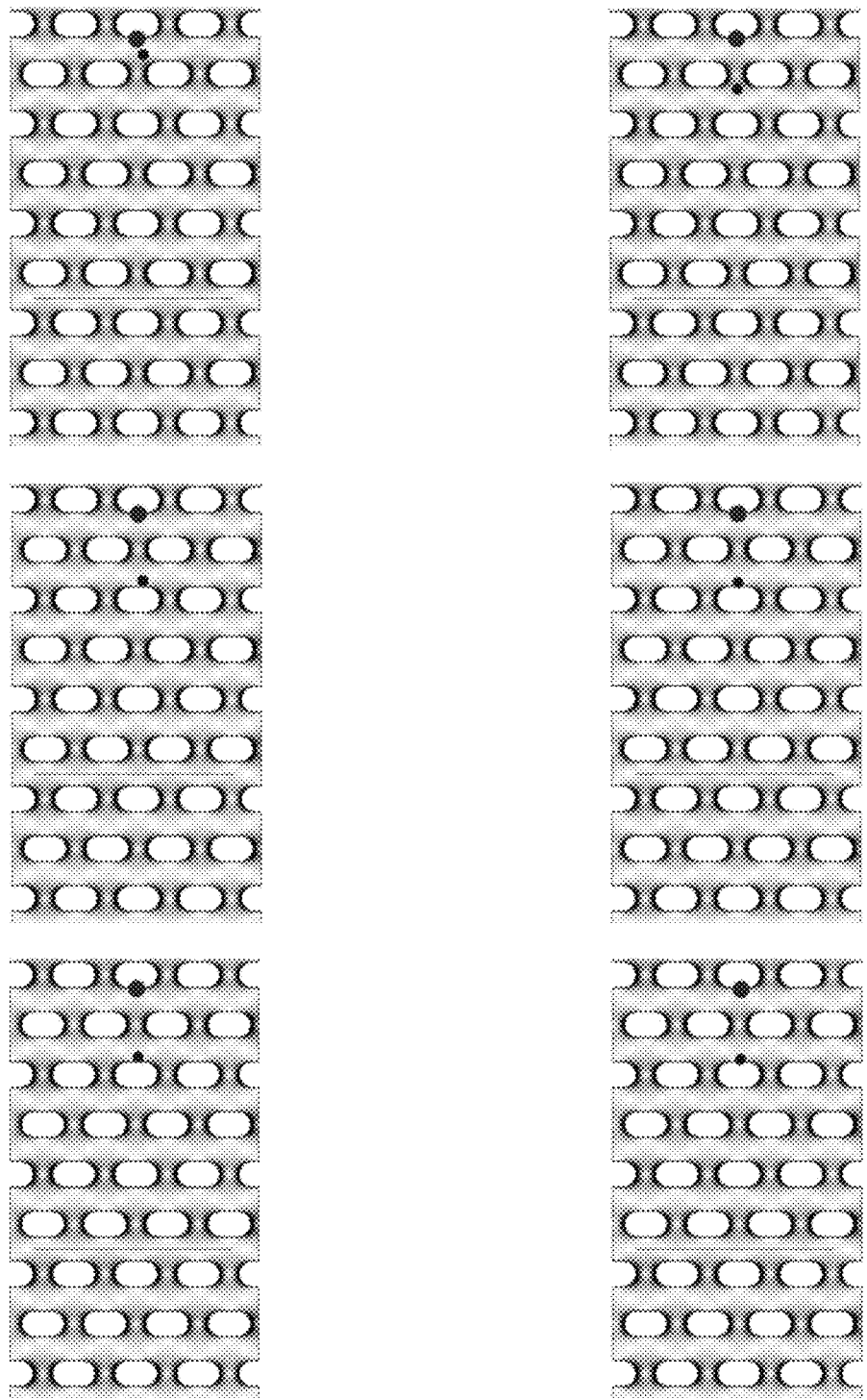
Figure 24F:
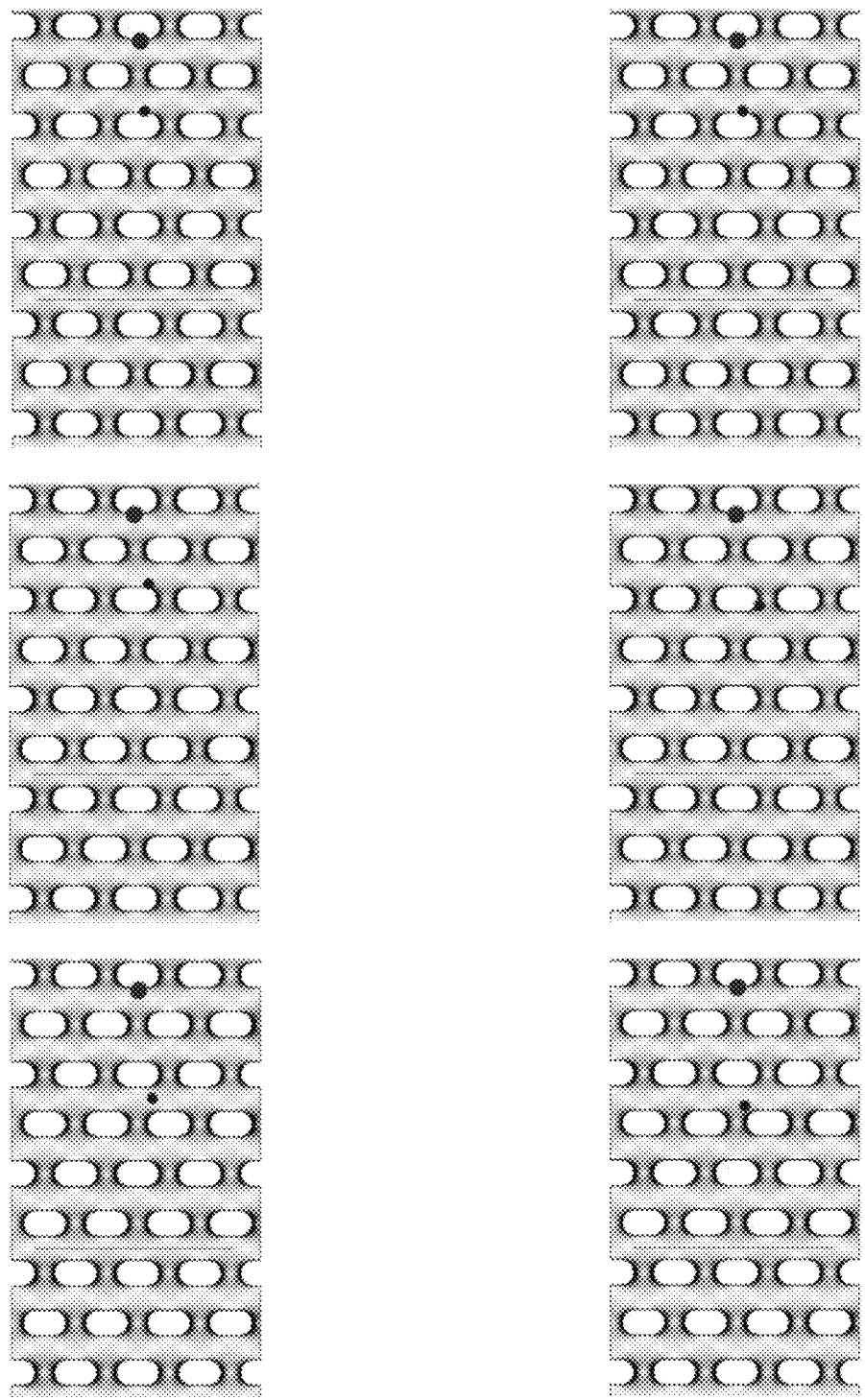
Figure 24G:
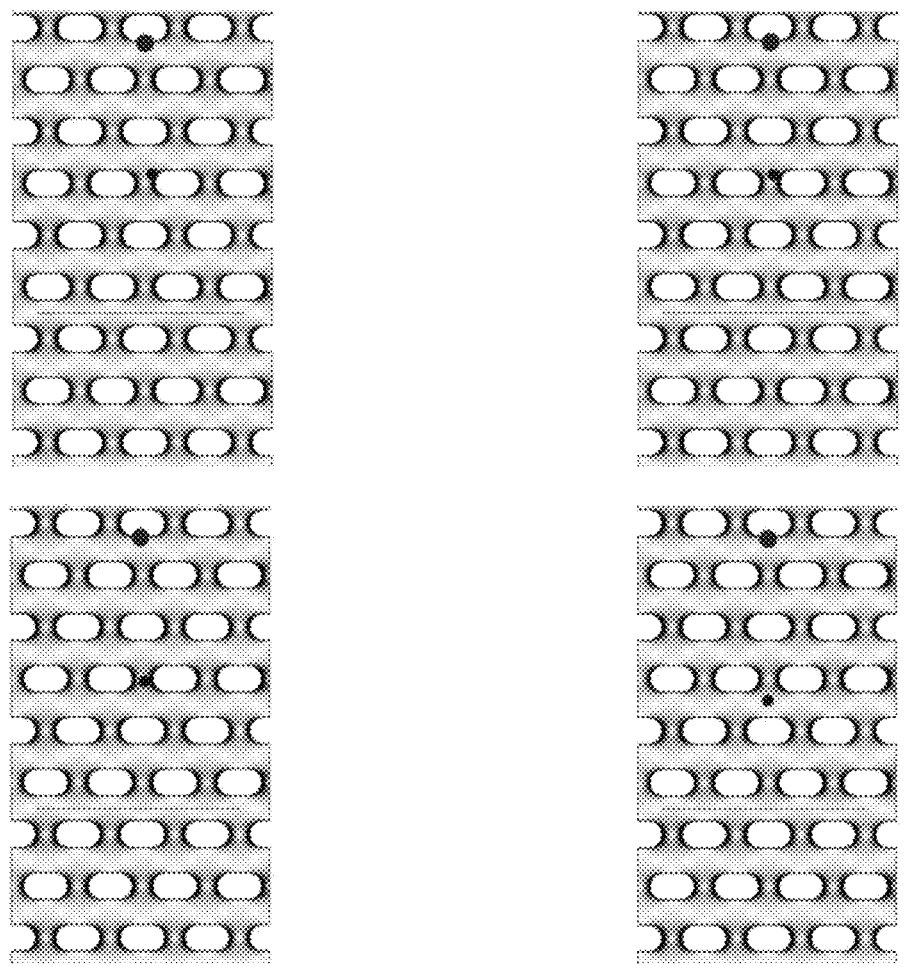
Figure 25A:
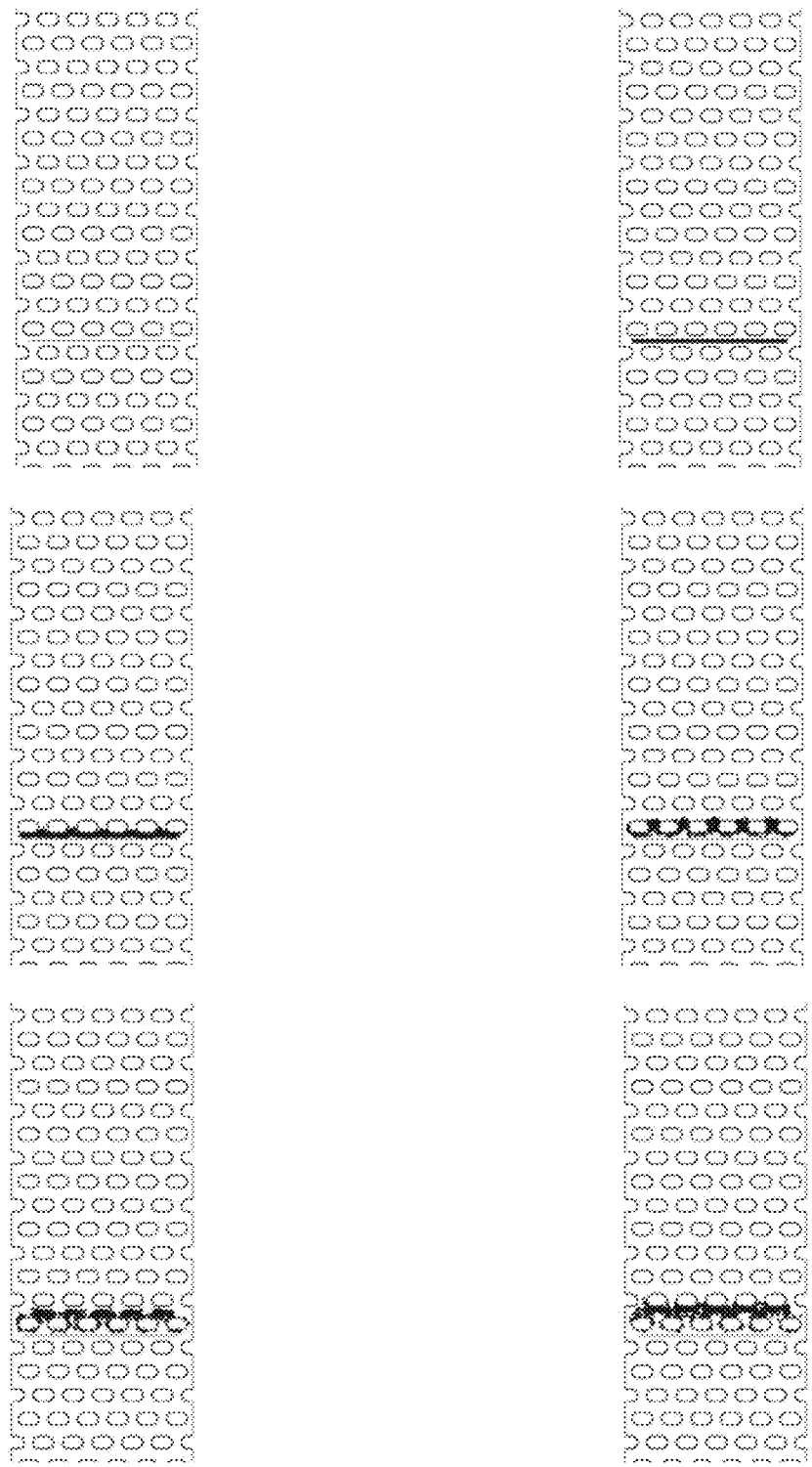
FIGS. 25A-25I are frames from Video S-3 that indicate simulation results and show ratchet behavior of 0.87 μm beads and normal behavior of 0.28 μm beads, in accordance with some embodiments.
Figure 25B:
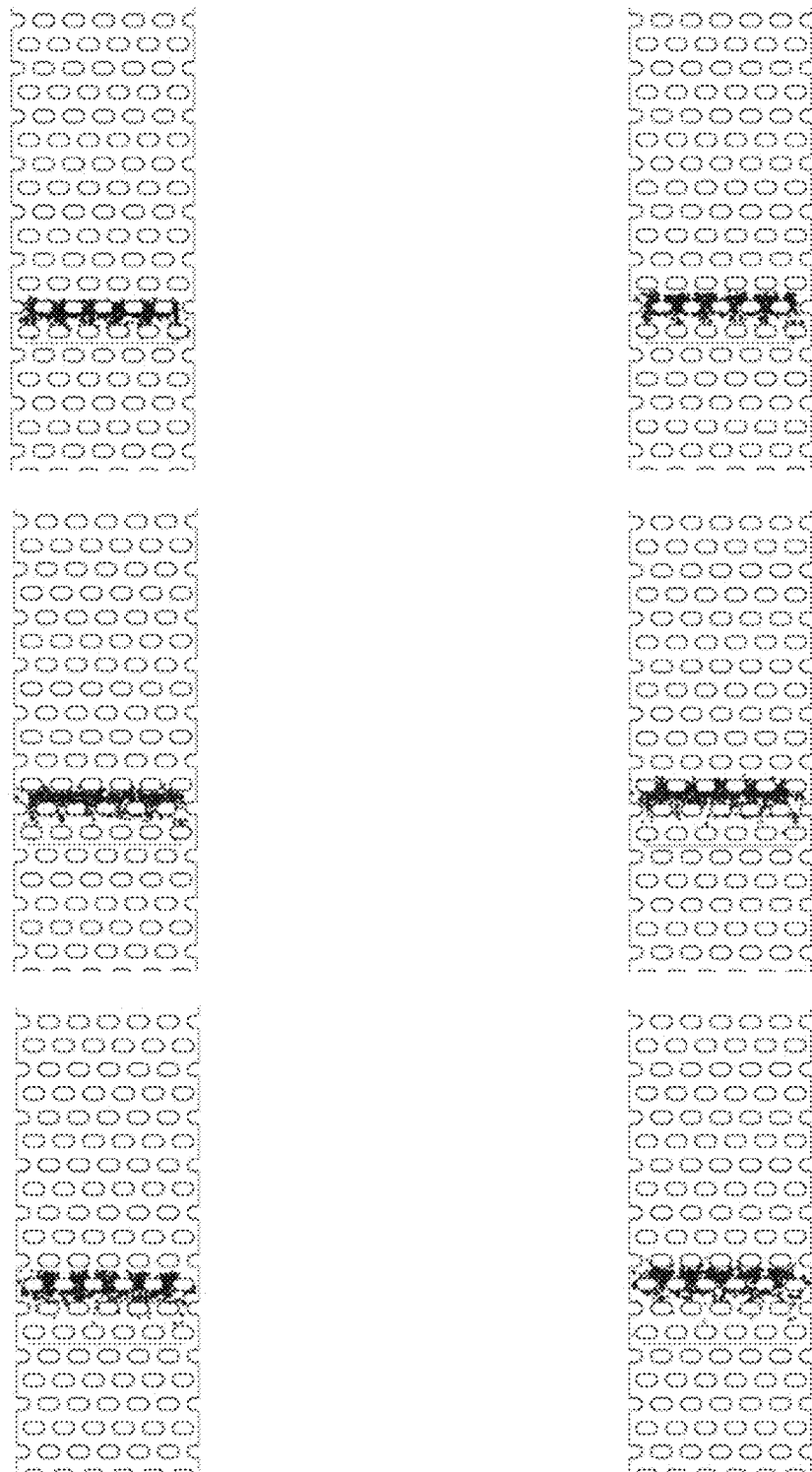
Figure 25C:
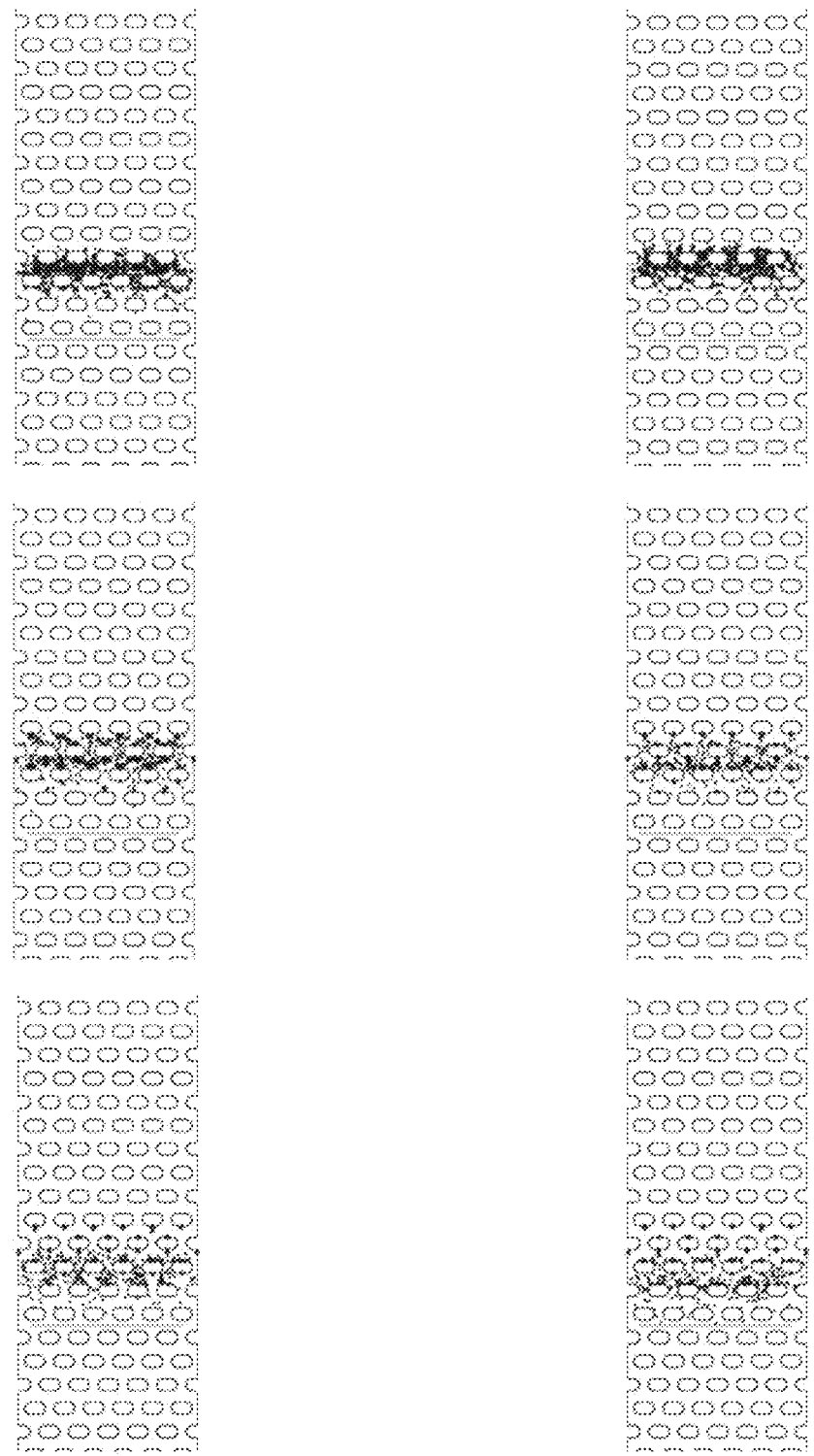
Figure 25D:
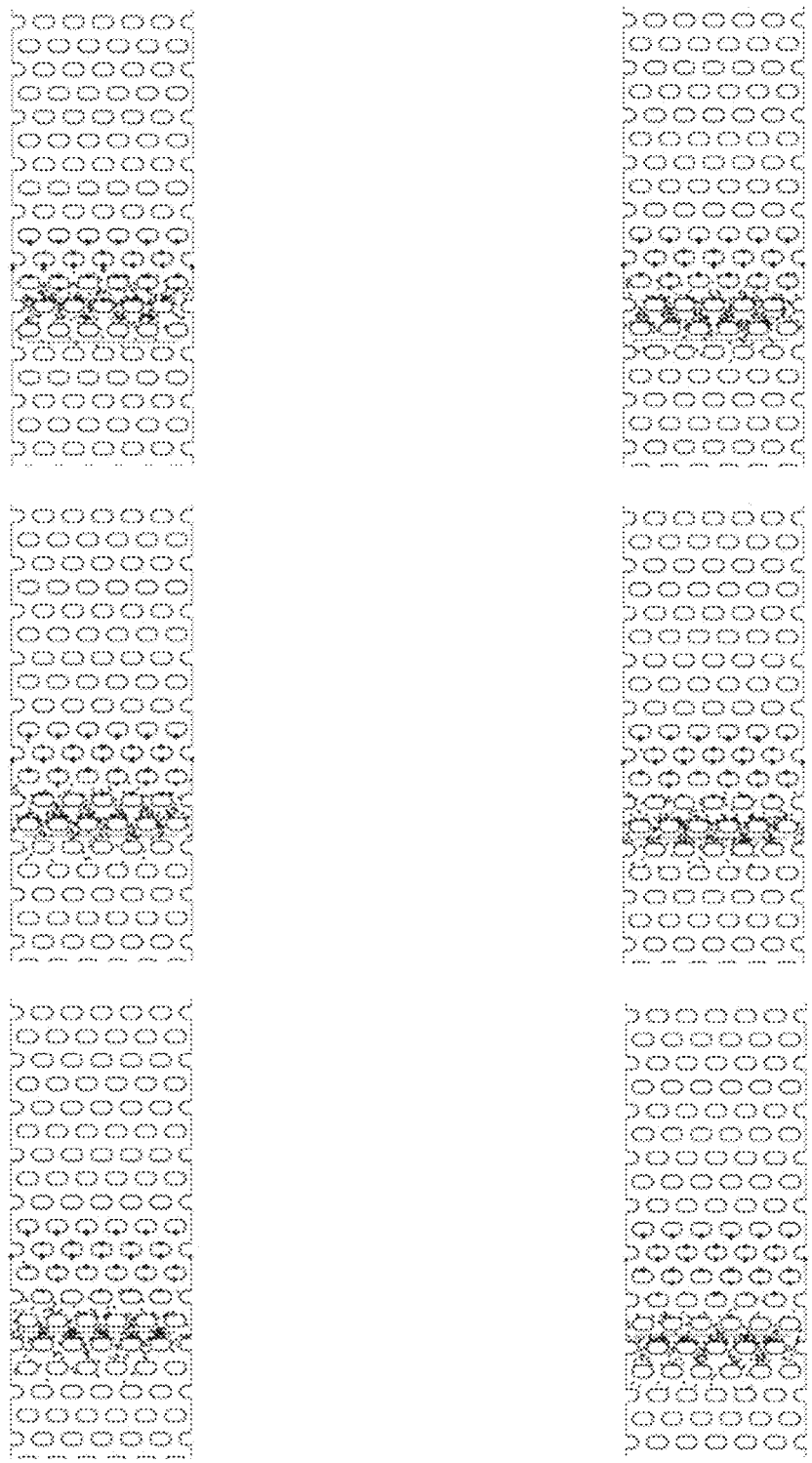
Figure 25E:
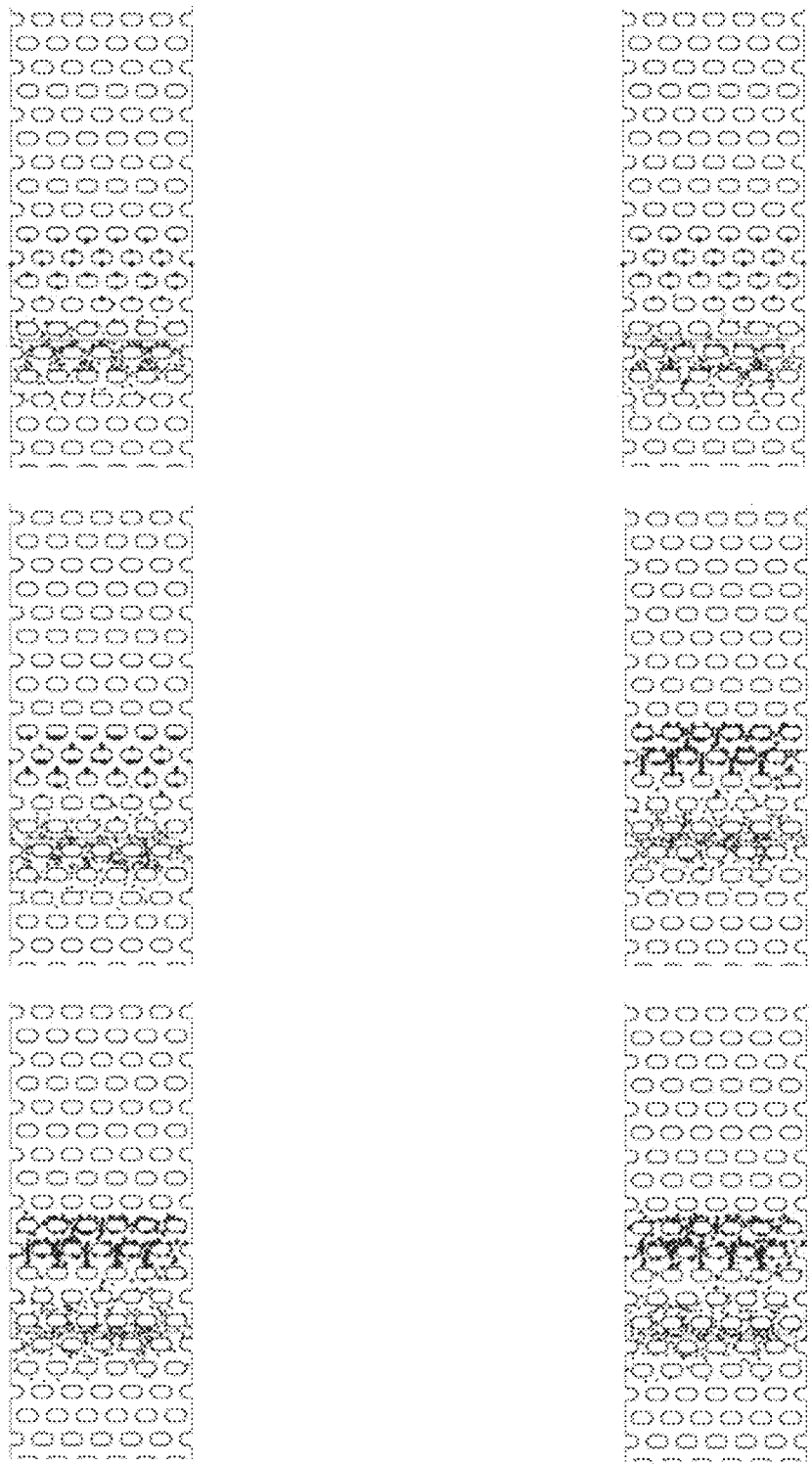
Figure 25F:
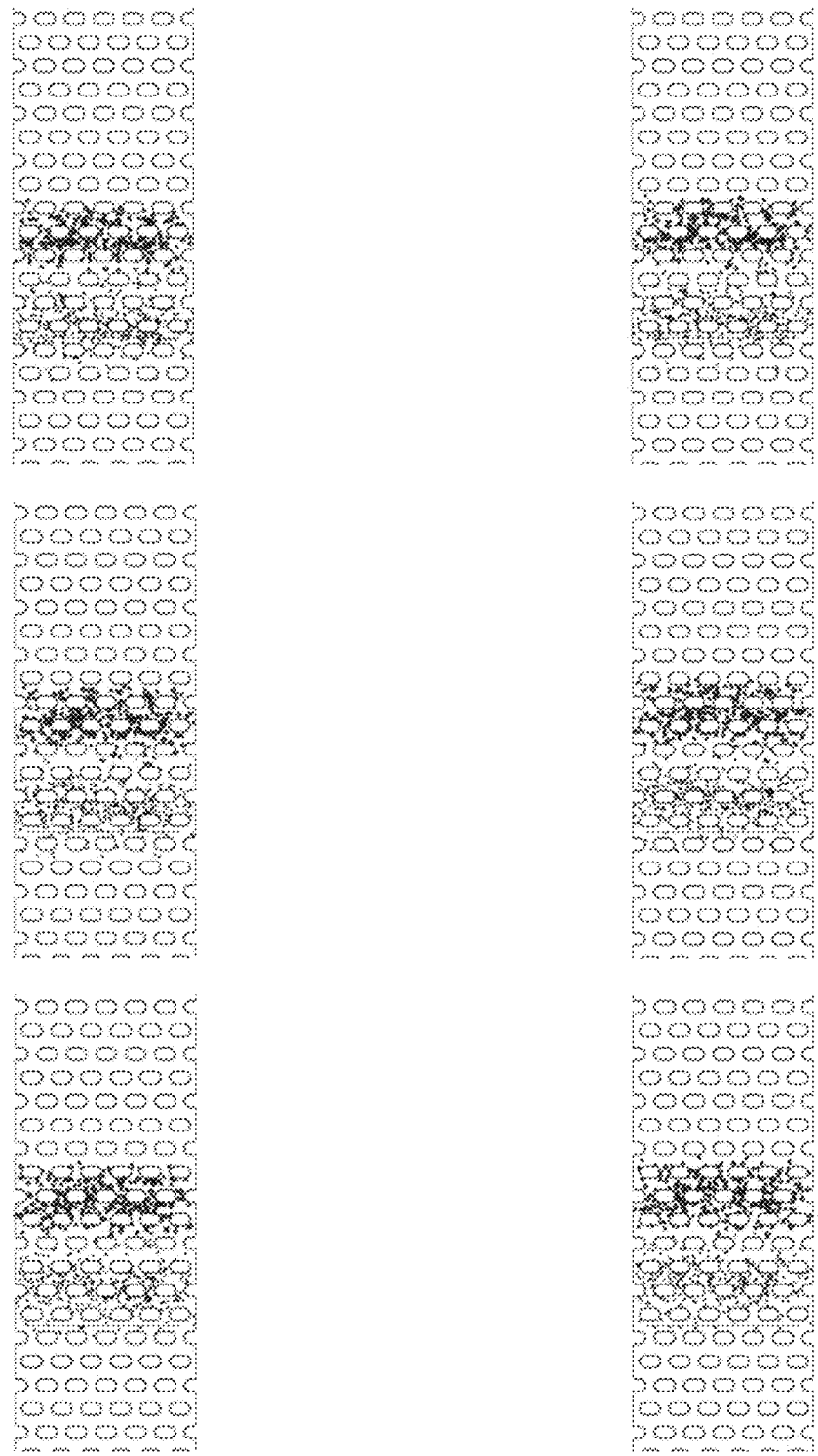
Figure 25G:
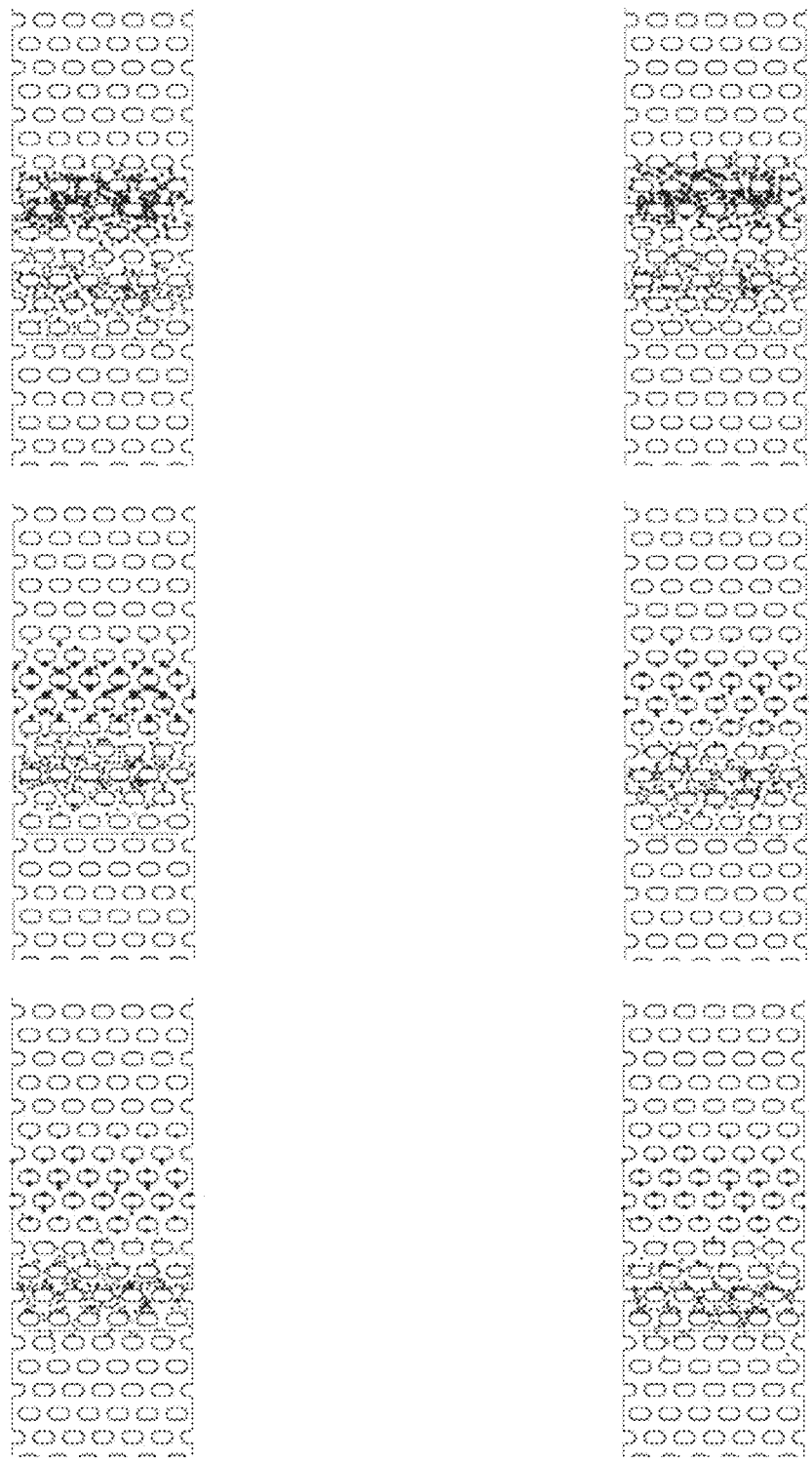
Figure 25H:
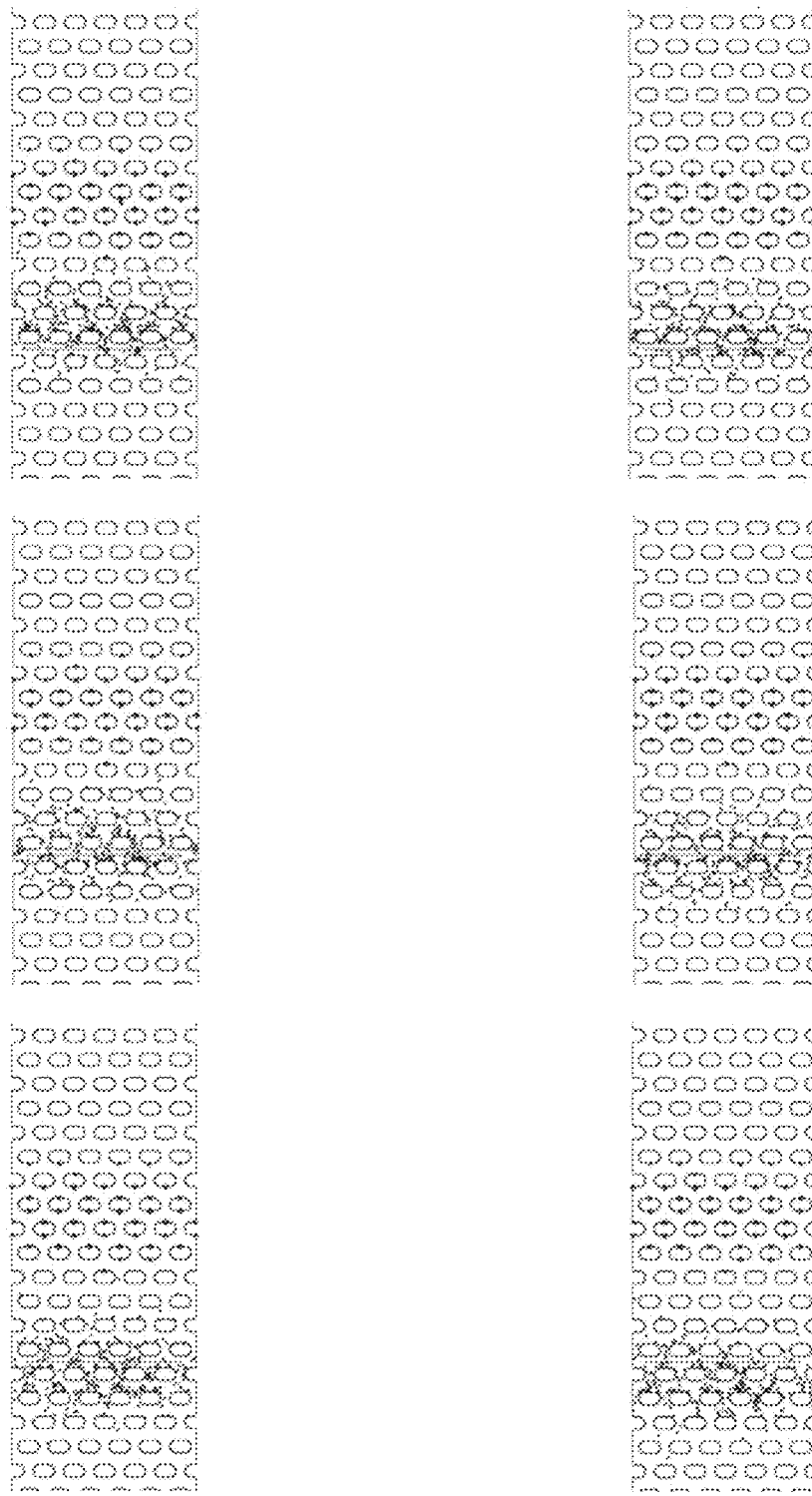
Figure 25I:
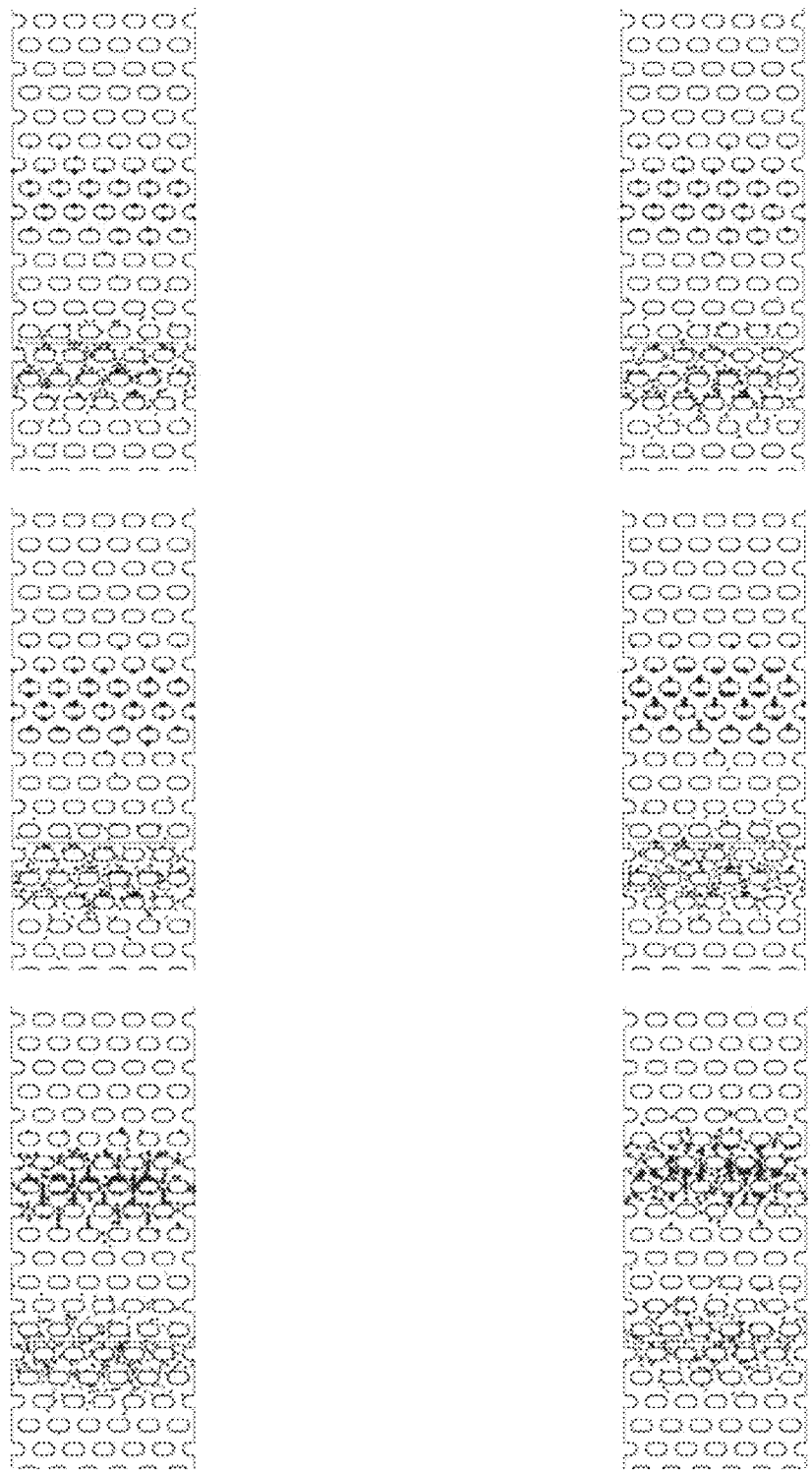
Figure 25J:
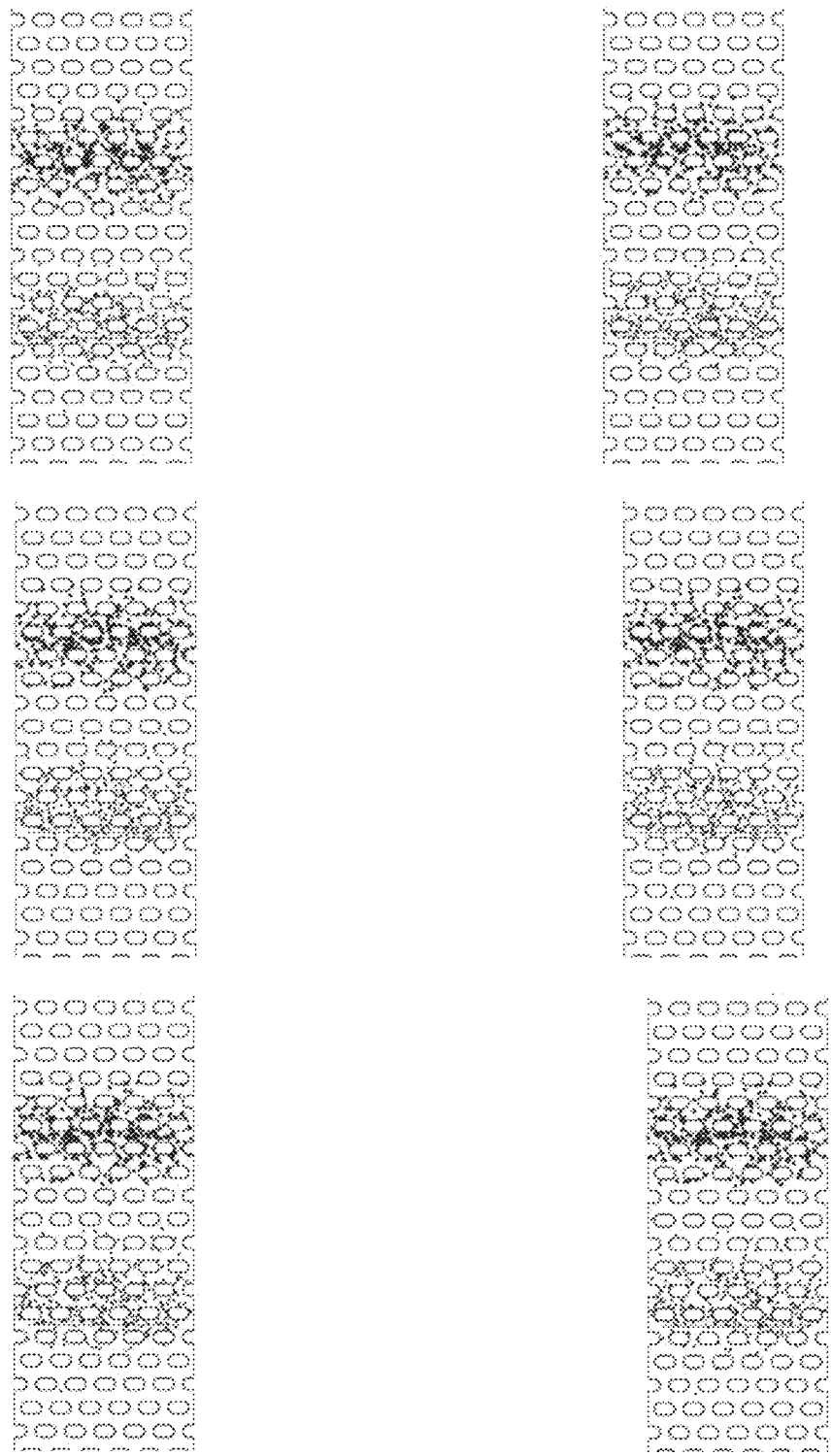
Figure 25K:
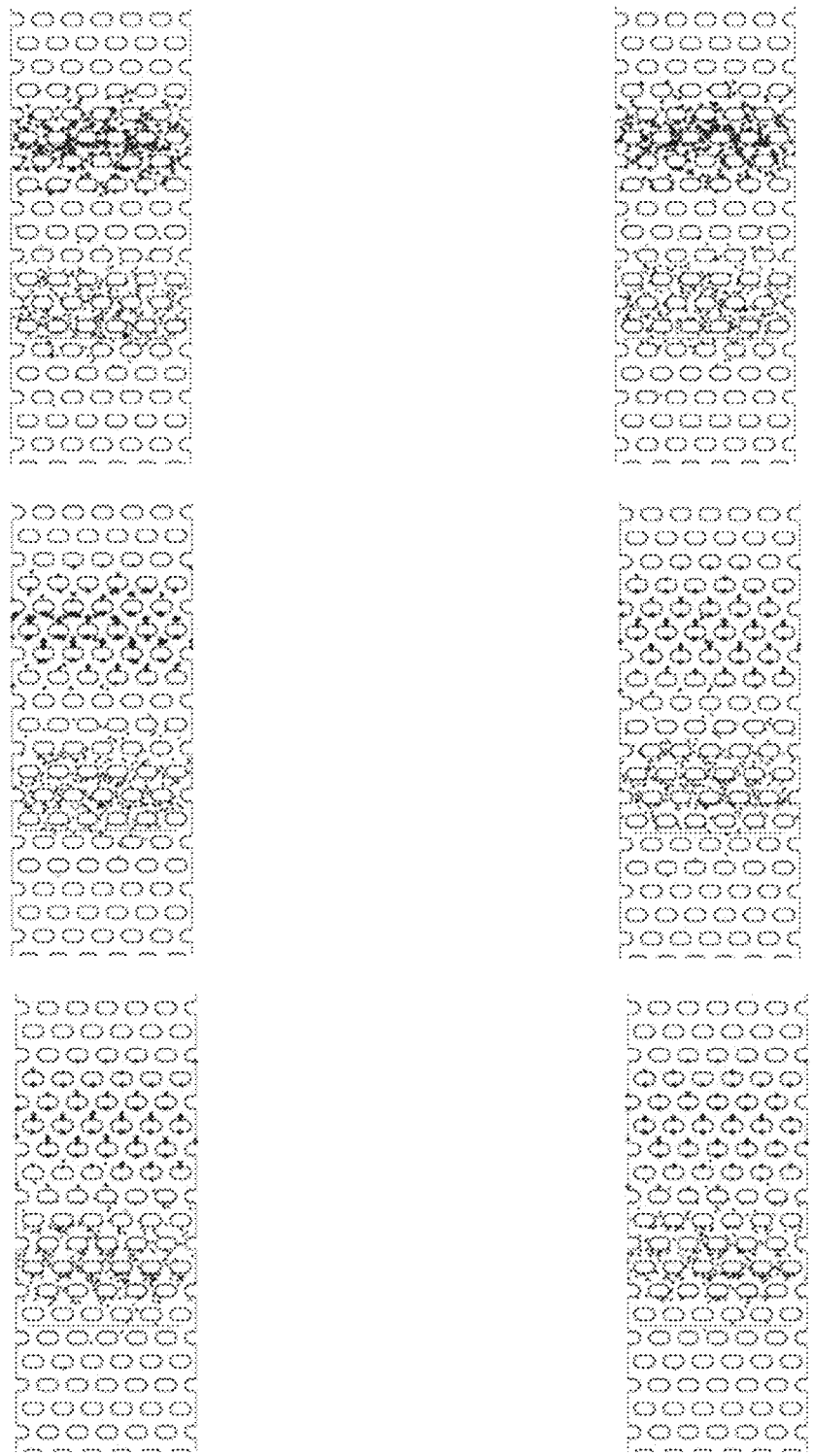
Figure 25L:
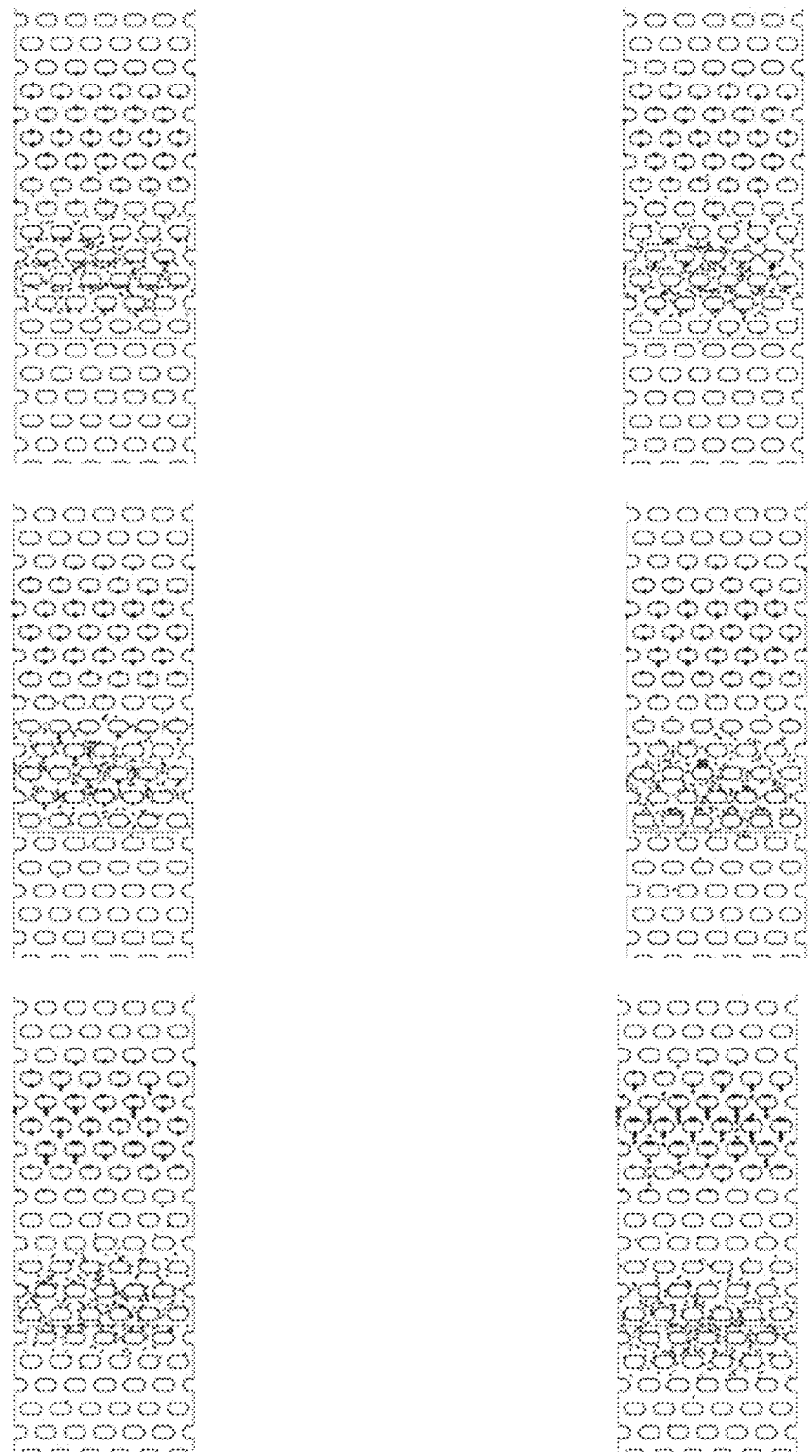
Figure 26A:
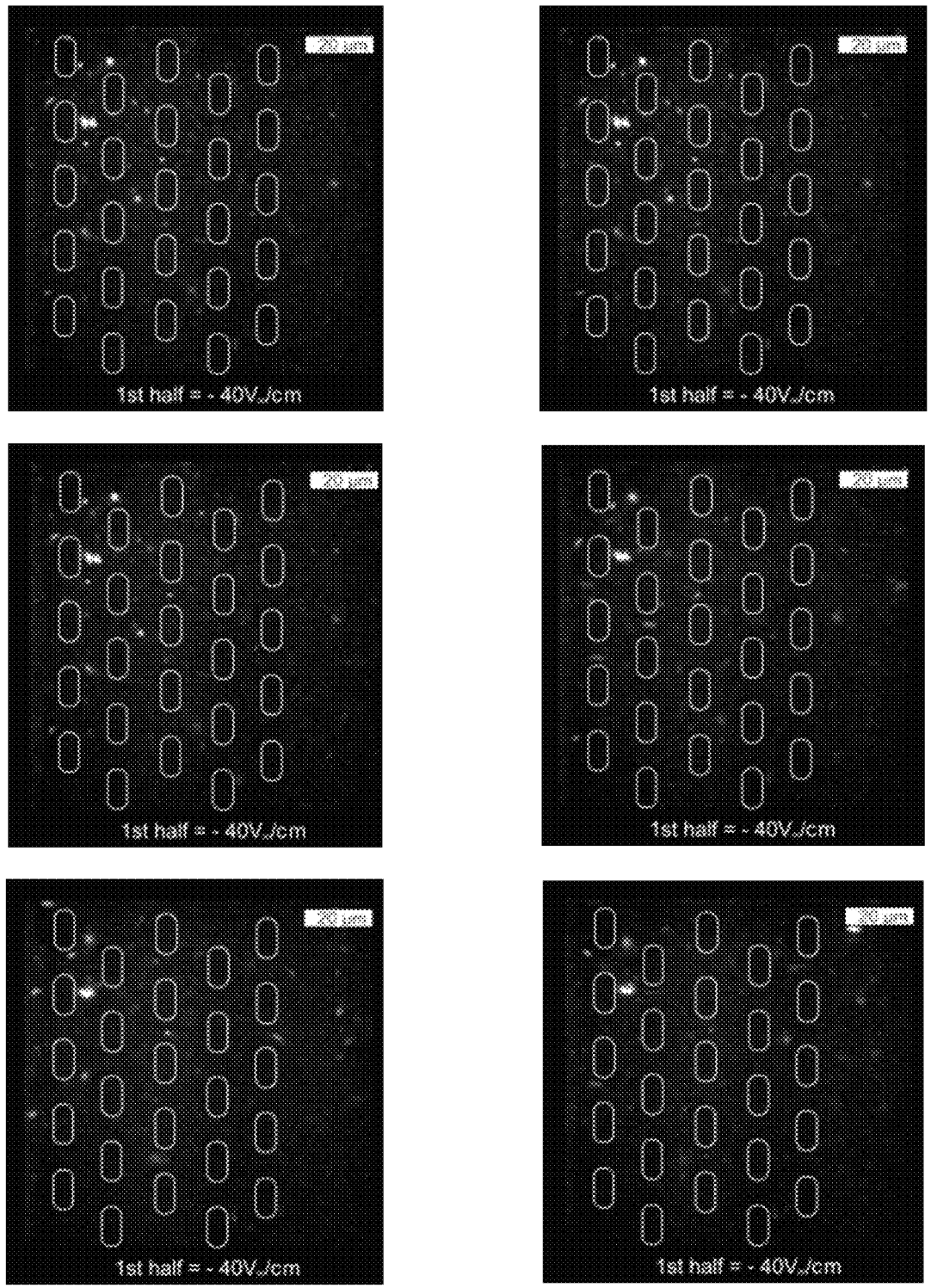
FIGS. 26A-26D are frames from Video S-4 that indicate experimental results and show ratchet behavior of mouse liver mitochondria, in accordance with some embodiments.
Figure 26B:
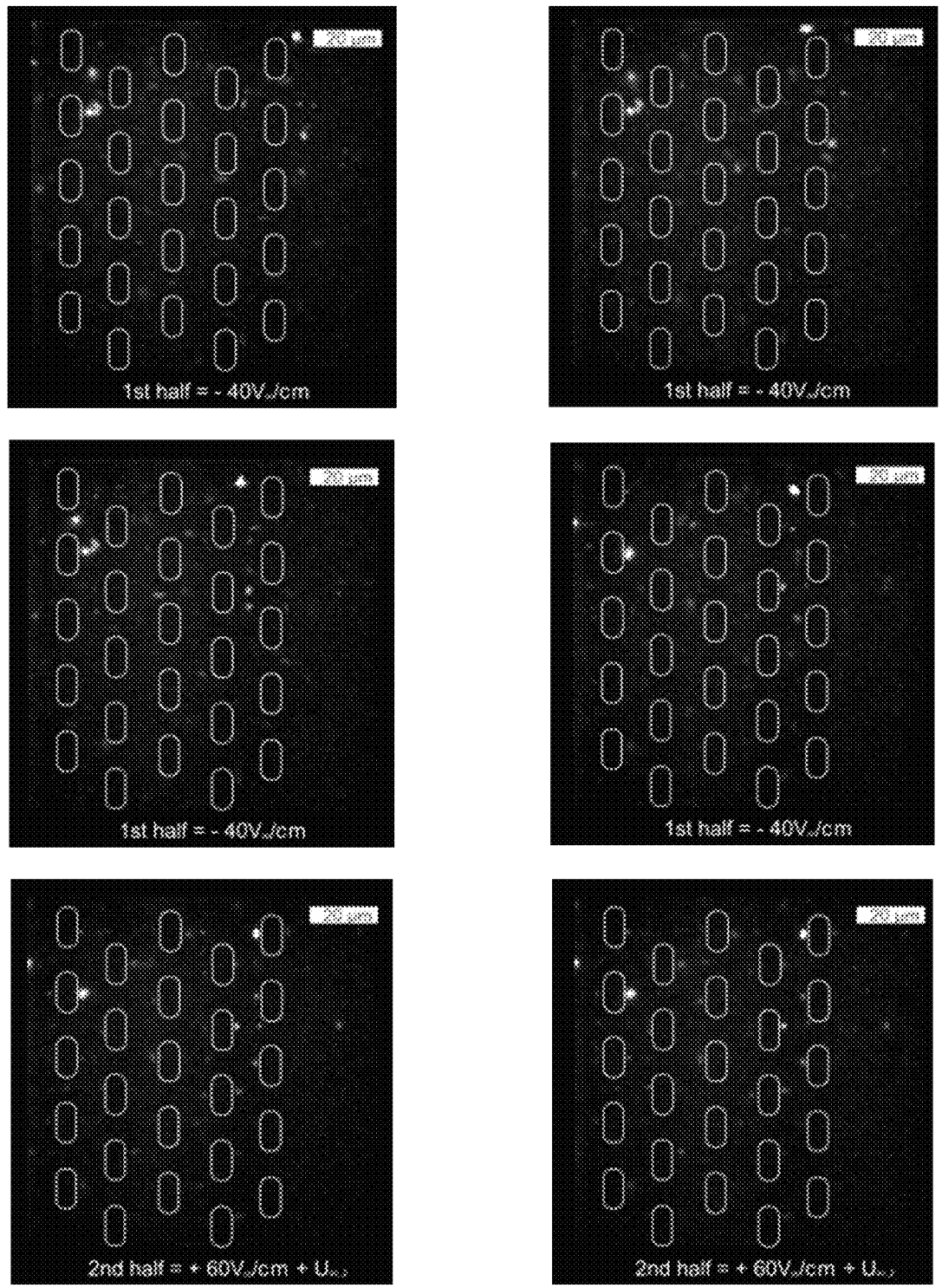
Figure 26C:
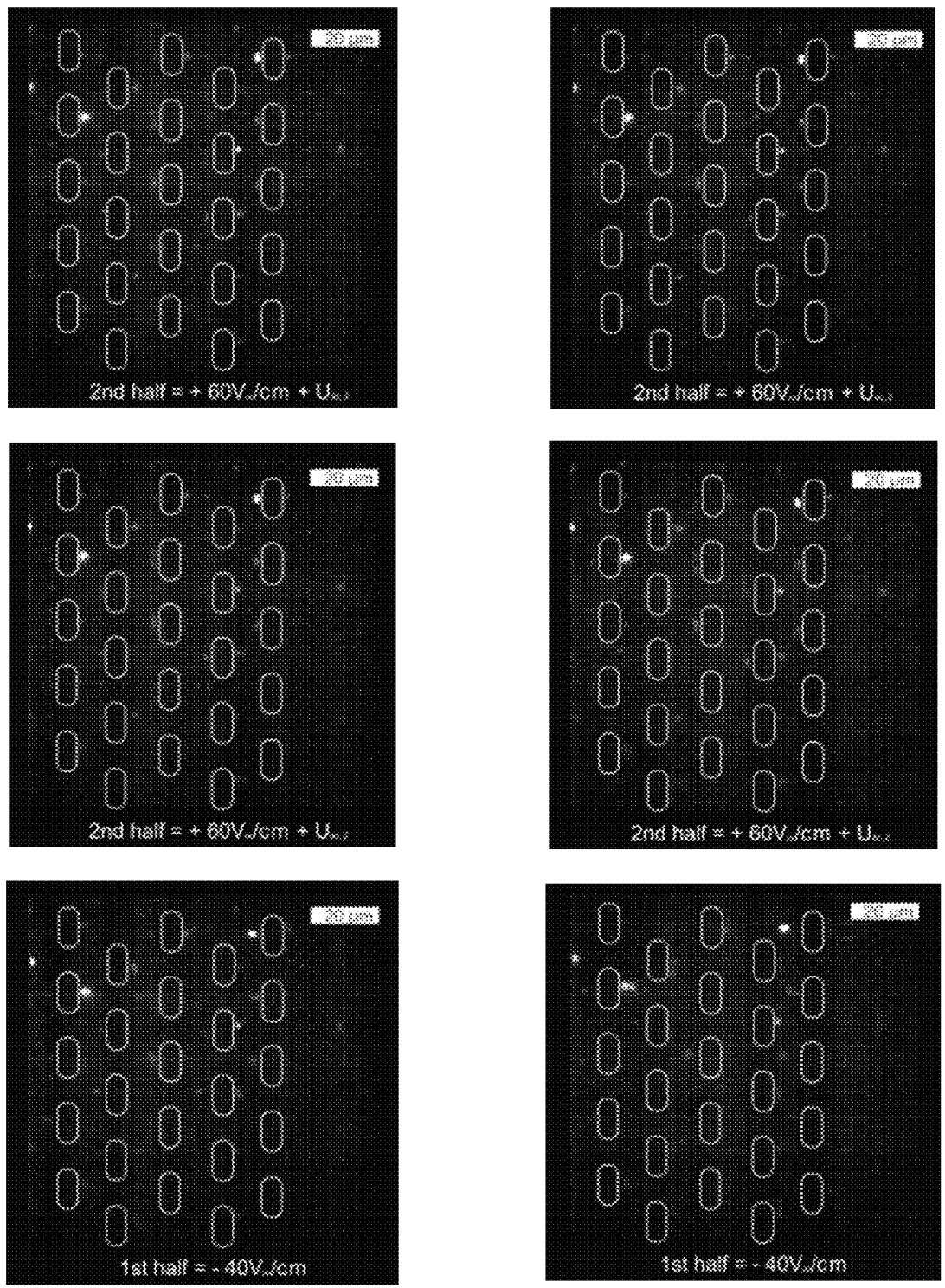
Figure 26D:
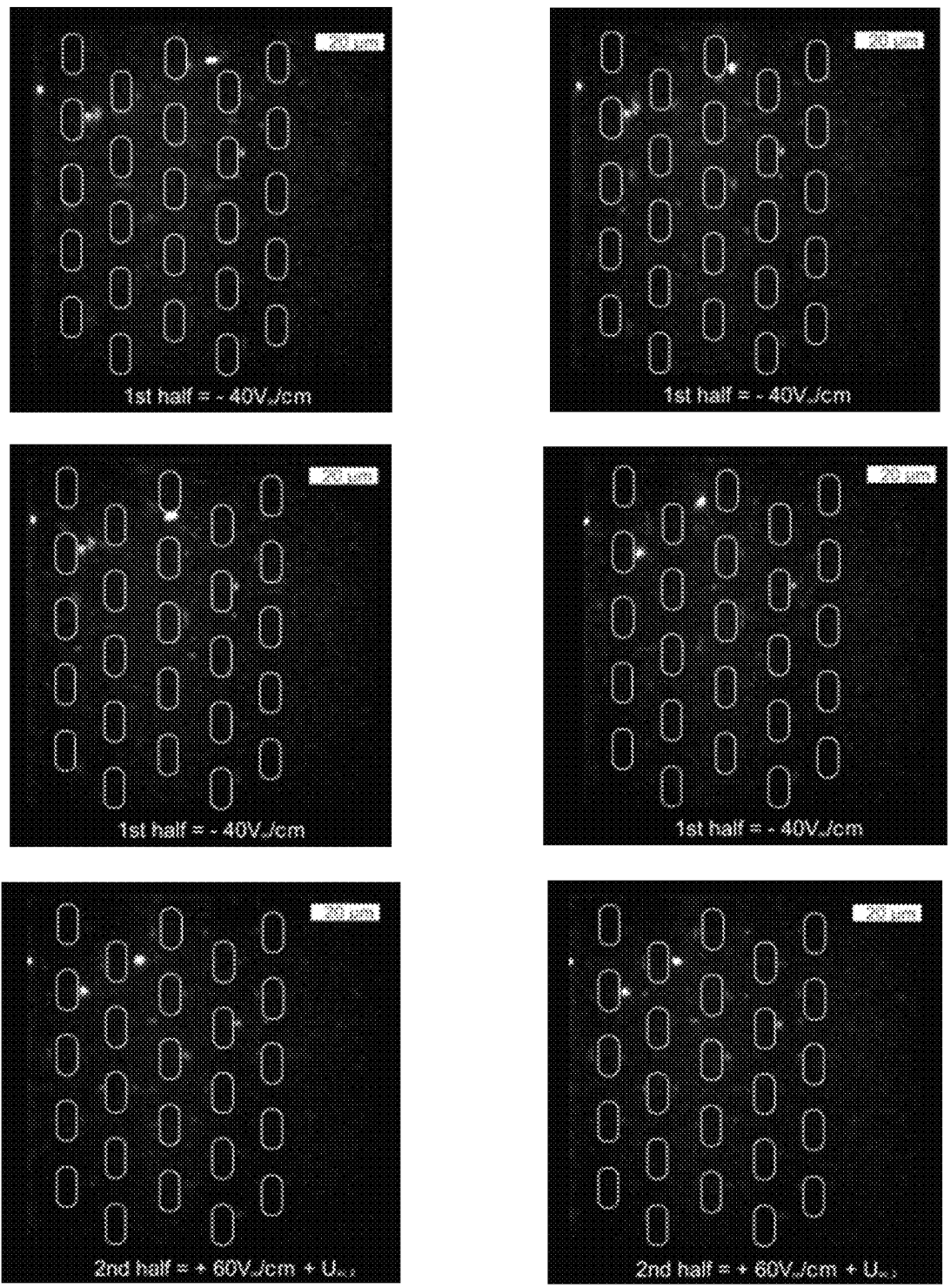
Figure 26E:
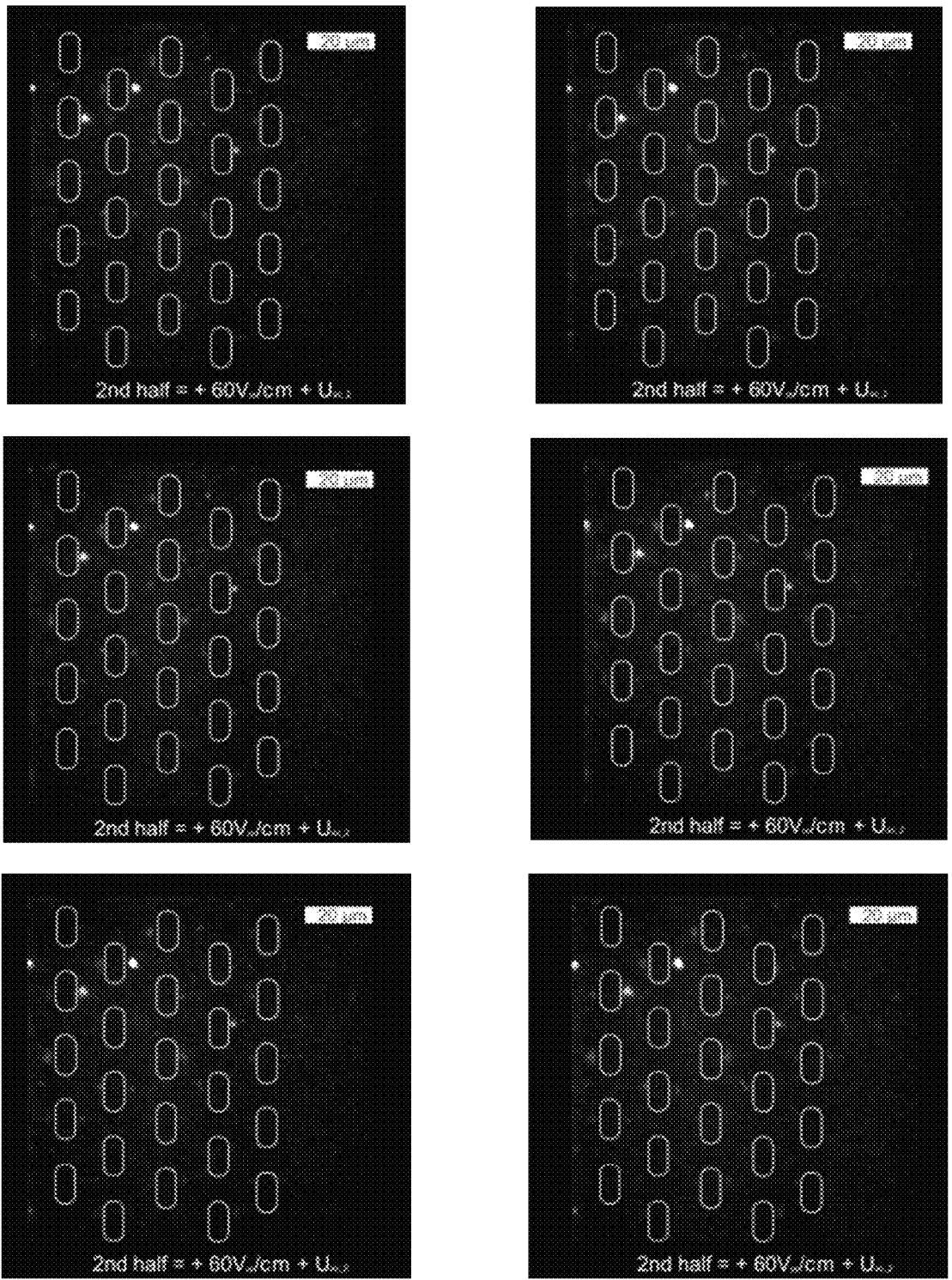
Figure 26F:
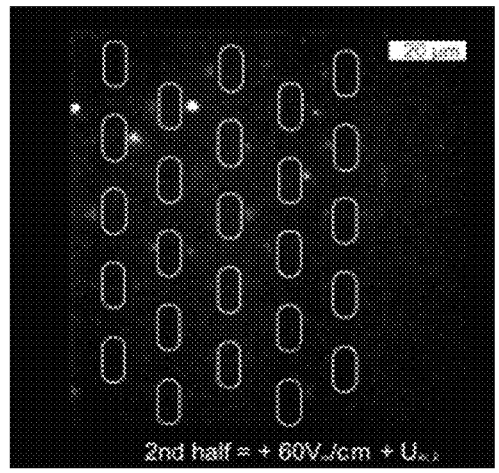
Figure 26F:
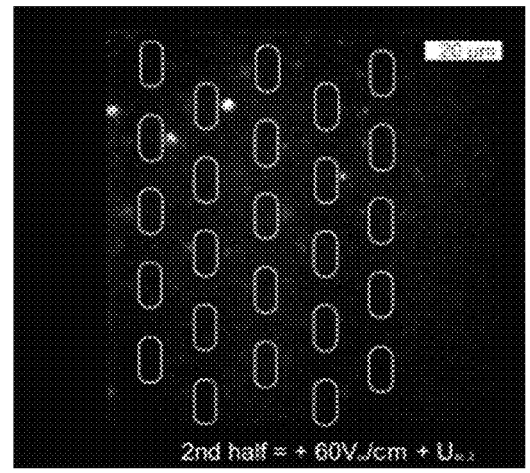
Figure 26F:
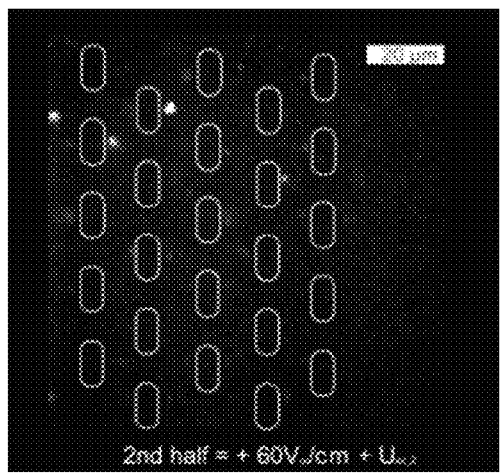

FIG. 22 illustrates resolution vs. DC offset for trajectories of 100 particles. The resolution is determined for the trajectory of 100 particles for a range of positive DC offsets between 0V and 20V. The resolution is determined in accordance with eq. 3. Here ΔX refers to the distance between peaks, and W1 and W2 are the full widths at half maximum of Gaussian fits of the position distribution. R was obtained for both particle number and period variation by extracting the location of both particle sizes after each period from the resulting end coordinates in the COMSOL model Various features and advantages of the invention are set forth in the following claims.

What is claimed is:

1. A system for separating sub-micrometer sized bioparticles, the system comprising:
a structure including a microfluidic channel and a plurality of micro-posts disposed within the microfluidic channel; and
an electric field source configured to apply an electric field gradient to a fluidic sample in the microfluidic channel to induce transport of sub-micrometer sized bioparticles in the fluidic sample,
wherein the electric field source is configured to apply the electric field gradient by
applying a first waveform to the fluidic sample in the microfluidic channel, wherein the first waveform is a square wave having an amplitude, a frequency, and a DC offset voltage, and
applying a second waveform superimposed on the first waveform to separate the sub-micrometer sized bioparticles by size, wherein the second waveform is a sinusoidal wave with a higher frequency than the first waveform, and
wherein the electric field source is configured to apply the second waveform superimposed on the first waveform only during one selected from a group consisting of a high period of the first waveform and a low period of the first waveform.

2. The system of claim 1, wherein the electric field source causes the sub-micrometer sized bioparticles to separate by migration based on size by causing a first plurality of bioparticles to migrate towards a first end of the microfluidic channel and causing a second plurality of bioparticles to migrate towards a second end of the microfluidic channel.

3. The system of claim 1, wherein the micro-posts are oval-shaped, circular-shaped, half-circle shaped, tip-shaped, or needle shaped.

4. The system of claim 1, wherein a first row of the plurality of micro-posts is offset a predetermined amount from an adjacent second row of the plurality of micro-posts.

5. The system of claim 1, wherein the first waveform is characterized as $$\left\{ -U_{ac\_1} \times \mathrm{sgn}\left[\sin\left(\frac{2\pi}{\tau}t\right)\right] + U_{dc} \right\}$$

where $U_{dc}$ is a magnitude of the DC offset voltage and $U_{ac\_1}$ is the amplitude of the first waveform.

6. The system of claim 1, wherein the second waveform is characterized as $$\left\{ U_{ac\_2} \times \frac{1}{2}\left\{\mathrm{sgn}\left[\sin\left(\frac{2\pi}{\tau}t\right)\right] - 1\right\} \times \sin(2\pi ft) \right\}$$

where $U_{ac\_2}$ is the amplitude of the second waveform.

7. The system of claim 1, wherein the bioparticles are organelles.

8. The system of claim 1, wherein the bioparticles are selected from the group consisting of: liposomes, mitochondria, endosomes, exosomes, crystals, natural DNA, artificial DNA, viruses, bacteria, and pathogens.

9. The system of claim 1, wherein the electric field source includes a programmable AC power supply.

10. The system of claim 1, wherein the plurality of micro-posts disposed within the microfluidic channel are arranged in a plurality of rows, wherein a first row of micro-posts is laterally offset from a second row of micro-posts such that each micro-post in the first row aligns in a linear direction with a center of a gap between two adjacent micro-posts in the second row, wherein the plurality of rows includes a first subset of rows and a second subset of rows alternatingly arranged in the array, wherein posts in each row of the first subset of rows align in a linear direction parallel to a length of the microfluidic channel with corresponding posts in the other rows of the first subset of rows, and wherein posts in each row of the second subset of rows align in the linear direction with corresponding posts in the other rows of the second subset of rows.

11. The system of claim 1, wherein each micro-post of the plurality of micro-posts has an oval-shaped cross-section.

12. The system of claim 1, wherein the electric field source is configured to apply the second waveform only during the high period of the first waveform,
wherein applying the first waveform causes bioparticles in the microfluidic channel to move in a first direction towards a first end of the microfluidic channel during the low period of the first waveform,
wherein applying the first waveform causes a first plurality of bioparticles in the microfluidic channel bioparticles to move in a second direction towards a second end of the microfluidic channel during the high period of the first waveform while applying the second waveform restricts movement of a second plurality of bioparticles in the second direction during the high period of the first waveform, and
wherein the bioparticles of the second plurality of bioparticles are larger than the bioparticles of the first plurality of bioparticles.

13. The system of claim 1, wherein the electric field source is configured to apply the second waveform only during the low period of the first waveform,
wherein applying the first waveform causes bioparticles in the microfluidic channel to move in a first direction towards a first end of the microfluidic channel during the high period of the first waveform,
wherein applying the first waveform causes a first plurality of bioparticles in the microfluidic channel bioparticles to move in a second direction towards a second end of the microfluidic channel during the low period of the first waveform while applying the second waveform restricts movement of a second plurality of bioparticles in the second direction during the low period of the first waveform, and
wherein the bioparticles of the second plurality of bioparticles are larger than the bioparticles of the first plurality of bioparticles.

14. The system of claim 2, wherein the microfluidic channel is configured to exhibit no net flow into any single outlet channel during application of the electric field gradient.

15. The system of claim 1, wherein the plurality of micro-posts are arranged in a non-linear array within the microfluidic channel, wherein the non-linear array is an array of micro-posts configured such that there is no direct linear path between the micro-posts from a first end of the microfluidic channel to a second end of the microfluidic channel.

16. The system of claim 1, wherein the plurality of micro-posts are arranged in an array that induces a dielectrophoretic trapping force on a first subset of bioparticles when the second waveform is applied.

17. The system of claim 16, wherein the dielectrophoretic trapping force restricts movement of the bioparticles of the first subset of bioparticles, wherein the dielectrophoretic trapping force does not restrict movement of the bioparticles of a second subset of bioparticles when the second waveform is applied, and wherein the bioparticles of the first subset of bioparticles are larger than the bioparticles of the second subset of bioparticles.

18. A system for separating sub-micrometer bioparticles by size utilizing ratchet migration, the system comprising:
a microfluidic channel;
a structure configured within the microfluidic channel, the structure comprising an array with rows, the array including posts arranged in the rows, wherein some rows in the array are shifted in a lateral direction relative to other rows in the array;
a reservoir disposed at each of two opposite ends of the microfluidic channel;
an electrode immersed into fluid in each of the reservoirs; and
a waveform generator coupled to the electrode in each of the reservoirs and programmed to apply a biased alternating electrical potential via the electrodes in each of the reservoirs, the biased alternating electrical potential comprising a first waveform with a first frequency that induces electro-kinetic flow of sub-micrometer bioparticles in the microfluidic channel alternatingly in a first direction during a high period of the first waveform and in a second direction during a low period of the first waveform, and
a second waveform with a second higher frequency superimposed on the first waveform only during one selected from a group consisting of the high period of the first waveform and the low period of the first waveform, wherein the second waveform selectively induces a dielectrophoretic trapping force to selectively restrict migration of larger sized bioparticles during application of the second waveform ,and
wherein the biased alternating electrical potential applied by the waveform generator causes bioparticles of a first size to migrate towards a first reservoir at a first end of the microfluidic channel and causes bioparticles of a second larger size to migrate towards a second reservoir at a second opposite end of the microfluidic channel.

19. The system of claim 18, wherein a first row of posts in the array is laterally offset from a second row of posts in the array such that each post in the first row aligns in a linear direction parallel to a length of the microfluidic channel with a center of a gap between two adjacent posts in the second row, wherein the plurality of rows includes a first subset of rows and a second subset of rows alternatingly arranged in the array, wherein posts in each row of the first subset of rows align in the linear direction with corresponding posts in the other rows of the first subset of rows, and wherein posts in each row of the second subset of rows align in the linear direction with corresponding posts in the other rows of the second subset of rows.

20. The system of claim 18, wherein each post of the plurality of posts has an oval-shaped cross-section.

* * * * *